(12) United States Patent
Koda et al.

(10) Patent No.: US 7,970,255 B2
(45) Date of Patent: Jun. 28, 2011

(54) INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING CONTROL SIGNAL

(75) Inventors: Takeshi Koda, Saitama (JP); Nobuyuki Takakuwa, Saitama (JP); Takao Sawabe, Saitama (JP); Masanori Nakahara, Saitama (JP); Tohru Kanegae, Saitama (JP); Yasuko Fukuda, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 1510 days.

(21) Appl. No.: 10/530,040

(22) PCT Filed: Oct. 1, 2003

(86) PCT No.: PCT/JP03/12582
§ 371 (c)(1),
(2), (4) Date: Jan. 13, 2006

(87) PCT Pub. No.: WO2004/032497
PCT Pub. Date: Apr. 15, 2004

(65) Prior Publication Data
US 2006/0114776 A1 Jun. 1, 2006

(30) Foreign Application Priority Data

Oct. 1, 2002 (JP) .................................. 2002-288287

(51) Int. Cl.
*H04N 9/80* (2006.01)
(52) U.S. Cl. ...................................................... 386/239
(58) Field of Classification Search ..................... 386/95
See application file for complete search history.

(56) References Cited

U.S. PATENT DOCUMENTS 7,738,776 B2 * 6/2010 Kato et al. ...................... 386/95
2002/0001453 A1 * 1/2002 Mizumura et al. ............. 386/95

FOREIGN PATENT DOCUMENTS

| JP | 11-168702 | 6/1999 |
| JP | 2001-86444 | 3/2001 |
| JP | 2002-91409 | 3/2002 |

* cited by examiner

*Primary Examiner* — Peter-Anthony Pappas
*Assistant Examiner* — Daniel Tekle
(74) *Attorney, Agent, or Firm* — Young & Thompson

(57) ABSTRACT

An information record medium contains video information indicating a main-video, sub-video information indicating a sub-video which can be displayed at least partially over the main-video, and sub-video control information including sub-frame range information specifying at least a part of the region in the sub-video as a sub-frame and sub-frame control information for controlling display of a sub-frame displayed over the main-video. The sub-frame control information includes dynamic control information includes dynamic control information for dynamically displaying the sub-frame.

14 Claims, 49 Drawing Sheets

FIG20(a)

721 : SP CONTROL INFORMATION

| SCP HEADER | SP DATA IDENTIFIER |
| --- | --- |
| | SP DATA POSITION INFORMATION |
| | OTHER INFORMATION |
| SF CONTROL PARAMETER | SF DATA DISPLAY START TIME POINT |
| | SF DATA DISPLAY END TIME POINT |
| | OTHER INFORMATION (SCP BUTTON INFORMATION, HIGHLIGHT INFORMATION) |

FIG20(b)

722 : SP DATA STRUCTURE

| STRUCTURE INFORMATION | SP DATA IDENTIFIER |
| --- | --- |
| | SP DATA LENGTH |
| | OTHER INFORMATION |
| SP DATA | IMAGE DATA (Bitmap, JPEG etc.) |
| | OTHER INFORMATION (SPD BUTTON INFORMATION, HIGHLIGHT INFORMATION) |

FIG. 26

SUB-FRAME RECTANGLE MOTION
CONTROL COMPONENT

| SUB-FRAME CONTROL COMPONENT ID INFO. |
|---|
| LEG TOTAL NUMBER |
| SPLINE CONTROL |
| LEG INFORMATION #1 |
| .. |
| .. |
| LEG INFORMATION #n |
| OTHER |

821

LEG INFORMATION #1 ~ #n

| RELATIVE LOCATION x |
|---|
| RELATIVE LOCATION y |
| RELATIVE SCALING |

SHADOW DROPPING RELATIVE TO SUB-FRAME HAVING OPAQUE CHARACTERS IN TRANSPARENT BACKGROUND

Shadow

Shadow

SHADOW WITHOUT BLURRING

SHADOW WITH BLURRING

SHADOW DROPPING RELATIVE TO ENTIRELY OPAQUE SUB-FRAME

Shadow

Shadow

FIG. 49

AU Table — 131

| Field Name | | | | Contents |
|---|---|---|---|---|
| AU Table General Information | | | | the Number of AUs, Pointer to Each AU, etc. |
| AU#1 | PU#1 | | ES_Table Index#1 | Index Number of ES_map table=1 |
| | | | ES_Table Index#2 | 3 |
| 132I | PU#2 | | ES_Table Index#1 | 4 |
| | | | ES_Table Index#2 | 5 |
| AU#2 | PU#1 | | ES_Table Index#1 | 9 |
| | | | ES_Table Index#2 | 10 |
| | PU#2 | | ES_Table Index#1 | 12 |
| | | | ES_Table Index#2 | 13 |
| AU#3 | PU#1 | | ES_Table Index#1 | 14 |
| 302I | | | ES_Table Index#2 | 15 |
| | | | ES_Table Index#3 | 16 |
| | | | ES_Table Index#4 | 17 |
| | | | ES_Table Index#5 | 18 |
| Other Info. | | | | Position of ES_Map table, etc. |

ES_Map Table — 134

| Field Name | Contents |
|---|---|
| ES_Map Table General Information | Index Number, etc. |
| Index #1 | ES_PID Value=101 |
| | Address Information |
| Index #2 | ES_PID=102 |
| | Address Information |
| Index #3 | ES_PID=103 |
| | Address Information |
| Index #4 | ES_PID=201 |
| | Address Information |
| Index #5 | ES_PID=202 |
| | Address Information |
| Index #6 | ES_PID=301 |
| | Address Information |
| Index #7 | ES_PID=302 |
| | Address Information |
| Index #8 | ES_PID=303 |
| | Address Information |
| Index #9 | ES_PID=201 |
| | Address Information |
| Index #10 | ES_PID=202 |
| | Address Information |
| Index #11 | ES_PID=203 |
| | Address Information |
| Index #12 | ES_PID=101 |
| | Address Information |
| Index #13 | ES_PID=102 |
| | Address Information |
| Index #14 | ES_PID=101 |
| | Address Information |
| Index #15 | ES_PID=102 |
| | Address Information |
| Index #16  (134d) | ES_PID=103 |
| | Address Information |
| Index #17 | ES_PID=104 |
| | Address Information |
| 134e | Index Number of ES_map table of SP Data Stream operated =16 |
| Index #18 | ES_PID=105 |
| | Address Information |
| | Index Number of ES_map table of SP Data Stream operated =16 |
| Other Info. | Other Info. |

INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING CONTROL SIGNAL

TECHNICAL FIELD

The present invention relates to: an information record medium, such as a high density optical disc, capable of recording various information such as main-video information, audio information, sub-video information, reproduction control information, and so on, at high density; an apparatus for and a method of recording the information onto the information record medium; an apparatus for and a method of reproducing the information from the information record medium; an apparatus and a method capable of both recording and reproducing the information; a computer program for controlling the recording or reproduction; and a data structure including a control signal for controlling the reproduction.

BACKGROUND ART

DVDs become common as optical discs onto which various information such as main-video information, audio information, sub-video information, reproduction control information and so on is recorded. According to a DVD standard, the main-video information (video data), the audio information (audio data) and the sub-video information (sub-picture data) are packetized each with the reproduction control information (navigation data) and multi-recorded onto a disc in a program stream format of MPEG 2 (Moving Picture Experts Group phase 2), which is a high performance encoding technology. Among them, the main-video information has data, which is compressed in a MPEG video format (ISO 13818-2), for one stream in one program stream. On the other hand, the audio information is recorded in a plurality of formats (i.e. linear PCM, AC-3, MPEG audio and so on) and has data for up to 8 streams in one program stream. The sub-video information is defined by a bitmap, and is compressed and recorded in a run length method, and has data for up to 32 streams in one program stream.

On the other hand, a transport stream of MPEG2 standard is coming to be standardized, which is suitable for data transfer. According to the transport stream format, a plurality of elementary streams is transferred at the same time. For example, a plurality of programs, such as a plurality of satellite digital broadcasting channels in one satellite radio wave, is transmitted at the same time in a TDM (Time Division Multiplex) scheme.

In DVD's of this type, sub-picture information as the sub-video information to indicate the sub-video such as a caption for a movie may be recorded, in association with video information as the main-video information. When a DVD of this type is reproduced, the sub-picture may be displayed over the video or the main-picture. For example, an English caption as the sub-picture may be superimposed over the video screen of the movie. Instead of this, a Japanese caption as the sub-picture may be superimposed.

For example, as the information to control displaying such a sub-picture, there are recorded information to indicate a display area of sub-picture pixel data in a video display area; information to designate a position of the sub-picture pixel data in the display area; scroll information to scroll the sub-picture from side to side or up and down relative to the display area; and so on. As a relatively complex and sophisticated sub-picture display, the caption for the movie can be scrolled with the aid of the scroll information.

DISCLOSURE OF INVENTION

Also in the information record medium of this type, there is a possibility of more complex and sophisticated content reproduction, such as an interactive reproduction, in accordance with the progress in the high density technology of the information record medium. Accordingly, with regard to the sub-picture also, more complex and sophisticated reproduction control is required, in accordance with the interactive reproduction.

According to the reproduction control based on the aforementioned DVD video standard, however, more complex and sophisticated reproduction, such as a reproduction with dynamically changing the display position or size of the sub-picture within the video display area or a reproduction with changing the display content within the sub-picture while the position of the sub-picture is fixed, can be hardly achieved as a technical matter.

The present invention has been accomplished in view of the above problems for example. It is therefore an object of the present invention to provide an information record medium, an information record apparatus and method, an information reproduction apparatus and method, an information record reproduction apparatus and method, a computer program for a record or reproduction control, and a data structure including a control signal, allowing a complex and sophisticated reproduction of the sub-video information to be reproduced with the main-video information, including a reproduction of the sub-picture playing a role of the complex and sophisticated content reproduction such as an interactive reproduction with the aid of a DVD player or the like.

On the information record medium according to the present invention, there are recorded: video information to indicate a main-video; sub-video information to indicate a sub-video displayable at least partially over the main-video; and sub-video control information including (i) sub-frame range information to indicate at least a partial area of the sub-video as a sub-frame and (ii) sub-frame control information to control displaying the sub-frame to be displayed over the main-video, wherein the sub-frame control information includes dynamic control information to display dynamically the sub-frame.

According to the information record medium of the invention, when the information on the information record medium such as a DVD is reproduced, the sub-video information including the sub-picture information can be superimposed at least partially as a sub-frame, for example, over the main-video such as the main-picture or the video display screen, as it is or after any processing or treatment. Incidentally, the entire sub-video information may be displayed over the main-video, or a part of the sub-video information may be cut out as the sub-frame and displayed. Alternatively, one or a plurality of sub-frames as described above is cut out from the same sub-video information. In the case that a plurality of sub-frames is cut out, they may be cut out including any common part, or including no common part. Particularly, at least a partial area of the sub-video is designated as a sub-frame, by the sub-frame range information such as coordinate information or the like to designate coordinates of opposing two or four corners of a rectangular area of the sub-frame. Alternatively, the partial area may be designated by coordinates of one corner with the width and height of the rectangular area. Incidentally, although the sub-frame may be a rectangular area within the sub-video, the sub-frame can take any arbitrary shape. The sub-frame, which is at least a part of the sub-video information and designated as such, is superimposed over the main-video, in a format under a dynamic display control based on the dynamic control information in the sub-frame control information. For example, the sub-frame is cut out from the sub-video information and then subjected to a special treatment or special processing such as a translation (parallel displacement), a scaling (upsizing and downsizing), a rotation and so on, so that the sub-frame is displayed dynamically relative to the main-video, according to the elapse of the reproduction time.

Consequently, on the basis of the dynamic control information included in the sub-frame control information, the complex and sophisticated reproduction can be achieved such as a reproduction with changing the display position or size of the sub-frame over the main-video, or a reproduction with changing the display content within the sub-frame while the position of the sub-frame is fixed.

Incidentally, such sub-video information may have an alpha value to indicate transparency of the corresponding sub-video. In this case, the transparent part occupying a part of the sub-frame may be invisible over the main-video. That is, even if the shape of the sub-frame itself is fixed as a rectangular shape, the opaque part of the sub-frame allows any arbitrary shape including a circular shape, an oval shape, an object image figure and so on as the shape of the sub-frame to be finally displayed can take. That is, fixing the shape of the sub-frame as a rectangular shape makes the display control based on the sub-frame control information relatively easily.

In an aspect of the information record medium according to the present invention, the dynamic control information includes information to change dynamically at least one of a display position, a display size and a display shape of the sub-frame to be displayed over the main-video.

According to this aspect, at least one of the display position, the display size and the display shape of the sub-frame to be displayed over the main-video can be changed dynamically, while the sub-frame is displayed (superimposed) over the main-video, on the basis of the dynamic control information. For example, it is possible to display the sub-frame over the main-video so that the sub-frame moves from side to side or up and down, or rotates, while the size of the sub-frame is changed or fixed.

In another aspect of the information record medium according to the present invention, the dynamic control information includes information to change dynamically a display content within the sub-frame whose display position, display size and display shape are fixed relative to the main-video.

According to this aspect, the display content within the sub-frame whose display position, display size and display shape are fixed relative to the main-video can be changed dynamically, while the sub-frame is displayed (superimposed) over the main-video, on the basis of the dynamic control information. For example, the display content within the sub-frame, which may be displayed statistically in a circumference area or a central area in the main-video, or over an entire area of the main area, can be displayed dynamically, for example, moved, changed, switched to another image, scrolled and so on. Incidentally, it is also possible to combine this dynamic display by changing the display content within the sub-frame and the aforementioned dynamic display by moving the sub-frame itself relative to the main-video as mentioned in one aspect.

In another aspect of the information record medium according to the present invention, the sub-frame range information designates a rectangular area as the sub-frame, the rectangular area occupying a part of the sub-video, and the dynamic control information has information to change dynamically the display content within the sub-frame by changing the rectangular area designated by the sub-frame range information relative to the sub-video.

According to this aspect, the rectangular area designated as the sub-frame by the sub-frame range information is changed relative to the sub-video, on the basis of the dynamic control information. The expression, "to change the rectangular area" herein means to move the area from side to side or up and down (e.g. a translation or parallel displacement), to scale the area, to rotate the area and so on. Therefore, unless whole of the sub-video is even or constant image, the part of the sub-video cut out as the sub-frame changes, within the area corresponding to the sub-frame designated as the rectangular area by the sub-frame range information, in accordance with the change of the rectangular area, on the main-video. That is, even if the position of the sub-frame to be superimposed over the main-video is fixed, it is possible to vary the display content within the sub-frame. For example, the display content within the sub-frame fixed and displayed in the circumference area, the central area or the entire area of the main-video can be changed dynamically within the area corresponding to the sub-frame, for example by moving, changing or scaling the content, or switching the content to another image, or scrolling the content vertically, horizontally or diagonally.

In another aspect of the information record medium according to the present invention, the dynamic control information has information to display dynamically the sub-frame in such a manner that the sub-frame moves two-dimensionally or three-dimensionally relative to the main-video.

According to this aspect, the sub-frame to be displayed over the main-video can be moved two-dimensionally or three-dimensionally, while it is displayed (superimposed) over the main-video, on the basis of the dynamic control information. For example, the two-dimensional movement may be a free movement of the sub-frame over the main-video from side to side or up and down. The three-dimensional movement may be a free movement of the sub-frame toward the viewer or away from the viewer relative to the main-video, in addition to the aforementioned movement from side to side or up and down over the main-video.

In this case, the display control of the two-dimensional movement may be achieved so that the sub-frame moves along a path from a start point through one or more mid points to an end point, by defining said one or more mid points, over which the sub-frame should pass, between the start point and the end point. Furthermore, such a path may be subjected to a spline interpolation to provide a smooth path, so that the sub-frame moves two-dimensionally along this smooth path. Alternatively, another display control may be achieved so that the sub-frame moves two-dimensionally over the main-video by changing parameters of a transformation matrix for a conversion from a sub-frame coordinate system, which may be used in cutting out the sub-frame from the sub-video, to a main-video coordinate system.

On the other hand, another display control may be achieved so that the sub-frame moves three-dimensionally over the main-video, by using a three-dimensional coordinate system for the sub-frame coordinate system, which is used in cutting out the sub-frame from the sub-video. Alternatively, another display control may be achieved so that the sub-frame moves three-dimensionally over the main-video, by changing parameters of the transformation matrix for the conversion from the sub-frame coordinate system to the main-video coordinate system.

In another aspect of the information record medium according to the present invention, the main-video information, the sub-video information and the sub-video control information are divided into predetermined packet units and multiplexed, and further streamed relatively into a video stream composed of the divided main-video information, a sub-picture stream composed of the divided sub-video information and a control information stream composed of the divided sub-video control information.

According to this aspect, in the case that each information is recorded after it is packetized and streamed, similarly to the PS (Program Stream) of the MPEG2 for example, the sub-video information including the sub-picture information is recorded as a special SPD (Sub-Picture Data) stream, and the sub-video control information to perform the display control for the sub-video information is recorded as a special SCP (Sub-picture Control Packet) stream, that is different from the SPD stream. The main-video is also recorded as a special video stream. Therefore, for example, a display based on the sub-video information recorded as one stream in the PS can be display-controlled efficiently on the basis of the sub-video control information including the dynamic control information recorded as another stream. Additionally, various display controls can be achieved by using a plurality of sub-video control information streams relative to the same sub-video information stream.

The information record apparatus according to the present invention includes: a first record device for recording video information to indicate a main-video; a second record device for recording sub-video information to indicate a sub-video displayable at least partially over the main-video; and a third record device for recording sub-video control information including (i) sub-frame range information to indicate at least a partial area of the sub-video as a sub-frame and (ii) sub-frame control information to control displaying the sub-frame to be displayed over the main-video, wherein the third record device records the sub-frame control information in such a manner that the sub-frame control information includes dynamic control information to display dynamically the sub-frame.

According to the information record apparatus, the first record device such as a controller, an encoder, a TS object generator mentioned below, an optical pickup, a cutting device or the like, records the video information to indicate the main-video onto the information record medium such as a DVD. The second record device such as a controller, an encoder, an optical pickup, a cutting device or the like, records the sub-video information to indicate the sub-video displayable at least partially over the main-video onto the information record medium such as a DVD. The third record device such as a controller, an encoder, an optical pickup, a cutting device or the like, records the sub-video control information including (i) sub-frame range information to indicate at least a partial area of the sub-video as a sub-frame and (ii) sub-frame control information to control displaying the sub-frame to be displayed over the main-video, onto the information record medium such as a DVD. Particularly, the third record device records the sub-frame control information so that the sub-frame control information includes the dynamic control information to display dynamically the sub-frame.

Therefore, the information record medium of the present invention mentioned above (including various aspects thereof) can be recorded relatively efficiently.

Incidentally, the information record apparatus according to the present invention may also take various aspects, correspondingly to various aspects of the information record medium according to the present invention as mentioned above.

The information record method according to the present invention includes: a first record process of recording video information to indicate a main-video; a second record process of recording sub-video information to indicate a sub-video displayable at least partially over the main-video; and a third record process of recording sub-video control information including (i) sub-frame range information to indicate at least a partial area of the sub-video as a sub-frame and (ii) sub-frame control information to control displaying the sub-frame to be displayed over the main-video, wherein the third record process is for recording the sub-frame control information in such a manner that the sub-frame control information includes dynamic control information to display dynamically the sub-frame.

According to the information record method of the invention, the first record process is for recording the video information to indicate the main-video, the second record process is for recording the sub-video information to indicate the sub-video displayable at least partially over the main-video, and the third record process is for recording the sub-video control information including the sub-frame range information to designate at least a partial area of the sub-video as the sub-frame and the sub-frame control information to control displaying the sub-frame to be displayed over the main-video, onto the information record medium such as a DVD, with the aid of the controller, the encoder, the optical pickup, the cutting device and so on. Particularly, the third record process is for recording the sub-frame control information so that the sub-frame control information includes the dynamic control information to display dynamically the sub-frame.

Therefore, the information record medium according to the present invention as mentioned above (including various aspects thereof) can be recorded relatively efficiently.

Incidentally, the information record method according to the present invention may also take various aspects, correspondingly to various aspects of the information record medium according to the present invention.

The information reproduction apparatus according to the present invention is an apparatus for reproducing the information record medium according to the present invention mentioned above (including various aspects thereof), the apparatus comprising: a reproduction device for reproducing the video information, the sub-video information and the sub-video control information; a display output device capable of displaying and outputting the reproduced sub-video information over the reproduced video information; and a control device for controlling the display output device to display dynamically the sub-frame over the main-video, on the basis of the sub-frame control information in the reproduced sub-video control information.

According to the information reproduction apparatus of the present invention, the reproduction device such as a controller, a decoder, a demultiplexer, an optical pickup and so on reproduces the video information, the sub-video information and the sub-video control information. The display output device such as a controller, a CRT (Cathode Ray Tube) device, a PDP (Plasma Display Panel) device, an LCD (Liquid Crystal Display) device, a projector device and so on can display and output the sub-video information over the reproduced video information. Then, the control device such as a controller and the like controls the display output device to display dynamically the sub-frame over the main-video, on the basis of the sub-frame control information in the reproduced sub-video control information.

Therefore, the information record medium according to the present invention as mentioned above (including various aspects thereof) can be reproduced relatively efficiently.

Incidentally, the information reproduction apparatus according to the present invention may also take various aspects, correspondingly to various aspects of the information record medium according to the present invention.

The information reproduction method according to the present invention is a method of reproducing the information record medium according to the present invention mentioned above (including various aspects thereof), the method comprising: a reproduction process of reproducing the video information, the sub-video information and the sub-video control information; and a control process of controlling a display output device capable of displaying and outputting the reproduced sub-video information over the reproduced video information to display dynamically the sub-frame over the main-video, on the basis of the sub-frame control information in the reproduced sub-video control information.

According to the information reproduction method of the present invention, the reproduction process is for reproducing the video information, the sub-video information and the sub-video control information, with the aid of the controller, the decoder, the demultiplexer, the optical pickup and so on. The control process is for controlling the display output device such as the controller, the CRT device, the PDP device, the LCD device, the projector device and so on with the aid of the controller and the like, so that the sub-frame is dynamically displayed over the main-video on the basis of the sub-frame control information in the reproduced sub-video control information.

Therefore, the information record medium of the invention mentioned above (including various aspects thereof) can be recorded relatively efficiently.

Incidentally, the information reproduction method according to the present invention may also take various aspects, correspondingly to various aspects of the information record medium according to the present invention as mentioned above.

The information record reproduction apparatus according to the present invention includes: a first record device for recording video information to indicate a main-video; a second record device for recording sub-video information to indicate a sub-video displayable at least partially over the main-video; and a third record device for recording sub-video control information including (i) sub-frame range information to indicate at least a partial area of the sub-video as a sub-frame and (ii) sub-frame control information to control displaying the sub-frame to be displayed over the main-video, wherein the third record device records the sub-frame control information in such a manner that the sub-frame control information includes dynamic control information to display dynamically the sub-frame, and the apparatus further comprising: a reproduction device for reproducing the video information, the sub-video information and the sub-video control information; a display output device capable of displaying and outputting the reproduced sub-video information over the reproduced video information; and a control device for controlling the display output device to display dynamically the sub-frame over the main-video, on the basis of the sub-frame control information in the reproduced sub-video control information.

According to the information record reproduction apparatus of the present invention, since it has both function of the information record apparatus and the information reproduction apparatus of the invention mentioned above, it is possible to record and reproduce the information on the information record medium of the invention (including various aspects thereof), relatively efficiently.

Incidentally, the information record reproduction apparatus according to the present invention may also take various aspects, correspondingly to various aspects of the information record medium according to the present invention.

The information record reproduction method according to the present invention includes: a first record process of recording video information to indicate a main-video; a second record process of recording sub-video information to indicate a sub-video displayable at least partially over the main-video; and a third record process of recording sub-video control information including (i) sub-frame range information to indicate at least a partial area of the sub-video as a sub-frame and (ii) sub-frame control information to control displaying the sub-frame to be displayed over the main-video, wherein the third record process is for recording the sub-frame control information in such a manner that the sub-frame control information includes dynamic control information to display dynamically the sub-frame, and the method further comprising: a reproduction process of reproducing the video information, the sub-video information and the sub-video control information; and a control process of controlling a display output device capable of displaying and outputting the reproduced sub-video information over the reproduced video information to display dynamically the sub-frame over the main-video, on the basis of the sub-frame control information in the reproduced sub-video control information.

According to the information record reproduction method of the invention, since it has both function of the information record method and the information reproduction method of the invention mentioned above, the information record medium of the invention (including various aspects thereof) can be recorded and reproduced relatively efficiently.

Incidentally, the information record reproduction method according to the present invention may also take various aspects, correspondingly to various aspects of the information record medium according to the present invention.

The computer program for a record control according to the present invention is to control a computer disposed at the information record apparatus according to the present invention mentioned above (including various aspects thereof), the program making the computer function as at least a part of the first record device, the second record device and the third record device.

According to the computer program for a record control of the invention, the information record apparatus according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it.

Incidentally, the computer program for a record control according to the present invention may also take various aspects, correspondingly to various aspects of the information record medium according to the present invention as mentioned above.

The computer program for a reproduction control according to the present invention is to control a computer disposed at the information reproduction apparatus according to the present invention mentioned above (including various aspects thereof), the program making the computer function as at least a part of the reproduction device, the display output device and the control device.

According to the computer program for a reproduction control of the invention, the information reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a reproduction control may also take various aspects, correspondingly to various aspects of the information record medium according to the present invention as mentioned above.

The computer program for a record reproduction control according to the present invention is to control a computer disposed at the information record reproduction apparatus according to the present invention mentioned above (including various aspects thereof), the program making the computer function as at least a part of the first record device, the second record device, the third record device, the reproduction device, the display output device and the control device.

According to the computer program for a record reproduction control of the invention, the information record reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record reproduction control according to the present invention may also take various aspects, correspondingly to various aspects of the information record medium according to the present invention as mentioned above.

The data structure including a control signal according to the present invention includes: video information to indicate a main-video; sub-video information to indicate a sub-video displayable at least partially over the main-video; and sub-video control information including (i) sub-frame range information to indicate at least a partial area of the sub-video as a sub-frame and (ii) sub-frame control information to control displaying the sub-frame to be displayed over the main-video, wherein the sub-frame control information includes dynamic control information to display dynamically the sub-frame.

According to the data structure including the control signal of the present invention, similarly to the information record medium according to the present invention mentioned above, the complex and sophisticated reproduction can be achieved on the basis of the dynamic control information included in the sub-frame control information. For example, on the basis of the dynamic control information, it is possible to move or change the display position or size of the sub-frame over the main-video, or to change the display content within the sub-frame while the position of the sub-frame is fixed.

Incidentally, the data structure including the control signal according to the present invention may also take various aspects, correspondingly to various aspects of the information record medium according to the present invention as mentioned above.

The above object of the present invention is achieved by a computer program product for a record control in a computer-readable medium for tangibly embodying a program of instructions executable by a computer disposed at the aforementioned information record apparatus according to the present invention (including various aspects), the program making the computer function as at least a part of the first record device, the second record device and the third record device.

The above object of the present invention is achieved by a computer program product for a reproduction control in a computer-readable medium for tangibly embodying a program of instructions executable by a computer disposed at the information reproduction apparatus according to the present invention (including various aspects), the program making the computer function as at least a part of the reproduction device, the display output device and the control device.

The above object of the present invention is achieved by a computer program product for a record reproduction control in a computer-readable medium for tangibly embodying a program of instructions executable by a computer disposed at the information record reproduction apparatus according to the present invention (including various aspects), the program making the computer function as at least a part of the first record device, the second record device, the third record device, the reproduction device, the display output device and the control device.

According to the computer program product for the record control, the reproduction control, or the record reproduction control of the present invention, at least a part of the first record device, the second record device, the third record device, the reproduction device, the display output device and the control device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first record device, the second record device, the third record device, the reproduction device, the display output device and the control device.

These effects and other advantages of the present invention become more apparent from the following embodiments and examples.

BRIEF DESCRIPTION OF DRAWINGS

FIG. 20 is a conceptual diagram showing a specific example of the data structure (FIG. 20(*a*)) of the SP control information to control the sub-picture data, and the SP data structure (FIG. 20(*b*)) including the SP data that is still picture data constituting the entity of the sub-picture data.

FIG. 26 is a set of tables indicating the structure of the sub-picture control packet in the embodiment, continued from FIG. 25.

FIG. 45 is a conceptual illustration showing a shadow dropping display in the embodiment.

FIG. 49 is a diagram schematically showing a specific example of a data structure in an AU table constructed in the object information file and an ES map table associated with the AU table, in a specific example of the embodiment.

BEST MODE FOR CARRYING OUT THE INVENTION (Information Record Medium)

The information record medium of the present invention is discussed, with reference to its embodiments, as well as FIG. 1 to FIG. 13. In these embodiments, the information record medium of the present invention is applied to an optical disc capable of recording (writing) and reproducing (reading).

Figure 1:
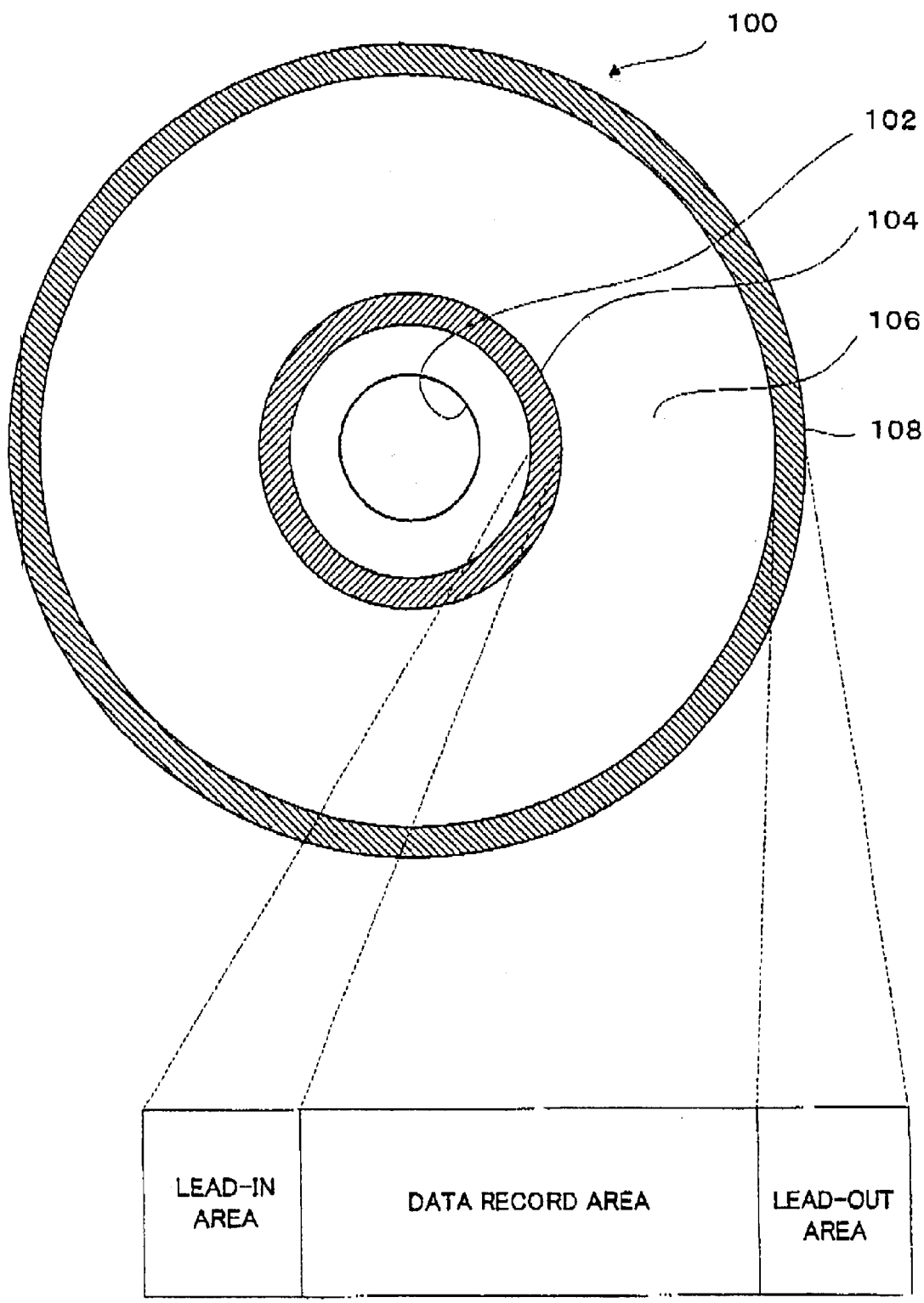
FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Figure 2:
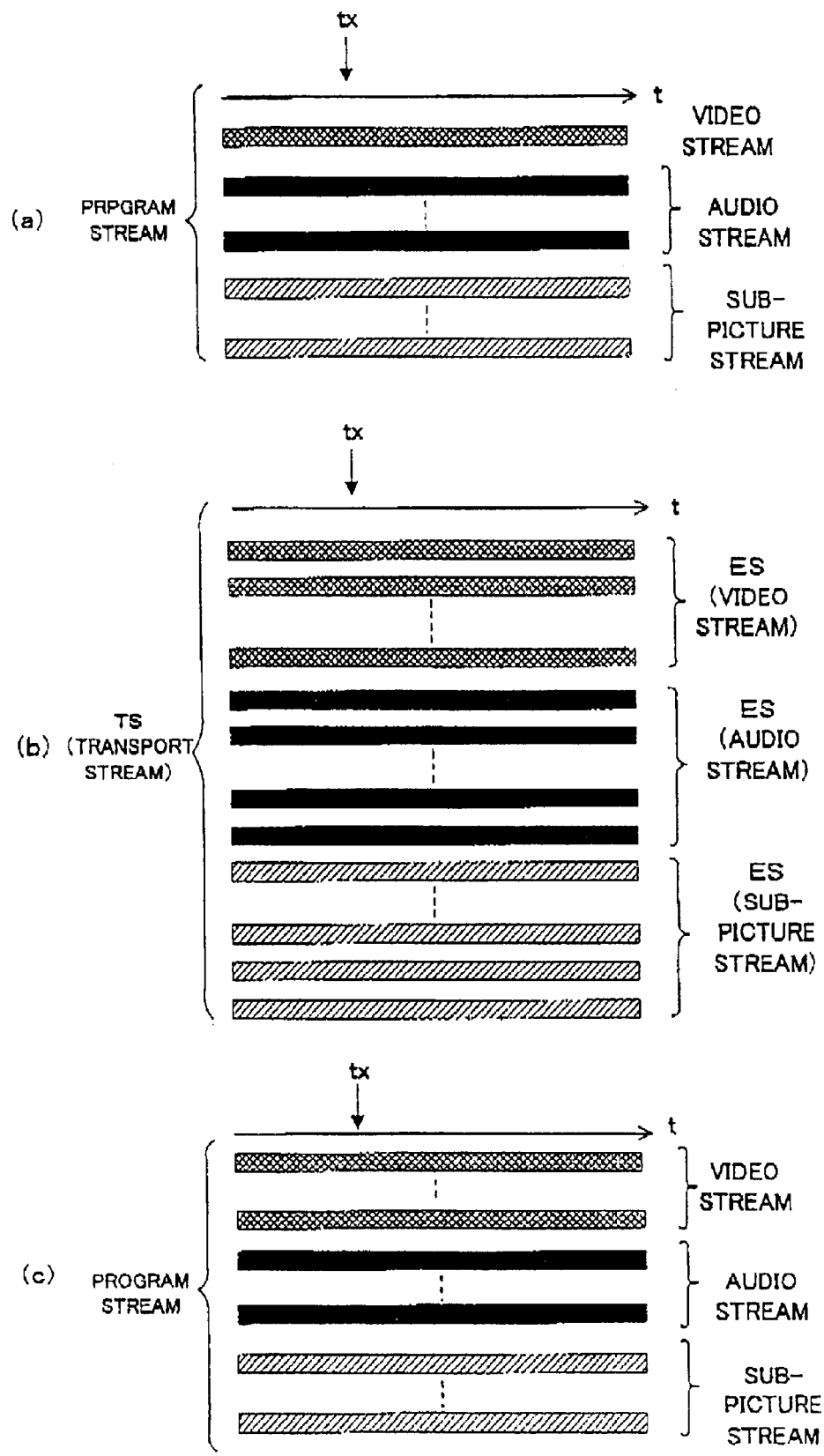
FIG. 2 illustrates a schematic conceptual diagram (FIG. 2(a)) of a conventional program stream of MPEG2; a schematic conceptual diagram (FIG. 2(b)) of a transport stream of MPEG2 used in the embodiment; and a schematic conceptual diagram (FIG. 2(c)) of a program stream of MPEG2 used in the embodiment.

Next, with reference to FIG. 2, the structures of the transport stream (TS) and the program stream (PS) to be recorded onto the optical disc in the embodiment are discussed. FIG. 2(a) schematically illustrates a MPEG2 program stream of a conventional DVD for a comparison, FIG. 2(b) schematically illustrates a MPEG2 transport stream (TS) structure. Furthermore, FIG. 2(c) schematically illustrates a MPEG2 program stream structure in the present invention.

In FIG. 2(a), one program stream to be recorded in the conventional DVD includes only one video stream for video data as main-picture information, along the time axis t, and further includes up to 8 audio streams for audio data as audio information, up to 32 sub-picture streams for sub-picture data as sub-picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) to be recorded in the optical disc 100 of the present invention includes a plurality of video streams as elementary streams (ES) for video data as main-picture information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

In FIG. 2(c), one program stream (PS) to be recorded onto the optical disc 100 of the present invention includes a plurality of video streams for video data as main-picture information, and further includes a plurality of audio streams for audio data as audio information and a plurality of sub-picture streams for sub-picture data as sub-picture information. That is, the video data to be multiplexed at an arbitrary time point tx relates to a plurality of video streams. For example, a plurality of video streams that may correspond to a plurality of TV programs or a plurality of movies can be included at the same time in the program stream.

Incidentally, for convenience of explanation, the video stream, the audio stream and the sub-picture stream are arranged in this order from the top in FIG. 2(a) to FIG. 2(c). Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) as shown in FIG. 2(b), i.e. to record a plurality of programs at the same time. Furthermore, instead of or in addition to this transport stream, the program stream (PS) as shown in FIG. 2(c) can be multi-recorded onto the same optical disc 100.

Figure 3:
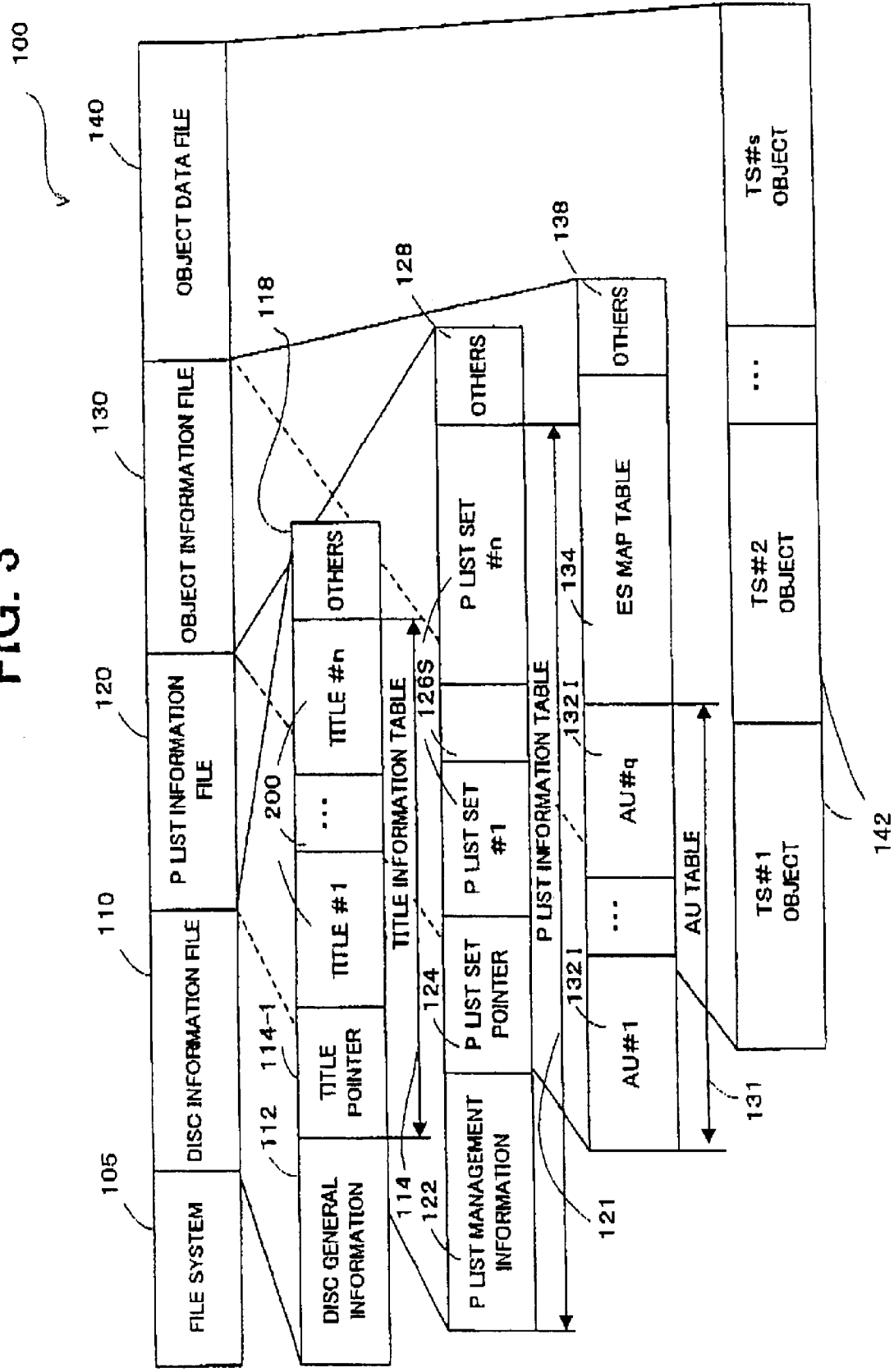
FIG. 3 is a diagram schematically illustrating a data structure recorded onto the optical disc in the embodiment.
Figure 4:
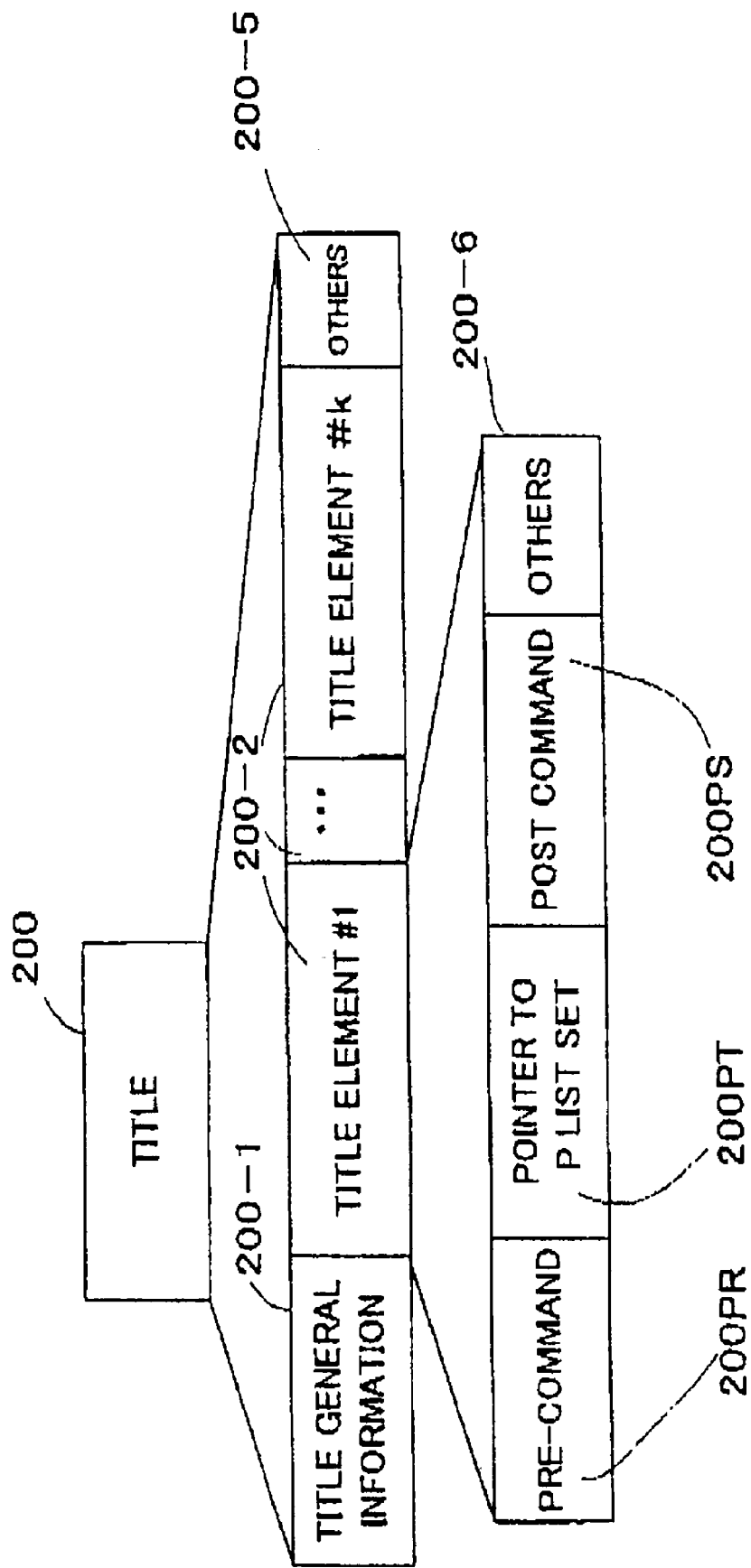
FIG. 4 is a conceptual diagram hierarchically illustrating a detail of a data structure in each title shown in FIG. 3.
Figure 5:
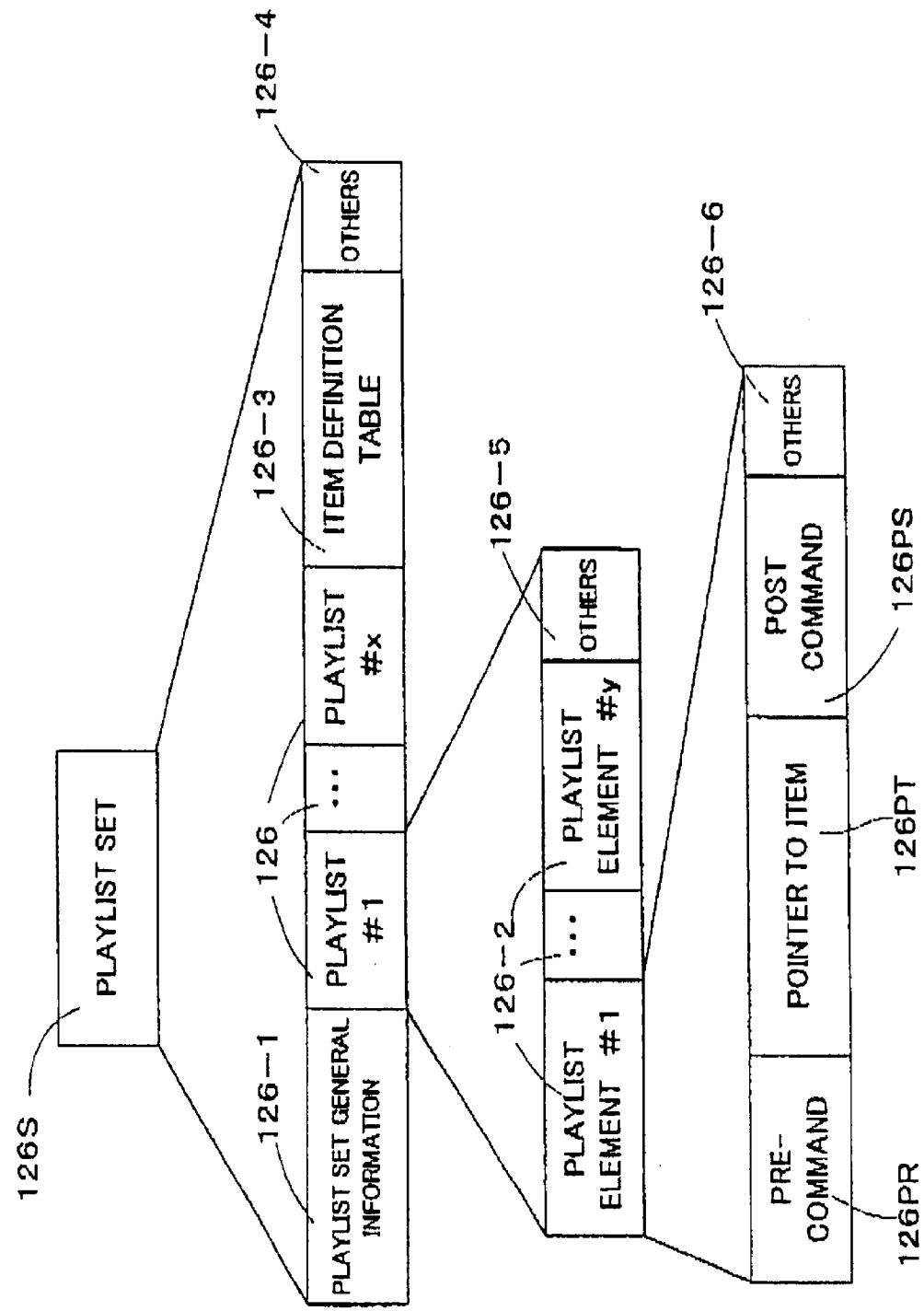
FIG. 5 is a conceptual diagram hierarchically illustrating a detail of a data structure in each playlist set shown in FIG. 3.
Figure 6:
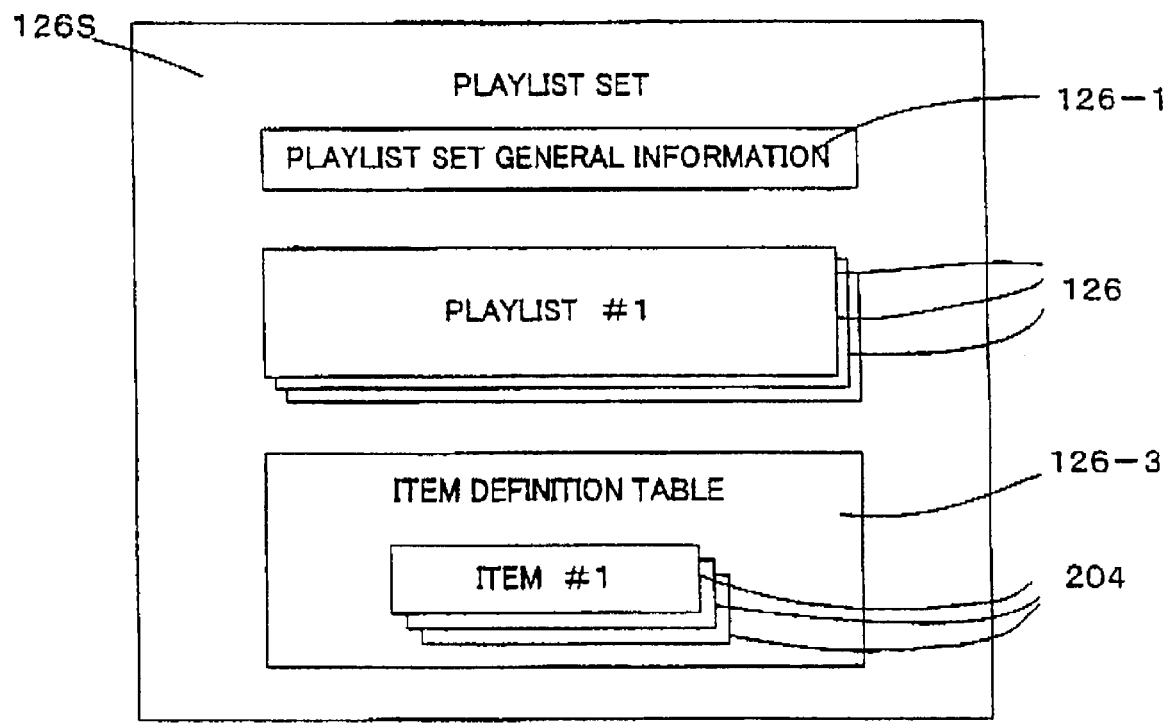
FIG. 6 is a conceptual diagram schematically illustrating a detail of a data structure in each playlist set shown in FIG. 3.
Figure 7:
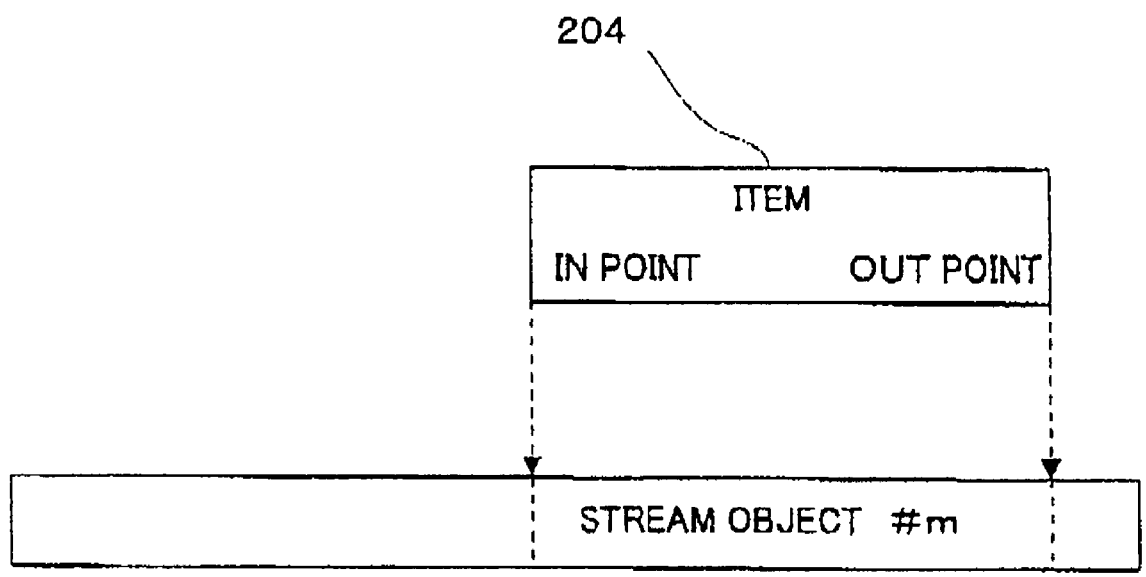
FIG. 7 is a conceptual diagram schematically illustrating a detail of a data structure of each item shown in FIG. 6.
Figure 8:
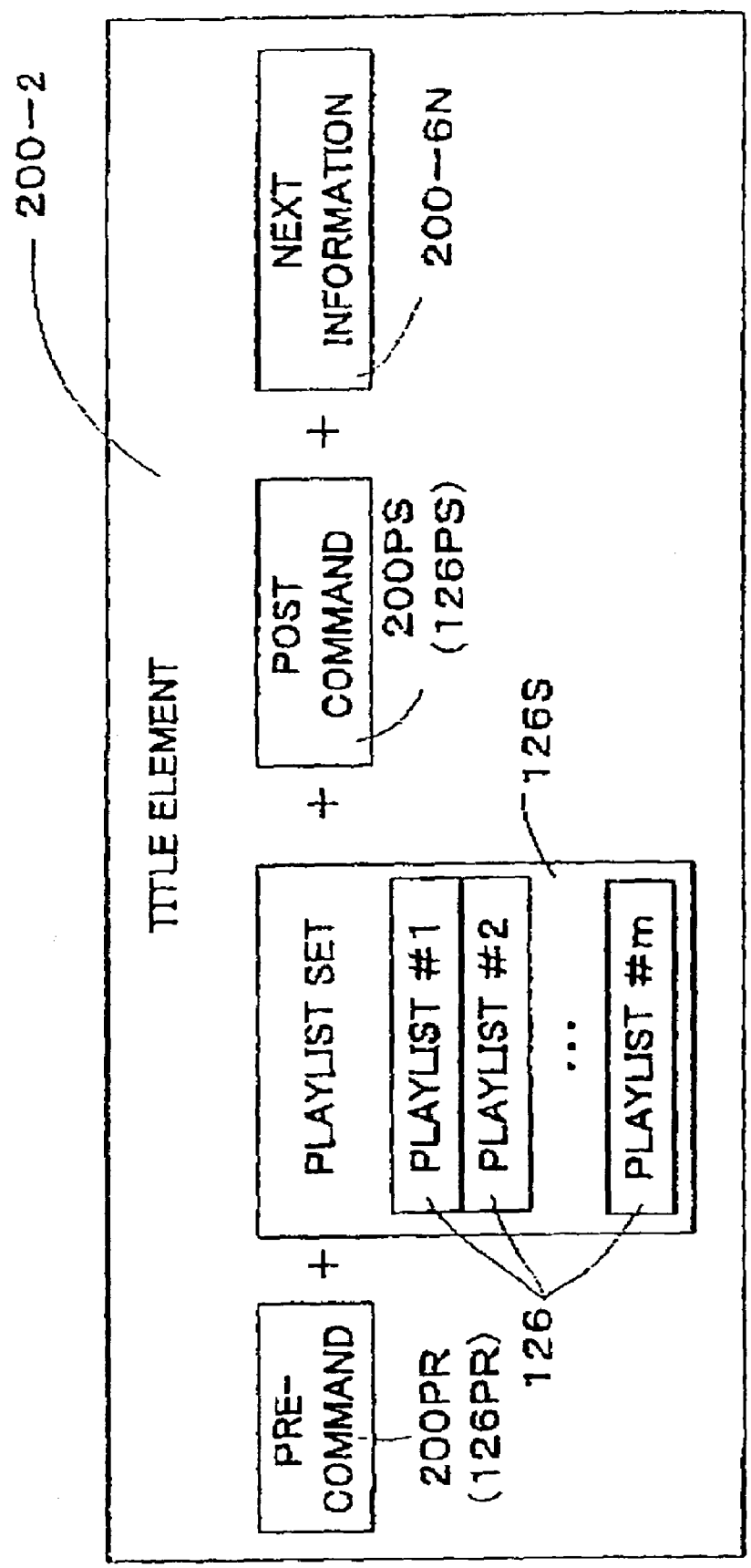
FIG. 8 is a conceptual diagram schematically illustrating a logic structure of data in each title element shown in FIG. 4.
Figure 9:
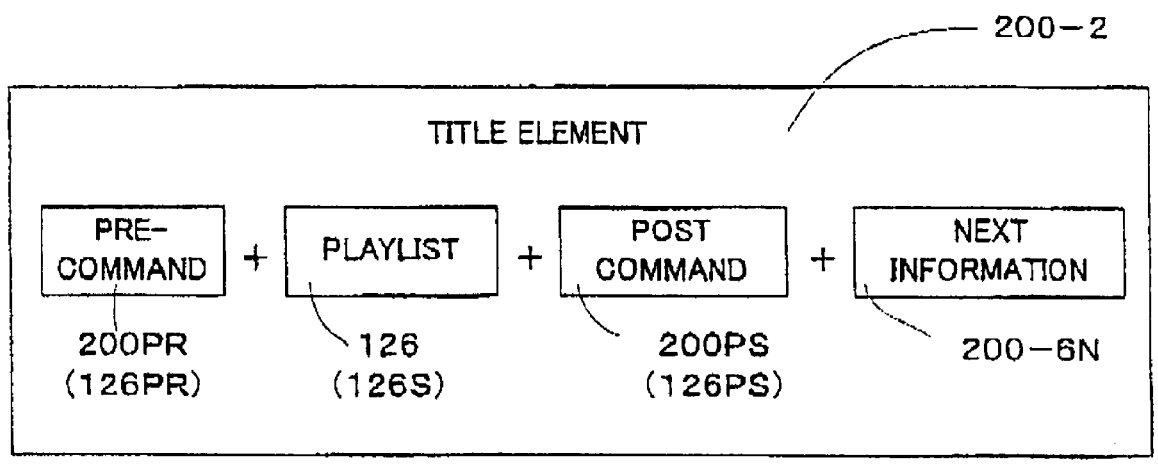
FIG. 9 is a conceptual view schematically illustrating a logic structure of data in each title element shown in FIG. 4, in a case that each playlist set is composed of one playlist.
Figure 10:
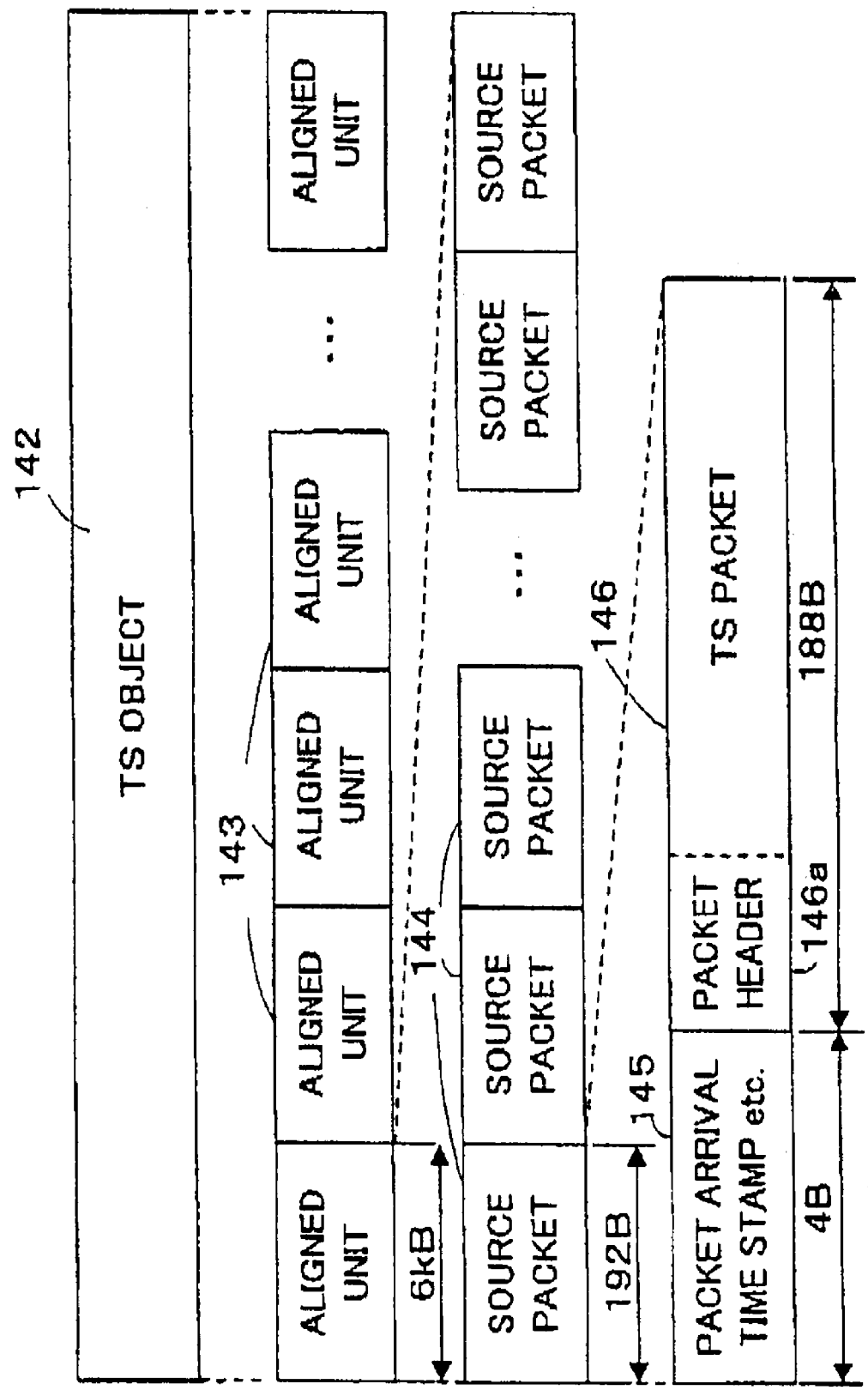
FIG. 10 is a conceptual view schematically illustrating a detail of a data structure in each object shown in FIG. 3.

Next, with reference to FIG. 3 and FIG. 10, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3. FIG. 5 and FIG. 6 schematically show a data structure in detail respectively in each playlist (P list) set shown in FIG. 3. FIG. 7 schematically shows a detail of the data structure of each item shown in FIG. 6. FIG. 8 schematically shows a logic structure of data in each title element shown in FIG. 4. FIG. 9 schematically shows a logic structure of data in each title element, in a case that each playlist set is composed of one playlist. FIG. 10 schematically shows a detail of a data structure in each object shown in FIG. 3.

In the following explanation, the "title" means a reproduction unit, on the basis of which a plurality of "playlists" is executed continuously or sequentially, and which is a logically large grouped unit, such as one movie or one TV program. The "playlist set" means a bundle of "playlists". For example, it may be a bundle of playlists to reproduce a plurality of contents information having a special relationship switchable to each other in an angle reproduction or a parental reproduction, or may be a bundle of playlists to reproduce contents information relating to a plurality of programs broadcasted in the same time zone and collectively recorded. Alternatively, it may be a bundle of playlists to reproduce various contents information, in one title, prepared on the basis of required function, for example on the basis of video performance or audio performance required for the information reproduction system, such as a high vision compatibility, a display resolution, a surround speaker compatibility, a speaker layout and so on. The "playlist" is information for storing the information required to reproduce the "object" and consists of a plurality of "items" each storing the information about a reproduction range of the object to access the object. The "object" is the entity information of contents constructing the aforementioned MPEG2 transport stream.

In FIG. 3, the optical disc 100 is provided with four files as a logical structure: a disc information file 110; a playlist (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1.

That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total numbers of titles or the like in the optical disc 100. The title information table 114 includes a title pointer 114-1 and a plurality of titles 200 (title #1-#m) whose ID (identification) number or record address is indicated by the title pointer 114-1. In each title 200, each title type (e.g. sequential reproduction type, branch type and so on), or the playlist (P list) number constructing each title is recorded for each title, as the logical information.

More specifically, for example, as shown in FIG. 4, each title 200 is made of a title general information 200-1, a plurality of title elements 200-2 and other information 200-5. Furthermore, each title element 200-2 is made of a pre-command 200PR, a pointer 200PT to a playlist set, a post command 200PS and other information 200-6.

The pointer 200PT as an example of the first pointer information according to the present invention indicates an ID number of the playlist set 126S which is stored in the playlist information file 120 and corresponds to contents information to be reproduced on the basis of the title element 200-2 including the pointer 200PT. Incidentally, the pointer 200PT may be information to indicate a record position of the playlist set 126S corresponding to the contents information to be reproduced on the basis of the title element 200-2. The pre-command 200PR as an example of the first pre-command according to the present invention indicates a command to be executed before reproducing the contents information whose reproduction sequence is defined by one playlist set 126S designated by the pointer 200PT. The post command 200PS as an example of the first post command according to the present invention is a command to be executed after reproducing the contents information whose reproduction sequence is defined by said one playlist set. Other information 200-5 included in the title element 200-2 may include next information to designate a title element for a next reproduction after the present reproduction of the present title element, for example.

Therefore, when the information reproduction apparatus reproduces the information record medium, the desired contents information can be reproduced as a title element 200-2, by making access to the playlist set 126S in accordance with the pointer 200PT and performing a control to select playlist corresponding to the desired program or the like from among a plurality of playlists 126 in the playlist set 126S. Furthermore, reproducing such a title element 200-2 solely or sequentially makes it possible to reproduce one title 200. Furthermore, it is possible to execute commands to be executed before reproduction, in the contents information whose reproduction sequence is defined by one playlist set 126S designated by the pointer 200PT, according to the pre-command 200PR. Furthermore, it is possible to execute commands to be executed after the reproduction, in the contents information whose reproduction sequence is defined by one playlist set 126S designated by the pointer 200PT, according to the post command 200PS. The post command 200PS may be a command to branch the contents information, a command to select a next title and so on. Additionally, it is possible to reproduce a next title element 200-2 to be reproduced after the presently reproduced title element 200-2, according to the "next information" included in other information 200-5.

Again in FIG. 3, the playlist information file 120 stores the playlist (P list) information table 121 indicating the logical structure of each playlist. This table 121 is divided into the playlist (P list) management information 122, the playlist (P list) set pointer 124, a plurality of playlist (P list) sets 126S (P list set #1-#n), and other information 128. In this playlist information table 121, the logical information of each playlist set 126S is stored in the order of the playlist set number. In other words, the order for storing the each playlist set 126S is the playlist set numbers. Furthermore, in the aforementioned title information table 114, the same playlist set 126S can be referred from a plurality of titles 200. That is, the playlist set #p in the playlist information table 121 may be pointed on the title information table 114, even in the case that title #q and title #r use the same playlist set #p.

As shown in FIG. 5, the playlist set 126S includes playlist set general information 126-1, a plurality of playlists 126 (playlist #1-#x), an item definition table 126-3, and other information 126-4. Each playlist 126 includes a plurality of playlist elements 126-2 (playlist element #1-#y), and other information 126-5. Furthermore, each playlist element 126-2 includes a pre-command 126PR, a pointer 126PT to item, a post command 126PS and other information 126-6.

The pointer 126PT as an example of the second pointer information according to the present invention indicates an item identification number defined by the item definition table 126-3 corresponding to the contents information to be reproduced on the basis of the playlist element 126-2 including the pointer 126PT. Incidentally, the pointer 126PT may be an item record position defined by the item definition table 126-3.

As shown in FIG. 6, with regard to the playlist set 126S, a plurality of items 204 is defined in the item definition table 126-3. They are commonly belonged to a plurality of playlists 126. Furthermore, as the playlist set general information 126-1, a name of each playlist 126 included in the playlist set 126S, UI (user interface information) such as a reproduction time, address information to each item definition table 126-3 and so on are recorded.

Again in FIG. 5, the pre-command 126PR as an example of the second pre-command according to the present invention indicates a command to be executed before reproduction of one item 204 designated by the pointer 126PT. The post command 126PS as an example of the second post command according to the present invention indicates a command to be executed after the reproduction of said one item 204. Other information 126-6 included in the playlist element 126-2 may include the next information to designate the playlist element 126-2 relating to the next reproduction of the reproduction of the playlist element 126-2.

As shown in FIG. 7, the item 204 is a minimum unit to be displayed. In the item 204, "in-point information" to indicate a start address of an object and "out-point information" to indicate an end address of the object are recorded. Incidentally, each of these "in-point information" and "out-point information" may indicate the address directly or indirectly as a time period or time point on the reproduction time scale. In the figure, if a plurality of ES's (Elementary Streams) is multiplexed for the object designated by "stream object #m", designating the item 204 means designating a special ES or special combination of ES's.

As shown in FIG. 8, the title element 200-2 logically consists of the pre-command 200PR or 126PR, the playlist set 126S selected by the pointer 200PT, the post command 200PS or 126PS, and the next information 200-6N. Therefore, a processing to select the playlist 126 from among the playlist set 126S is executed, according to any condition reproducible in a system, such as video resolution.

As shown in FIG. 9, however, if the playlist set designated by the pointer 200PT consists of only one playlist, i.e. if the playlist set 126S shown in FIG. 3 is replaced by a single playlist 126, the title element 200-2 logically consists of the pre-command 200PR or 126PR, the playlist 126 to be reproduced during the reproduction operation, the post command 200PS or 126PS, and the next information 200-6N. In this case, once the playlist set is designated for the reproduction, the single playlist 126 is reproduced, regardless of the condition reproducible in the system.

Again in FIG. 3, in the object information file 130, the storage position (i.e. the logical address of the reproduction object) in the object data file 140 for each item constructed in each playlist 126, and/or various attribute information relating to the reproduction of the item are stored. Particularly in this embodiment, the object information file 130 stores the AU table 131 including a plurality of AU (Associate Unit) information 1321 (AU #1-#q) as mentioned below, the ES (Elementary Stream) map table 134 and other information 135.

The object data file 140 stores a plurality of TS objects 142 for each transport stream (TS #1 object-TS #s object), i.e. entity data of contents to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 10, the TS object 142 shown in FIG. 3, as a logically reproducible unit, may be divided into a plurality of aligned units 143 each having 6 kB of data amount. The head of the aligned units 143 is aligned with the head of the TS object 142. Each aligned unit 143 is further divided into a plurality of source packets 144 each having 192 B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4 B of data amount to control the reproduction, such as the packet arrival time stamp or the like indicating the reproduction start time point of the TS (Transport Stream) packet on the reproduction time scale, and includes the TS packet 146 having 188 B of data amount. The TS packet 146 (also referred to as "TS packet payload") has a packet header 146a at its head portion. The video data may be packetized as the "video packet", the audio data may be packetized as the "audio packet", or the sub-picture data may be packetized as the "sub-picture packet", otherwise other data may be packetized.

Figure 11:
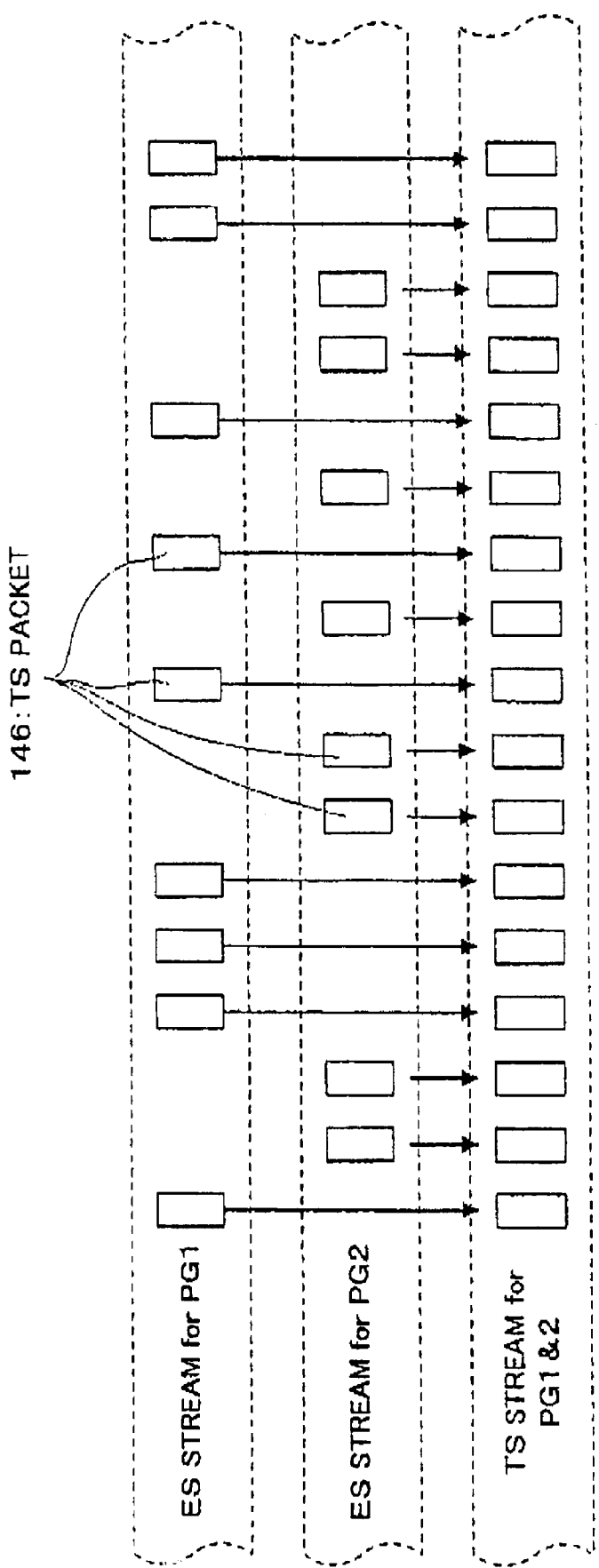
FIG. 11 is a view schematically illustrating a situation that an elementary stream for a program #1, shown in the upper column, and en elementary stream for a program #2, shown in the middle column, are multiplexed to form a transport stream for these two programs, on the basis of a time scale in a horizontal direction.
Figure 12:
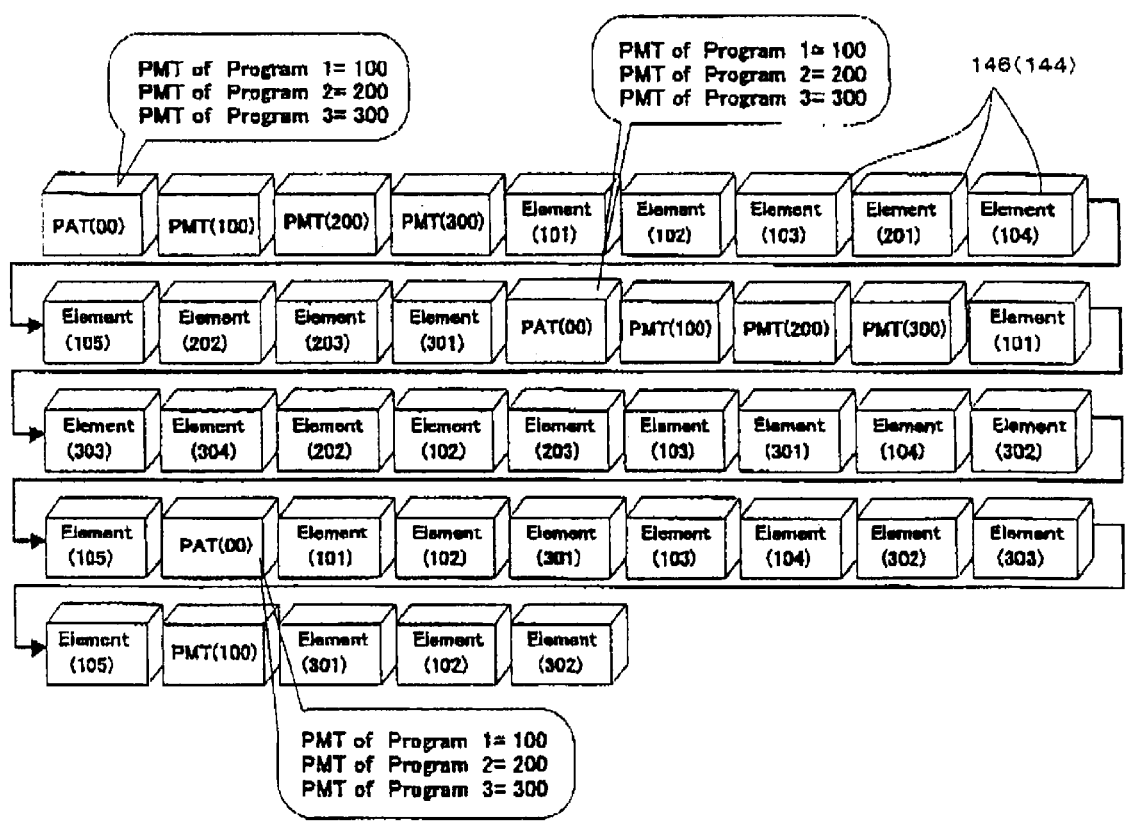
FIG. 12 is a conceptual view conceptually illustrating an image of TS packets multiplexed in one transport stream in the embodiment, as a packet arrangement based on the time scale.

Next, with reference to FIG. 11 and FIG. 12, an explanation is made on the multi-recording of the video data, the audio data, the sub-picture data and the like in the transport stream format as shown in FIG. 2(b), by the TS packet 146 shown in FIG. 4. FIG. 11 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 12 conceptually illustrates an image of the TS packets multiplexed in one transport stream (TS), as a packet array along the time axis.

As shown in FIG. 11, the elementary stream for program #1 (in the upper stage) may be formed by discretely arranging TS packets 146 obtained by packetizing the video data for program #1, along the time axis. The elementary stream for program #2 (in the middle stage) may be formed by discretely arranging TS packets obtained by packetizing the video data for program #2, along the time axis. Then, these TS packets 146 are multiplexed so that the transport stream (in the lower stage) for two programs is made. Incidentally, omitted for convenience of explanation in FIG. 11, the elementary stream made of TS packets obtained by packetizing the audio data and/or the sub-picture stream made of TS packets obtained by packetizing the sub-picture data may be multiplexed similarly as the elementary stream for program #1, as shown in FIG. 2(b). In addition to this, the elementary stream made of TS packets obtained by packetizing the audio data and the sub-picture stream made of TS packets obtained by packetizing the sub-picture data may be multiplexed similarly as the elementary stream for program #2.

As shown in FIG. 12, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 12, the TS packet 146 consisting of the data forming program #i (i=1, 2, 3) is indicated by "element (i0j)", wherein, j (j=1, 2, . . . ) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 is distinguished from each other even if they are multiplexed at the same time point.

Furthermore, in FIG. 12, the PAT (Program Association Table) and the PMT (Program Map Table) are also packetized by the TS packet 146 unit and multiplexed. The PAT among them stores a table indicating a plurality of PMT packet ID's. Particularly, the PAT is defined by MPEG2 standard so that (000) is given as a predetermined packet ID, as shown in FIG. 12. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 12 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 10. That is, when the transport stream as shown in FIG. 12 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 13:
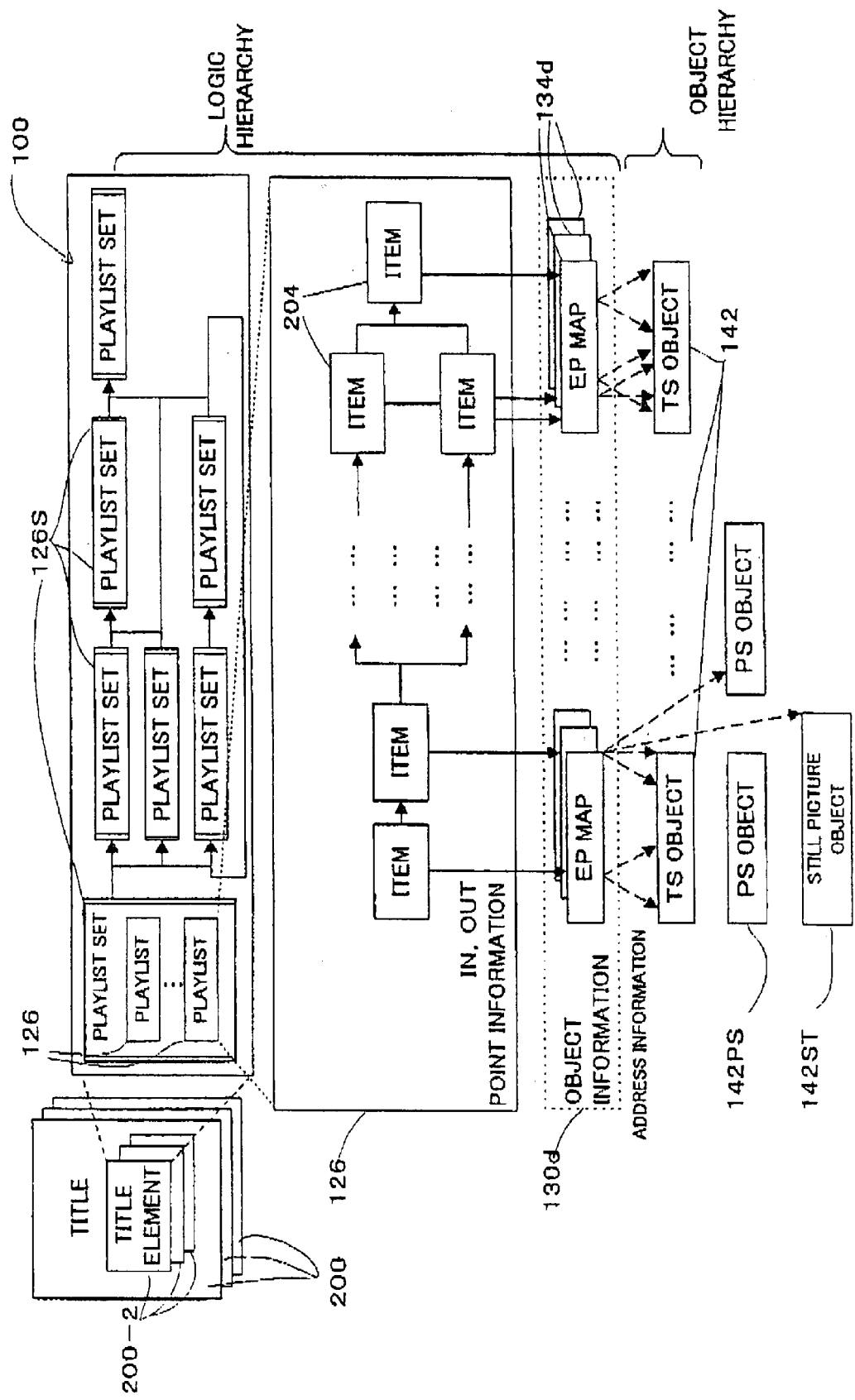
FIG. 13 is a view schematically illustrating a logic structure of data on an optical disc in the embodiment, focusing on development from a logic hierarchy to an object hierarchy or an entity hierarchy.

Next, with reference to FIG. 13, the logical structure of data on the optical disc 100 is discussed. FIG. 13 schematically illustrates the logical structure of data on the optical disc 100, focusing on the development from the logic hierarchy to the object hierarchy or the entity hierarchy.

In FIG. 13, one or more titles 200 that are a logical large unit such as one movie or one TV program are recorded onto the optical disc 100. Each title 200 includes one or more title elements 200-2. Each title element 200-2 logically consists of a plurality of playlist sets 126S. In each title element 200-2, the plurality of playlist sets 126S may have a sequential structure or may have a branch structure.

Incidentally, in the case of a simple logical structure, one title element 200 consists of one playlist set 126S. Furthermore, one playlist set 126S consists of one playlist 126. On the other hand, it is possible to refer to one playlist set 126S by a plurality of title elements 200-2 or a plurality of titles 200.

Each playlist 126 is logically made of a plurality of items (play items) 204. In each playlist 126, a plurality of items 204 may have the sequential structure or may have the branch structure. On the other hand, it is possible to refer to one item 204 by a plurality of playlists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, the ES address information 134d and the like required for the data search in the TS object 142 (Incidentally, the ES map table 134 shown in FIG. 3 includes a plurality of ES address information 134d).

Then, when the information record and reproduce apparatus reproduces the TS object 142 as mentioned below, a physical address to be reproduced in the TS object 142 is obtained from the item 204 and the object information 130d so that a desired elementary stream is reproduced.

Incidentally, the EP (Entry Pass) map including a plurality of ES address information 134d, shown within the object information of FIG. 13, herein indicates an object information table in which the AU table 131 and the ES map table 134 are listed.

Thus, in this embodiment, the in-point information and out-point information recorded on/in the item 204, as well as the ES address information 134d recorded in the ES map table 134 (see FIG. 3) of the object information 130d make it possible to perform the association from the logic hierarchy to the object hierarchy in the reproduction sequence so that the elementary stream is reproduced.

As discussed above, in this embodiment, units of the TS packet 146 are multiplexed and recorded on the optical disc 100. Thereby, the transport stream including a plurality of elementary streams as shown in FIG. 2(b) can be recorded onto the optical disc 100. In this embodiment, in the case that digital broadcasting is recorded onto the optical disc 100, a plurality of programs can be recorded at the same time, within the restriction of the record rate. Nevertheless, a record method is employed herein, in which a plurality of programs is multiplexed and recorded for one TS object 142. Now, an explanation is made on an embodiment of the information record reproduction apparatus capable of performing such a record processing.

(Information Record Reproduction Apparatus)

Figure 14:
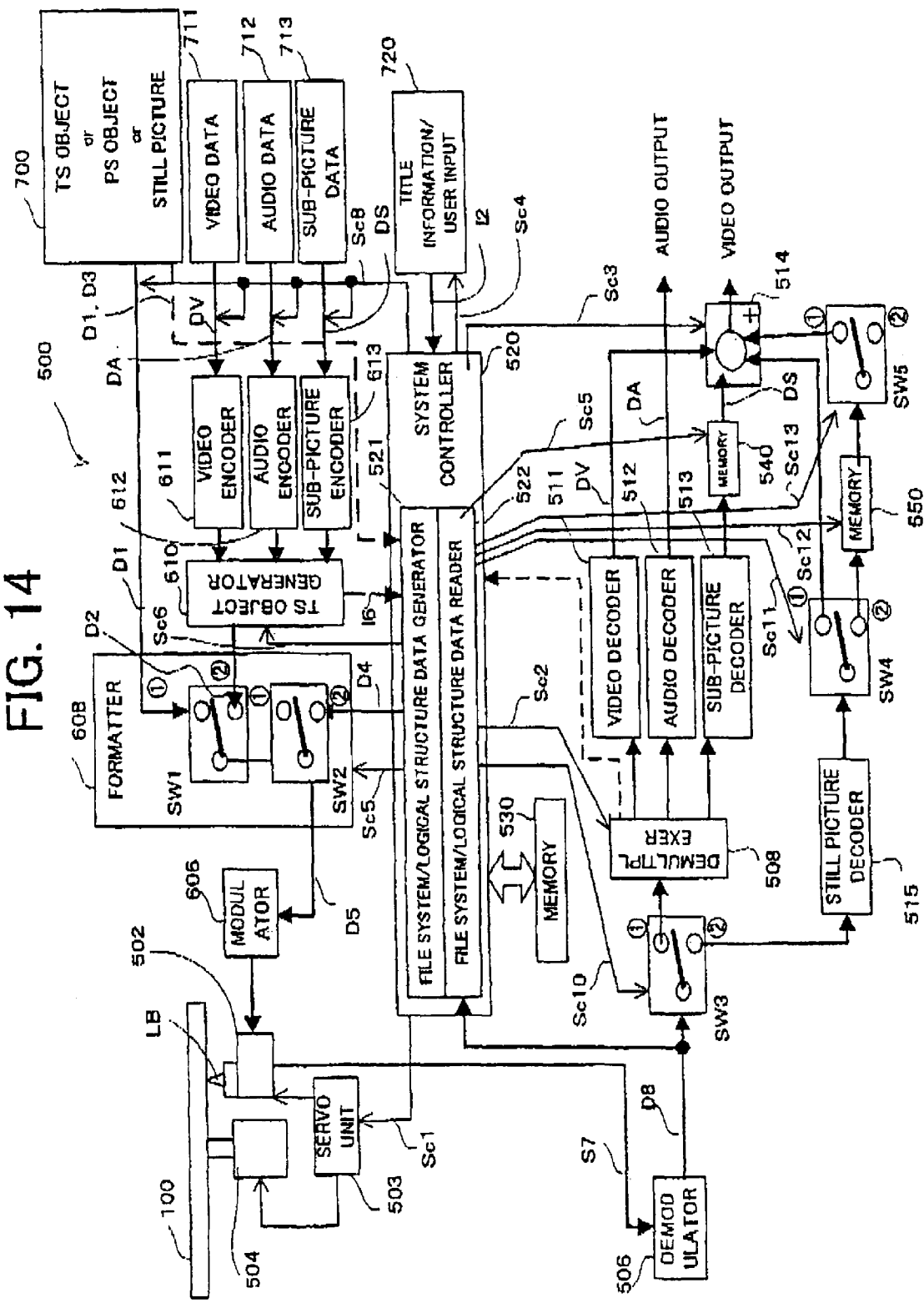
FIG. 14 is a block diagram schematically illustrating an information record reproduction apparatus in the embodiment.

Next, with reference to FIG. 14 to FIG. 19, an embodiment of the information record reproduction apparatus of the present invention is discussed. Here, FIG. 14 is a block diagram of the information record reproduction apparatus, and FIGS. 15 to 19 illustrate the operational flow.

In FIG. 14, the information record reproduction apparatus 500 is roughly divided into a reproduction system and a record system. The information record reproduction apparatus 500 is constructed to record the information onto the optical disc 100 mentioned above and to reproduce the information recorded thereon/therein. In this embodiment, the information record reproduction apparatus 500 is thus for recording and reproduction. Nevertheless, an embodiment of the information record apparatus according to the present invention can be constructed basically with the record system of the information record reproduction apparatus 500 and an embodiment of the information reproduction apparatus according to the present invention can be constructed basically with the reproduction system of the information record reproduction apparatus 500.

The information record reproduction apparatus 500 is provided with: an optical pickup 502; a servo unit 503; a spindle motor 504; a decoder 506; a demultiplexer 508; a video decoder 511; an audio decoder 512; a sub-picture decoder 513; an adder 514; a still picture decoder 515; a system controller 520; a memory 530; a memory 540; a memory 550; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the decoder 506, the demultiplexer 508, the video decoder 511, the audio decoder 512, the sub-picture decoder 513, the adder 514, the still picture decoder 515, the memory 540 and the memory 550 mainly constructs the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, a TS object data source 700 (or a PS object data source 700, or a still picture data source 700 such as bit map data, JPEG data and the like); a video data source 711; an audio data source 712; and a sub-picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 14 to FIG. 18, a specific structure and the operation of each constitutional element constructing the record system of the information record and reproduction system 500 is explained in each case.

(i-1) In the Case that the Already Generated TS Object is Used

Figure 15:
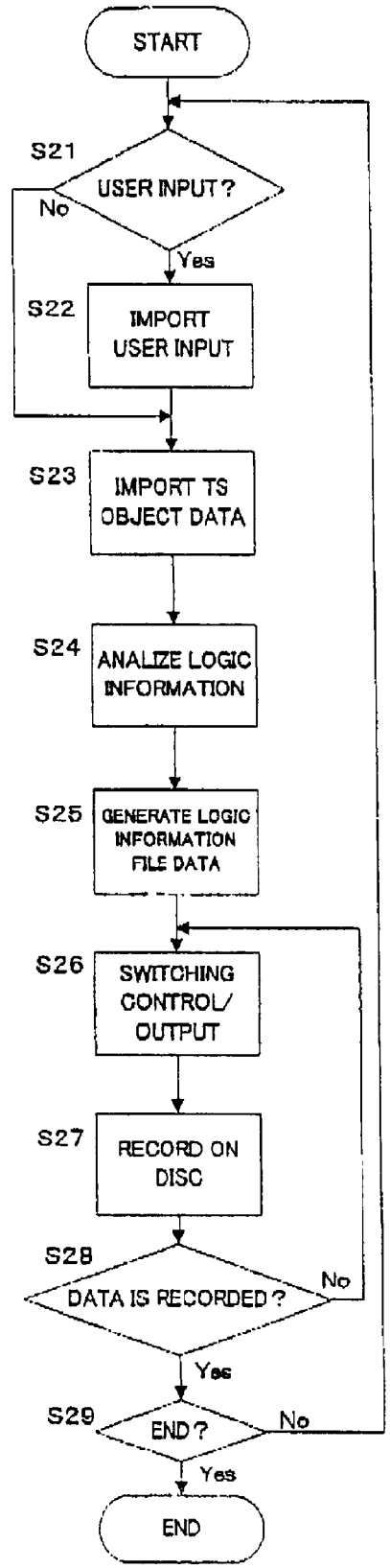
FIG. 15 is a flow chart indicating a recording operation (part 1) of the information record reproduction apparatus in the embodiment.

This case is discussed, with reference to FIG. 14 and FIG. 15.

In FIG. 14, the TS object data source 700 may be made of the storage device such as a video tape, a memory, for storing the TS object data D1.

Firstly in FIG. 15, each title information (e.g. playlist contents etc.) to be logically constructed on the optical disc 100 using the TS object data D1 is inputted into the system controller 520, as the user input I2 such as the title information, via the user interface 720. Then, the system controller 520 imports the user input I2 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23), and performs the data array analysis (e.g. a record data length and the like) of the TS object data D1, the analysis of each elementary stream structure (e.g. understanding of ES_PID (elementary stream/packet identification number)), on the basis of the PAT, the PMT and the like packetized with the video data as mentioned above, due to the TS analysis feature in the file system/logical structure data generator 521 (step S24).

Next, the system controller 520 makes the file system/logical structure data generator 521 generate the disc information file 110, the playlist information file 120, the object information file 130 and the file system 105 (see FIG. 3), as the logical information file data D4, on the basis of the analysis result of each elementary stream and the TS object data D1 data array, as well as the user input I2 such as the imported title information (step S25). The memory 530 is used to generate this logical information file data D4.

Incidentally, variations in which the data about structure information of each elementary stream and the data array of the TS object data D1 may be prepared in advance are naturally understood or suggested, all of which are encompassed within a scope of the embodiment.

In FIG. 14, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to a ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 15, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selected output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding TS object data D1 have not been completely recorded yet, the operational flow returns to the step S26 to continue the recording (step S28: No). Incidentally, there is no preference in the record order of the logical information file data D4 and the corresponding object data D1.

On the other hand, if the both have been already recorded, it is judged whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Incidentally, the example in FIG. 15 shows that the logical information file data D4 and the corresponding TS object data D1 are outputted at the step S26, after preparing the logical information file data D4 at the step S25. However, it is also possible to output the TS object data D1 and/or record the TS object data D1 onto the optical disc 100 before the step S25, so that the logical information file data D4 is generated and/or recorded after or in parallel with this recording.

Additionally, a PS object data source or a still picture data source may be used instead of the TS object data source 700. In this case, the recording processing the same as in the case of the TS object data D1 as mentioned above is performed for the PS object data, or the sill picture data such as bit map data, JPEG data and the like, instead of the TS object data D1. Furthermore, instead of the TS object 142, the PS object data or the still picture data is stored in the object data file 140. Then, various logical information about the PS object data or the still picture data is generated under control of the system controller 520, and stored in the disc information file 110, the playlist information file 120, the object information file 130 and the like.

(i-2) The Case of Receiving and Recording the Transport Stream on Air

Figure 16:
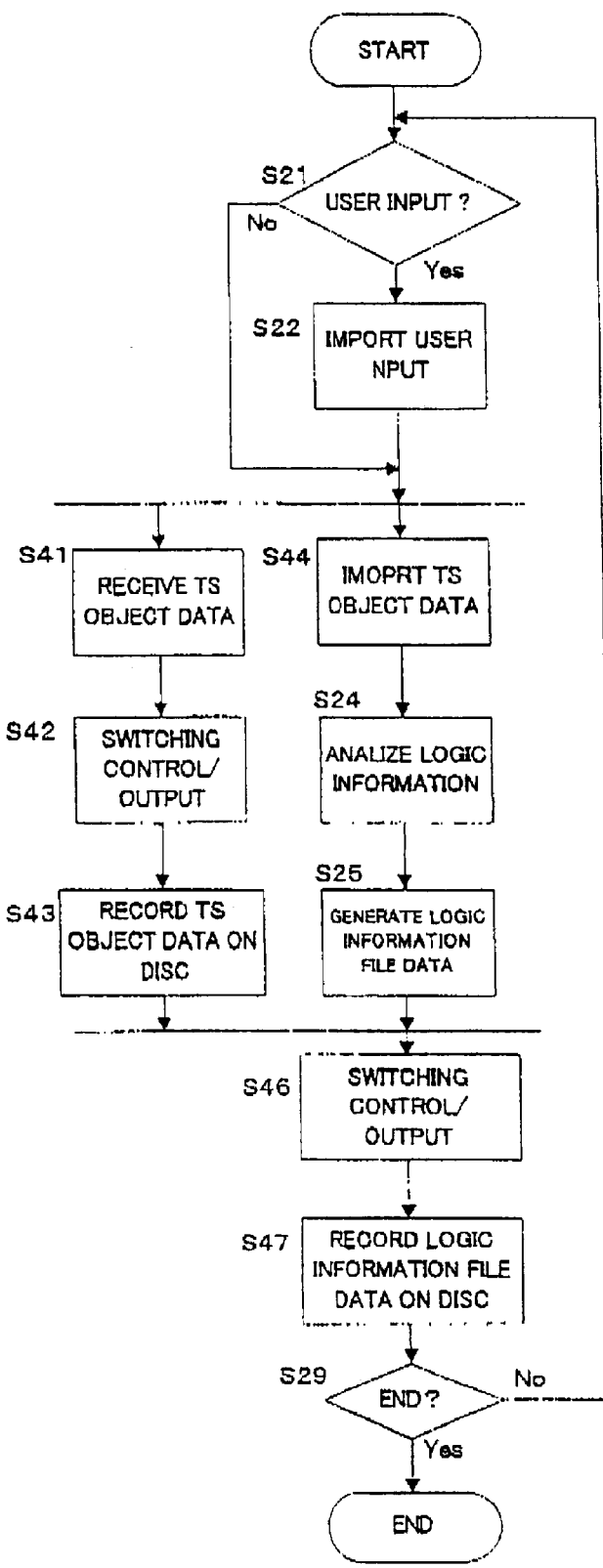
FIG. 16 is a flow chart indicating a recording operation (part 2) of the information record reproduction apparatus in the embodiment.

This case is explained with reference to FIG. 14 and FIG. 16. Incidentally, in FIG. 16, the same steps as those in FIG. 15 have the same step reference numbers, and their explanation is omitted as occasion demands.

Again, in this case, the similar processing is performed, as is "the case of using the already prepared object" described above. Therefore, the following explanation is focused on the differences from the above case.

In the case of receiving and recording the transport stream on air, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the below mentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Incidentally, if all the reception data obtained when broadcasting is once stored into an archive apparatus, and then, if this is used as the object source 700, the same processing as that in "the case of using the already prepared TS object" will do.

Figure 17:
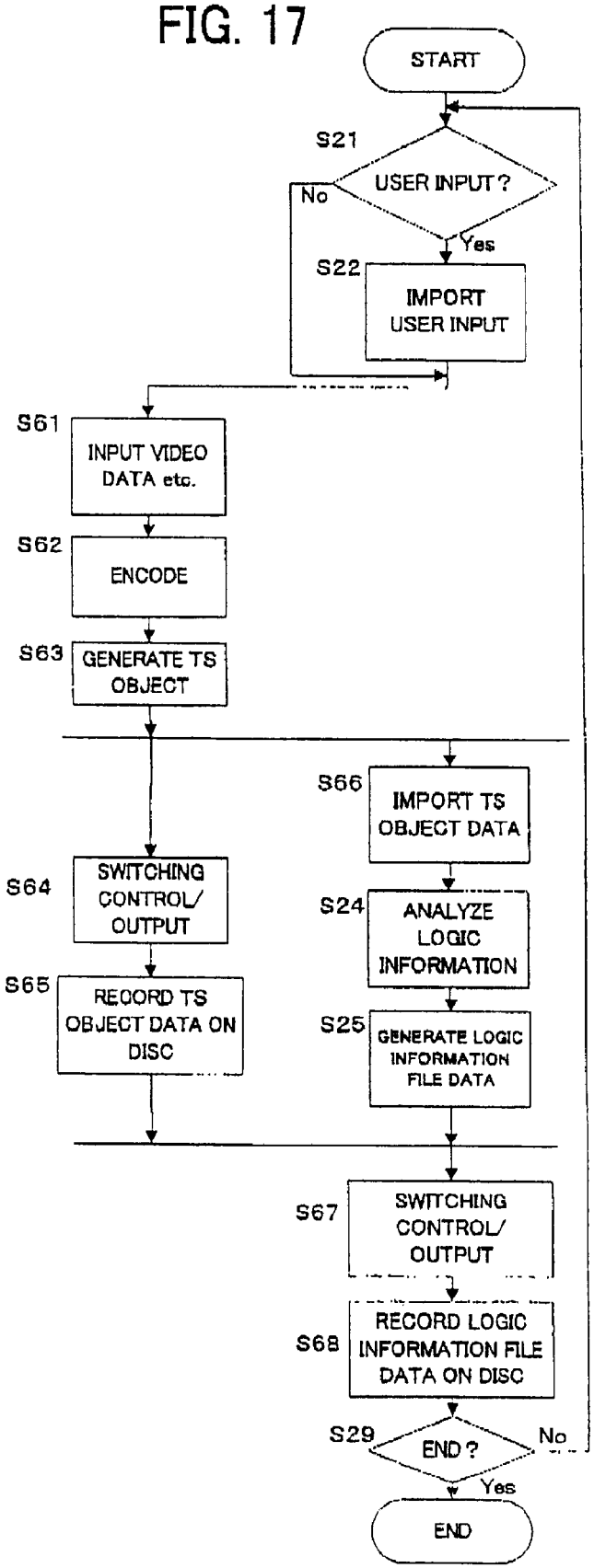
FIG. 17 is a flow chart indicating a recording operation (part 3) of the information record reproduction apparatus in the embodiment.

(i-3) The Case of Recording the Video Data, the Audio Data and the Sub-Picture Data This case is explained with reference to FIG. 14 and FIG. 17. Incidentally, in FIG. 17, the same steps as those in FIG. 15 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted as information I6 from the TS object generator 610 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported as the information I6 into the memory 530, the file system/logical structure data generator 521 prepares the logical information file data D4 (step S24 and step S25). Then, after the completion of recording a series of the TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 18:
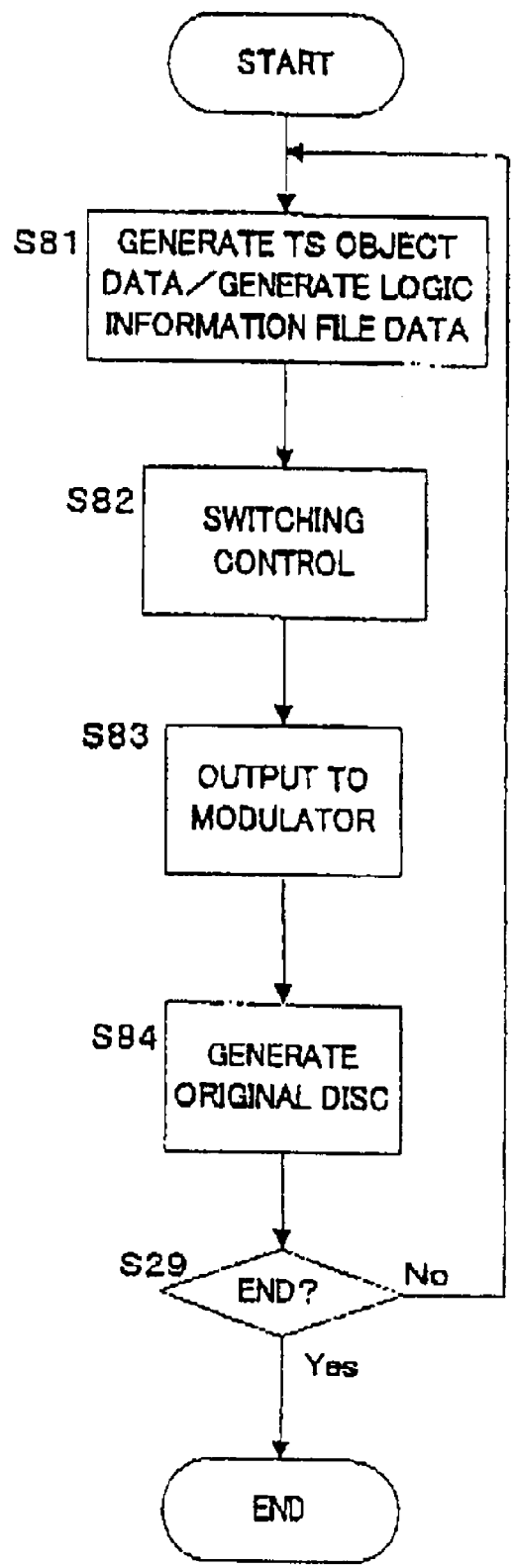
FIG. 18 is a flow chart indicating a recording operation (part 4) of the information record reproduction apparatus in the embodiment.

This case is explained with reference to FIG. 14 and FIG. 18. Incidentally, in FIG. 18, the same steps as those in FIG. 15 have the same step reference numbers, and their explanation is omitted as occasion demands.

In this case, by combining the above described three types of record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 14 and FIG. 19.

In FIG. 14, via the user interface 720, the title to be reproduced from the optical disc 100, its reproduction condition and the like are inputted to the system controller 520, as the user input I2 such as the title information and the like. In this case, under control of the control signal Sc4 from the system controller 520, the input processing suitable for the content to be reproduced, such as a selection processing on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, depending on whether the TS object data is included as the multiplexed information part in the demodulated data D8, or whether the still picture data is included, or whether both data are included, the shift switch Sw3 is shifted to ① side (demultiplexer 508 side) or shifted to ② side (still picture decoder 515 side), under control of the control signal Sc10 from the system controller 520. Thereby, the TS object data is selectively supplied to the demultiplexer 508, and the still picture data is selectively supplied to the still picture decoder 515.

Then, as for the TS object data included as the multiplexed information part in the demodulated data D8, the demultiplexer 508 demultiplexes the TS object data, under control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, the video data DV, the audio data DA and the sub-picture data DS are decoded, respectively. In this case, the sub-picture data DS is supplied to the adder 514 via the memory 540. The sub-picture data DS is outputted from the memory 540, selectively or at a predetermined timing, under control of the control signal Sc5 from the system controller 520, so as to be super-imposed on the video data DV, if needed. That is, in comparison with a case that the sub-picture data outputted from the sub-picture decoder 513 is directly super-imposed, it is easy to control the timing of the super-imposing, or to judged the need for the super-imposing. For example, under output control of the control signal Sc5, it is possible to select whether or not a caption using the sub-picture is displayed over the main-picture, or whether or not a menu screen using the sub-picture is displayed.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

In the case that the still picture data is included in the decoded data D8, the still picture data is supplied to the still picture decoder 515, via the shift switch Sw3 controlled by the control signal Sc10 from the system controller 520, instead of or in addition to such a reproduction operation or processing of the video data DV or the sub-picture data DS. Then, the still picture data such as the decoded bit map data, JPEG data and the like is directly added to the adder 514 via the shift switch Sw4, under control of the control signal Sc11 from the system controller 520. Alternatively, it may be temporarily stored in the memory 550 via the shift switch Sw4. The still picture data is outputted from the memory 550, selectively or at a predetermined timing, under control of the control signal Sc12 from the system controller 520, and then supplied to the adder 514 via the shift switch Sw5. Thereby, if needed, the still picture is super-imposed over the video data DV or the sub-picture data DS. That is, in comparison with a case that the still picture data outputted from the still picture decoder 515 is directly super-imposed, it is easy to control the timing of the super-imposing, or to judge the need for the super-imposing. For example, under output control of the control signal Sc12, it is possible to select whether or not a still picture such as a menu screen or a window screen using the still picture data or a still picture as a background image using the still picture data is displayed over the main-picture or the sub-picture.

Additionally, under control of the control signal Sc13 from the system controller 520, the still picture data may be outputted via another route (not shown), with the aid of the shift switch Sw5 shifted to ② side. Alternatively, no still picture data may be outputted from the shift switch Sw5 shifted to ② side.

Here, the specific example of a reproduction processing routine by the system controller 520 is explained with reference to a flow chart of FIG. 19.

Figure 19:
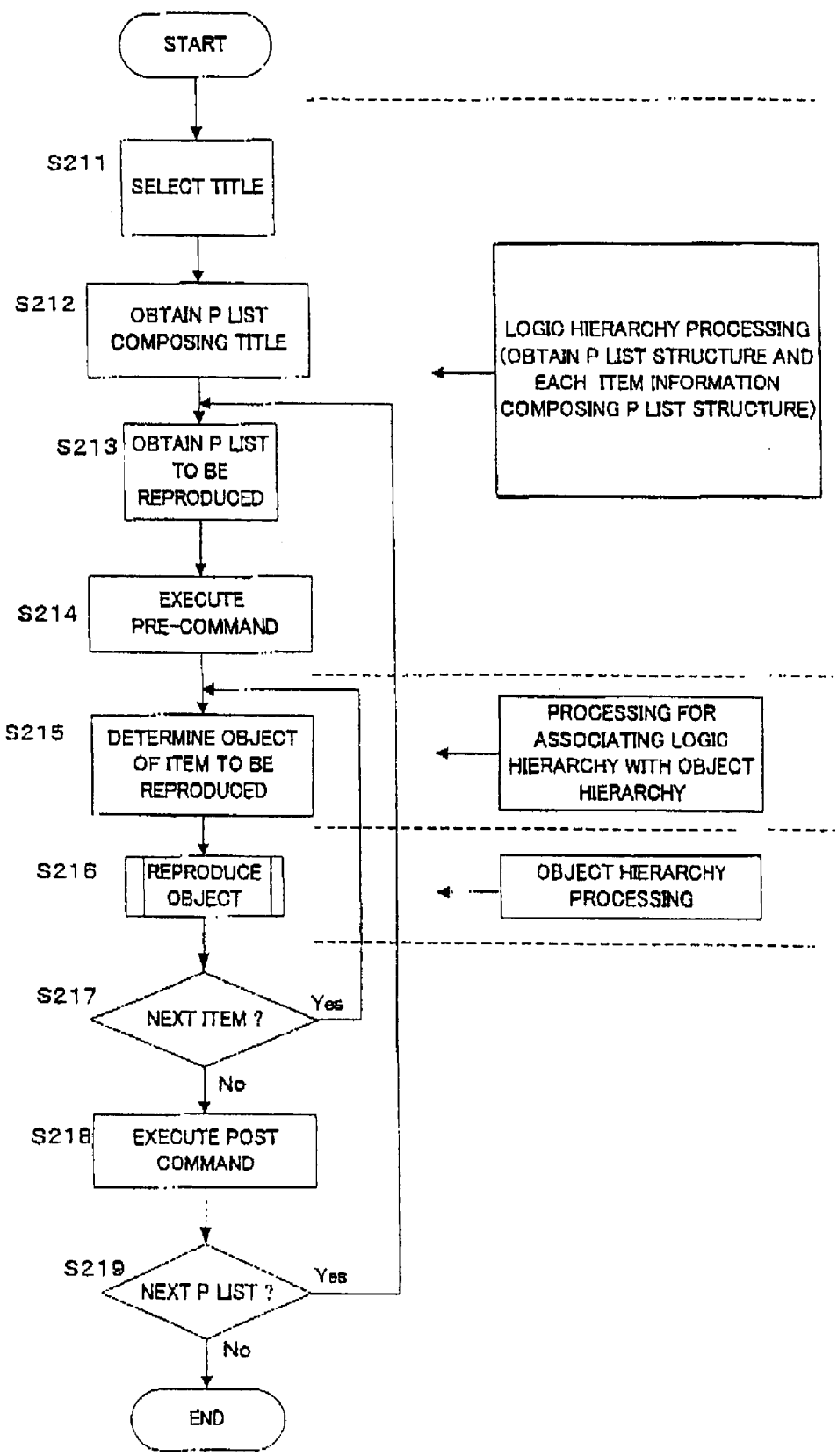
FIG. 19 is a flow chart indicating a reproduction operation of the information record reproduction apparatus in the embodiment.

In FIG. 19, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. Here, an explanation is made on the operational flow after obtaining the total number of the total titles from the disc general information 112 in the disc information file 110 and then choosing or selecting one title from among them.

Firstly, the choice or selection of the title is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (see FIG. 4) may be selected from among a whole title elements 200-2 composing the title 200, with the aid of an external input operation by the user with using a remote controller and the like, or one title element 200-2 may be selected automatically depending on a system parameter or the like adjusted for the information record reproduction apparatus 500.

Then, contents of a plurality of playlists 126 composing a playlist set 126S corresponding to the selected title 200 (title element 200-2) are obtained. Here, as a processing at a logic hierarchy, the information about the each playlist 126 structure and each item composing each playlist (see FIG. 5, FIG. 6 and FIG. 13) is obtained (step S212).

Then, contents of the playlist 126 to be reproduced is obtained from among a plurality of playlists 126 obtained at step S212. For example, herein, the reproduction is started from a playlist #1, and the contents of the corresponding playlist 126 is obtained (step S213). The contents of the playlist 126 may be one or more playlist elements 126-2 (see FIG. 5), which are obtained by the obtaining processing at step S213.

Then, the pre-command 126PR (see FIG. 5) included in this playlist 126 is executed (step S214). Incidentally, it is possible for the pre-command 126PR to select one from among a plurality of playlists 126, which compose the playlist set 126S with a certain relationship of the plurality of playlists 126. If the playlist element 126-2 composing the playlist 126 does not have the pre-command 126PR, this processing is omitted.

Then, the TS object 142 (see FIG. 3 and FIG. 10) to be reproduced is determined (step S215), on the basis of the item 204 (see FIG. 5 to FIG. 7) identified by the playlist 126 obtained at step S213. More specifically, on the basis of the item 204, the object information file 130 (see FIG. 3) relating to the TS object 142 as the reproduction target is obtained and a stream number, address and the like of the TS object 142 to be reproduced are identified.

Incidentally, in this embodiment, also the belowmentioned AU (Association Unit) information 132I and PU (Presentation Unit) information 302I are obtained as the information stored in the object information file 130. On the basis of these informations, the aforementioned logic hierarchy is associated with the object hierarchy (see FIG. 13).

Then, the reproduction of the TS object 142 determined at step S215 is actually started. That is, on the basis of the processing at the logic hierarchy, the processing at the object hierarchy is started (step S216).

During the reproduction of the TS object 142, it is judged whether or not the next item 204 composing the playlist 126 to be reproduced exists (step S217). Then, insofar as the next item 204 exists (step S217: Yes), the process goes back to the step S215 to repeat the aforementioned determination and the reproduction of the TS object 142.

On the other hand, at the judgement at step S217, if it is judged that the next item 204 does not exist (step S217: No), the post command 126PS (see FIG. 5) corresponding to the presently executed playlist 126 is executed (step S218). Incidentally, if the playlist element 126-2 composing the playlist 126 does not have the post command 126PS, this processing is omitted.

Then, it is judged whether or not the next playlist 126 composing the selected title 200 exists (step S219). If exists (step S219: Yes), the process goes back to the step S213 to repeat the processing of obtaining the playlist 126 to be reproduced and the subsequent processings.

On the other hand, at the judgement at step S219, if it is judged that the next playlist 126 does not exist (step S219: No), i.e. if the all playlists 126 to be reproduced corresponding to the title 200 selected at step S211 are completely reproduced, a series of reproduction operations or processings is terminated.

As discussed above, the information record reproduction apparatus 500 in this embodiment reproduces the optical disc 100.

Particularly in this embodiment, (i) with regard to the structure and operation of the record system mentioned above, the object data file 140 is recorded so that the sub-picture stream or the control information stream, which are elementary streams relating to the sub-picture, includes the SP data (still picture data) and the SP control information to control various displays of the sub-picture data.

Particularly in this embodiment, (ii) with regard to the structure and operation of the reproduction system, when the object is determined and reproduced at steps S215 and S216, the SP data and the SP control information recorded in the sub-picture stream or the control information stream are reproduced, and thereby various display controls can be achieved including the motion control, the shadow dropping control, the highlight button control and so on of the sub-picture with using the sub-frame. These various display controls of the sub-picture will be discussed later in detail.

(Selection Scheme of Playlist in Playlist Set)

In this embodiment, the playlist 126 corresponding to the desired contents information is suitably selected from the playlist set 126S included in the reproduced playlist information file 120.

Such a selection of the playlist may be performed in accordance with a selection condition, if the pre-command 200PR (see FIG. 4) included in the title element 200-2 is provided with a list of playlist selection commands in which selection conditions are recorded for each playlist 126. The selection of the playlist may be performed in accordance with the attribute information added to each playlist 126 stored in the playlist set 126S (e.g. the information to indicate the attribute of the contents information relating to the playlist, including the video resolution for the video performance, whether progressive or interlace, the video codec, the audio channel number, the audio codec and so on). Alternatively, the selection of the playlist may be performed in accordance with the playlist set control information to store selection conditions for each playlist. Due to these selections, for example, the desired program, the desired parental block, the desired angle block and so on, which correspond to the desired contents information, can be selected. Alternatively, for example, a selection of the playlist can be achieved, so that the playlist displayable by the information reproduction system is selected, and the video reproduction performance or the audio reproduction performance of the information reproduction system is fully exerted.

(Various Display Controls of Sub-Picture)

Now, with reference to FIG. 20 to FIG. 47, an explanation is made on various display controls of the sub-picture with using the SP data and the SP control information.

Figure 21A:
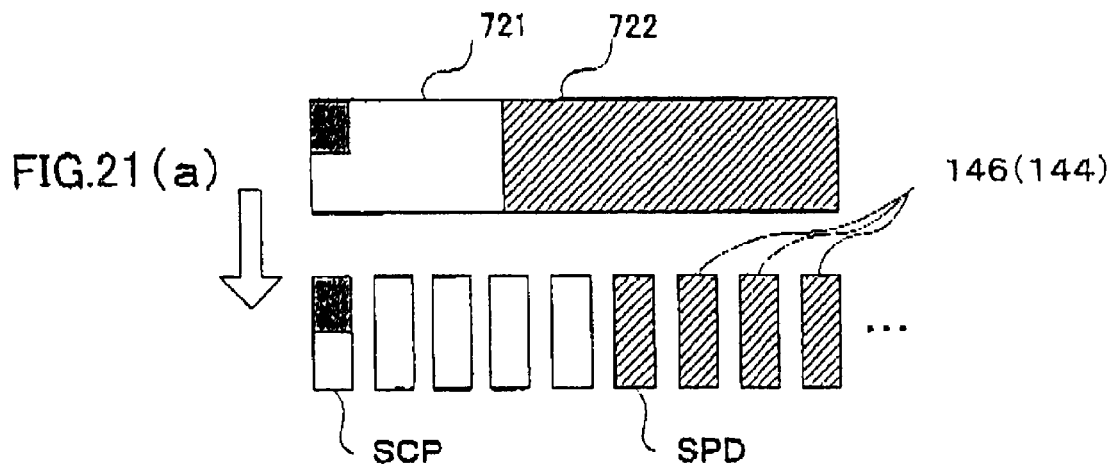
FIG. 21 is a conceptual view showing three types of sub-picture structures, constructed from the SP control information and the SP data structure shown in FIG. 20.
Figure 21B:
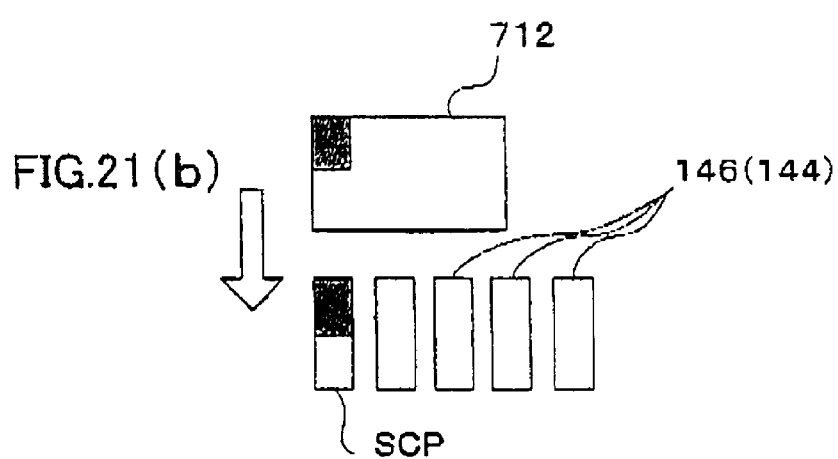
Figure 21C:
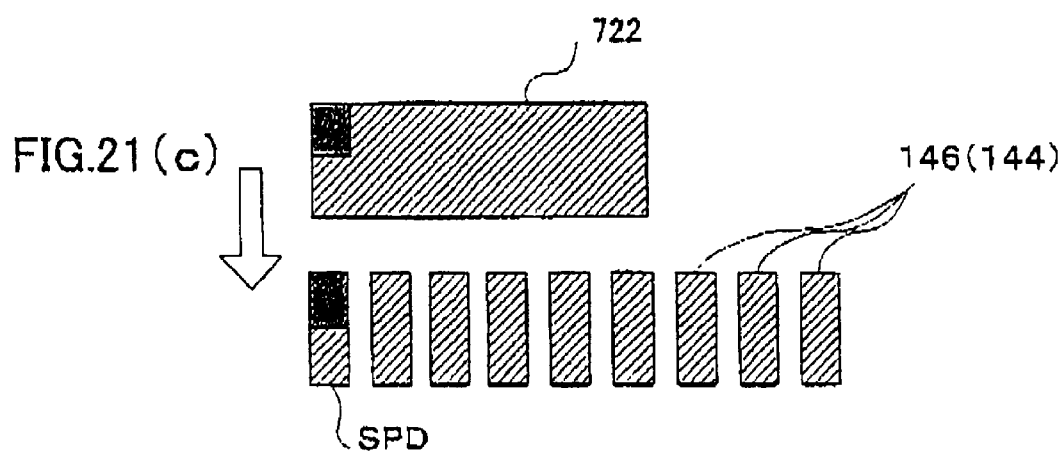
Figure 22:
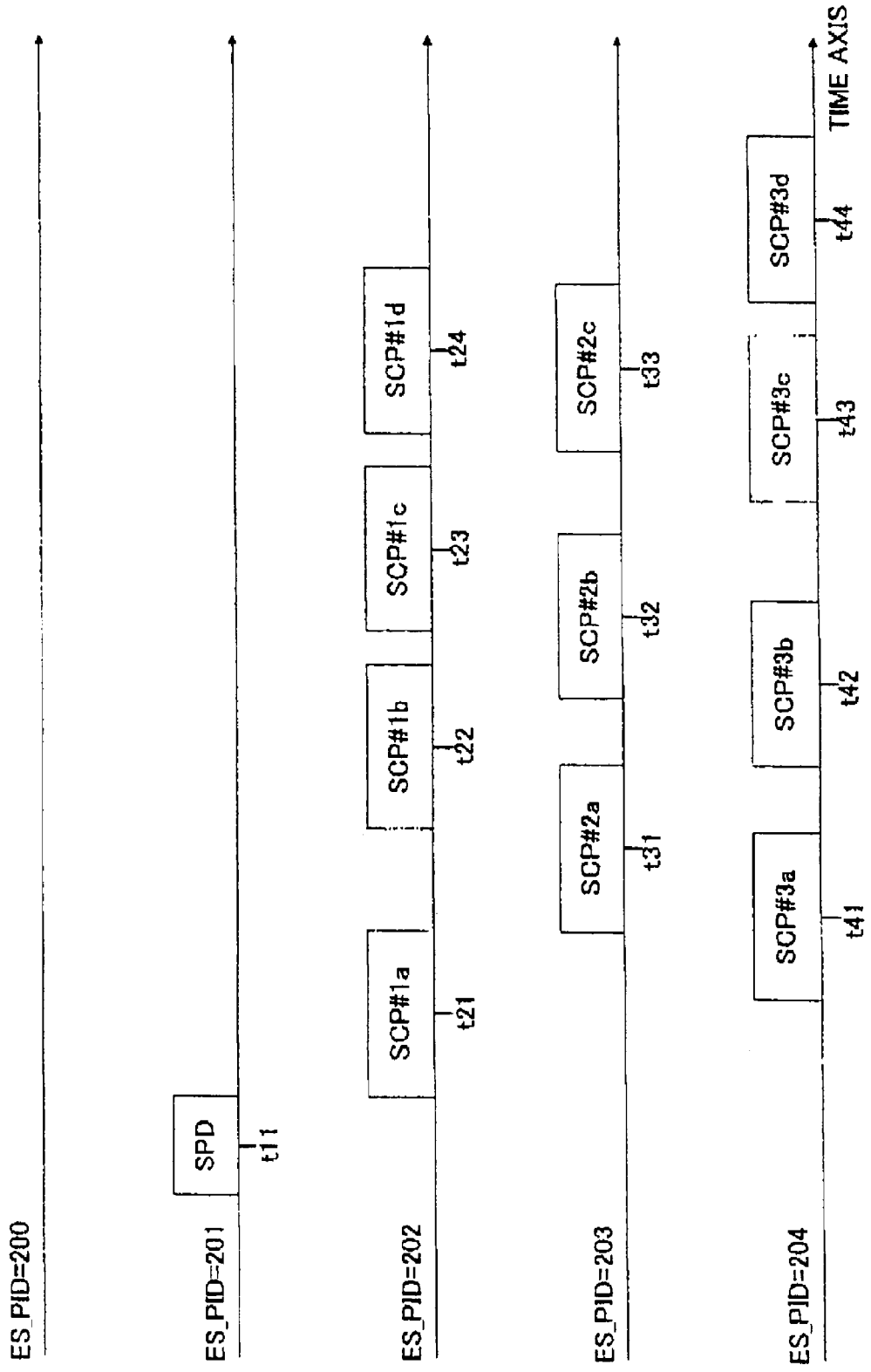
FIG. 22 is a schematic diagram showing a relationship among a SPD stream and a plurality of SCP streams, along a reproduction time scale.

Firstly, with reference to FIG. 20 to FIG. 22, an explanation is made generously on the structure and control of the sub-picture data used to perform these various display controls of the sub-picture. From among them, the SP control information is discussed later in detail with reference to drawings from FIG. 23. FIG. 20(a) conceptually shows a specific example of the data structure of the SP control information to control the sub-picture data, and FIG. 20(b) conceptually shows a specific example of the SP data structure including the SP data as the still picture data consisting the main body of the sub-picture data. FIG. 21 shows schematically three types of sub-picture structures composed of the SP control information and the SP data structure. FIG. 22 shows schematically a relationship between a SPD stream and a plurality of SCP streams along the reproduction time scale.

In this embodiment, in FIG. 14, the sub-picture data decoded by the sub-picture decoder 513 is temporarily recorded into the memory 540 acting as a buffer. Then, at least one of the SP data (still picture data) and the SP control data information (still picture control data) included in the temporarily recorded sub-picture data is read under control by the control signal Sc5 from the system controller 520. Then, by acting the SP control information on the SP data, the still picture display is performed as all or part of the video output.

As shown in FIG. 20(a), the SP control information 721 has a SCP header and SF control parameters. The "SCP header" is made of a SP data identifier to specify the SP data corresponding to the control object of the SP control information 721, the information to indicate the record position of the SP data and other information. The "SF control parameters" are made of a plurality of parameters to control the SP data for each sub-frame unit (SF unit) which is a part of an image cut out as at least a part of an image defined by the SP data. More specifically, the "SF control parameters" include parameters to indicate the display start time point or the display end time point of the SF data by means of the PTS (Presentation Time Stamp) and the like. Still more specifically, the "SF control parameters" include various parameters to indicate various conditions, such as the display time, the cut out range of the sub-picture or the display position thereof, the scaling, the rotation and so on.

As shown in FIG. 20(b), the SP data structure 722 has the structure information and the SP data (main body or entity of the still picture data). The "structure information" is made of the identifier to identify or specify the SP data, and other information such as the length of the SP data. The "SP data" has image data and the like in JPEG format or bit map data format subjected to a run length encoding, for example.

Therefore, when the sub-picture data is reproduced, various reproduction controls are performed with using the sub-frame, on the basis of the SF control parameter shown in FIG. 20(a), for each sub-frame unit obtained by cutting out at least a part of the SP data shown in FIG. 20(b).

As shown in FIG. 21, the SP control information 721 and the SP data structure 722 are packetized into a plurality of TS packets 146 (see FIG. 10) and multiplexed. The TS packet 146 for storing therein the head portion of the SP control information 721 in the sub-picture structure is referred to as a "SCP", and the TS packet 146 for storing therein the head portion of the SP data structure 722 in the sub-picture structure is referred to as a "SPD".

As shown in FIG. 21(a), both the SP control information 721 including the SCP and the SP data structure 722 may be regarded as one sub-picture structure and divided into the plurality of TS packets 146. As shown in FIG. 21(b), the SP control information 721 including the SCP may be regarded as one sub-picture structure and divided into the plurality of TS packets 146. As shown in FIG. 21(c), the SP data structure 722 including the SPD may be regarded as one sub-picture structure and divided into the plurality of TS packets 146.

In the embodiment, for example, with respect to the SP data in the SP data structure 722 recorded on a SPD stream, the SP control information recorded on a SCP stream different from the SPD stream is operated, to thereby perform the reproduction control of the still picture. In this case, there may be only one or a plurality of SCP streams which operates with respect to one SPD stream. Recording the two types of streams onto mutually different elementary streams allows efficient reproduction control. Moreover, operating a plurality of SP control information on a plurality of SCP streams, with respect to the SP data on one SPD stream, allows more efficient reproduction control.

More specifically, as shown in FIG. 22, at a time point t11 during reproduction of a video stream (Video 1) of "ES_PID=200", the reading of the SP data (SPD1) on a SPD stream of "ES_PID=201" is started, and it is stored into the memory 540 of the information record/reproduction apparatus 500 (refer to FIG. 14). Then, the stored SP data is stored until a set end time point, for example, or is stored until the reading a next sub-picture is started.

In FIG. 22, on a SCP stream (SCP1) of "ES_PID=202", SCP#1a, SCP#1b, SCP#1c and SCP#1d are provided in timing of a time point t21, a time point t22, a time point t23 and a time point t24, respectively. On a SCP stream (SCP2) of "ES_PID=203", SCP#2a, SCP#2b and SCP#2c are provided in timing of a time point t31, a time point t32 and a time point t33, respectively. On a SCP stream (SCP3) of "ES_PID=204", SCP#3a, SCP#3b, SCP#3c and SCP#3d are provided in timing of a time point t41, a time point t42, a time point t43 and a time point t44, respectively.

However, in addition to such reproduction control of the still picture, it is possible that with respect to the SP data in the sub-picture data structure recorded on the sub-picture stream, the SP control information in the sub-picture structure recorded on the same stream is operated, to thereby perform the reproduction control of the still picture. Namely, both the SP control information 721 and the SP data structure 722 may be recorded into only one sub-picture stream, to thereby operate the SP control information 721 to the SP data structure 722.

In any case, by sharing or using many times the SP data provided as the bit map data and JPEG data which have a large data amount, it is possible to save a limited recording capacity on the disc, which allows more efficient reproduction and display processing. In addition, in any case, it is possible to superimpose such a sub-picture onto a motion picture or main-video which is based on the video data recorded in another video stream.

Now, with reference to FIG. 23 to FIG. 27, an explanation is made on the data structure of the SP control information. FIG. 23 to FIG. 27 consist a series of tables to indicate a structure of the sub-picture control packet in which the SP control information of this embodiment is stored. Incidentally, in the series of tables shown from FIG. 23 to FIG. 27, the data structure is shown in a plurality of hierarchical stages, focusing on the data structure of the embodiment of this invention. Therefore, items which does not directly relate to the embodiment of this invention are indicated as "others" or "other information(s)". However, new items may be added if needed.

Figure 23:
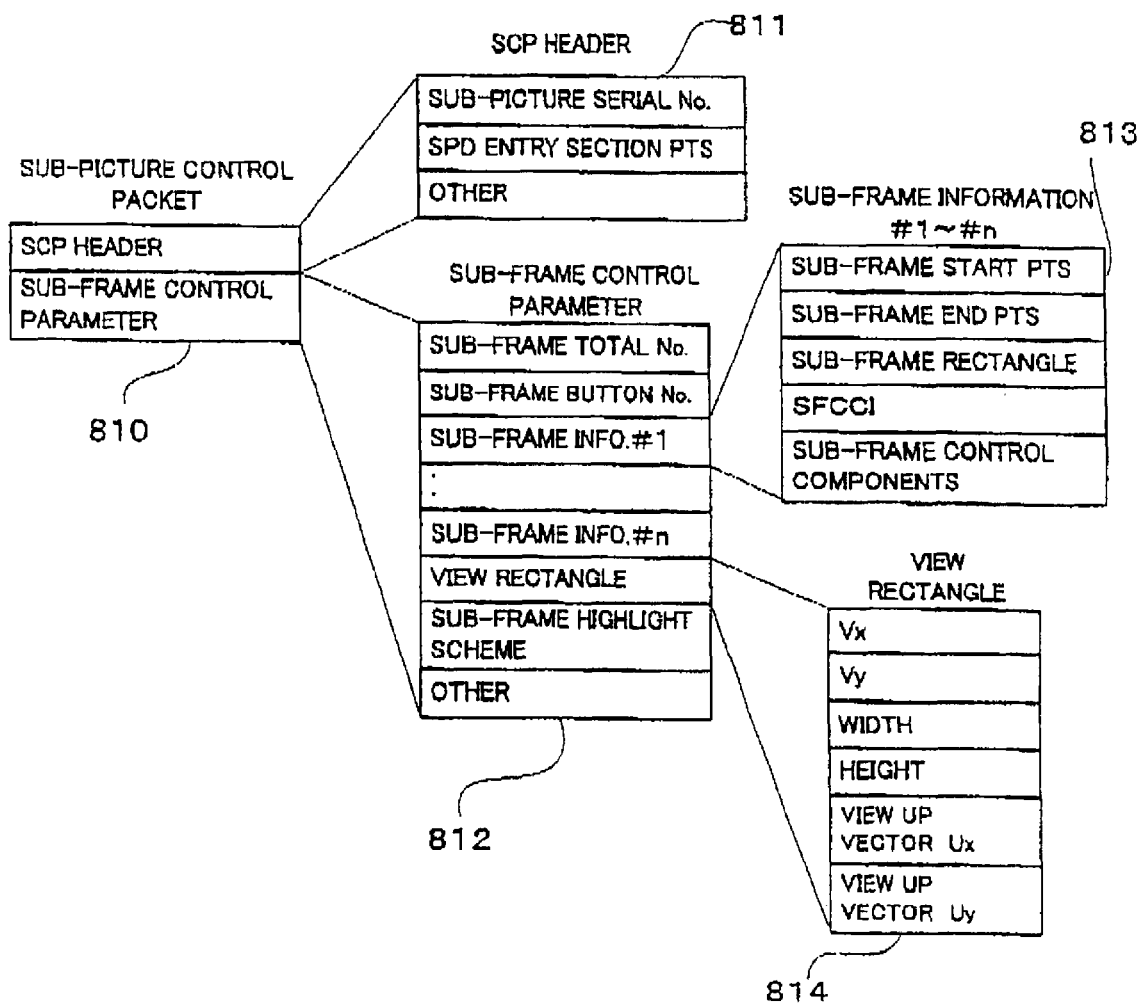
FIG. 23 is a set of tables indicating a structure of the sub-picture control packet in the embodiment.

Firstly, as shown in FIG. 23, the sub-picture control packet (table) 810 includes the SCP header 811 and the sub-frame control parameters 812, as an example of the SP control information. Incidentally, as mentioned above, the sub-picture control packet 810 is made of a plurality of TS packets in which SCP is disposed at a head portion of them on the control information stream or the sub-picture stream.

In FIG. 23, as shown in an upper portion of the central column, the SCP header (table) 811 includes the information about the sub-picture control packet 810, specifically a sub-picture series identification number, SPD (SP data) entry section PTS's and others.

In the SCP header 811, the sub-picture series identification number defines a continuity of the sub-pictures. Relating to this, a certain SPD and a group of SCP's acting on the SPD are referred to as a sub-picture sequence. On the other hand, the SPD entry section PTS defines each start PTS of each entry section where a head packet of the sub-picture data as the control object exists.

In FIG. 23, as shown in the lower part of the central column, the sub-frame control parameters (table) 812 are various parameters to define a display mode of the sub-frame on the main-video, specifically the sub-frame total number, the sub-frame total button number, the sub-frame informations 813

(sub-frame informations #1 to #n), the view rectangle 814, the sub-frame highlight scheme and others.

In the sub-frame control parameters 812, the sub-frame total number defines a total number of the sub-frames cut out from the sub-picture image. The sub-frame total button number defines a total number of the button of the sub-frame formed by the sub-picture image. Each of the sub-frame informations 813 (the sub-frame informations #1 to #n) includes informations about sub-frames #1 to #n, respectively. The view rectangle 814 includes information about a rectangular window (display window) through which the sub-frame disposed in a virtual Cartesian coordinate system is viewed. Furthermore, the sub-frame highlight scheme may include a highlight value of a button image of the sub-frame and the control information thereof, as an example of the highlight information of the "SCP button" according to the present invention.

In FIG. 23, as shown in the upper part of the right column, each of the sub-frame informations 813 (sub-frame informations #1 to #n) includes a sub-frame start PTS, a sub-frame end PTS, a sub-frame rectangle, a SFCCI, a sub-frame control components and so on.

In each of the sub-frame informations 813 (the sub-frame informations #1 to #n), the sub-frame start PTS defines a PTS to start a display of image information designated by the sub-frame. The sub-frame end PTS defines a PTS to end the display of the image information designated by the sub-frame. The sub-frame rectangle defines a rectangular area to be cut out for the sub-frame, for example by designating coordinates of the upper left corner and the lower right corner.

The SFCCI (Sub-Frame Control Component Information) is an example of the "type designation information" according to the present invention. For example, if a value "1" is assigned to each article, it means that the sub-frame can be displayed in the display mode indicated by this article, or means that the control information corresponding to this article exists. Alternatively, if a value "0" is assigned to each article, it means that the sub-frame cannot be displayed in the display mode indicated by this article, or means that the control information corresponding to this article does not exist.

Furthermore, the sub-frame control components indicate specifically a type for controlling the sub-frame display, as each article whose existence or effectiveness is indicated by the SFCCI. For example, the sub-frame control components indicate control type such as a 2D display, a button display, a moving display, an alpha-blending display, a shading or shadow display and so on as a type for controlling the sub-frame display.

In FIG. 23, as shown in the lower part of the right column, the view rectangle 814 has the information to indicate Vx, Vy, a width, a height, and a slope of the rectangle (view up vectors Ux and Uy). The view rectangle is for controlling a position of the display window through which one or more sub-frames disposed in the virtual Cartesian coordinate system is viewed. Vx and Vy designate coordinates of reference points (see FIG. 35) of the display window (for example, the lower left corner in this example). The width designates the width of the display window, and the height designates the height of the display window. The view up vector designates the vector information to indicate a slope of the display window.

Figure 24:
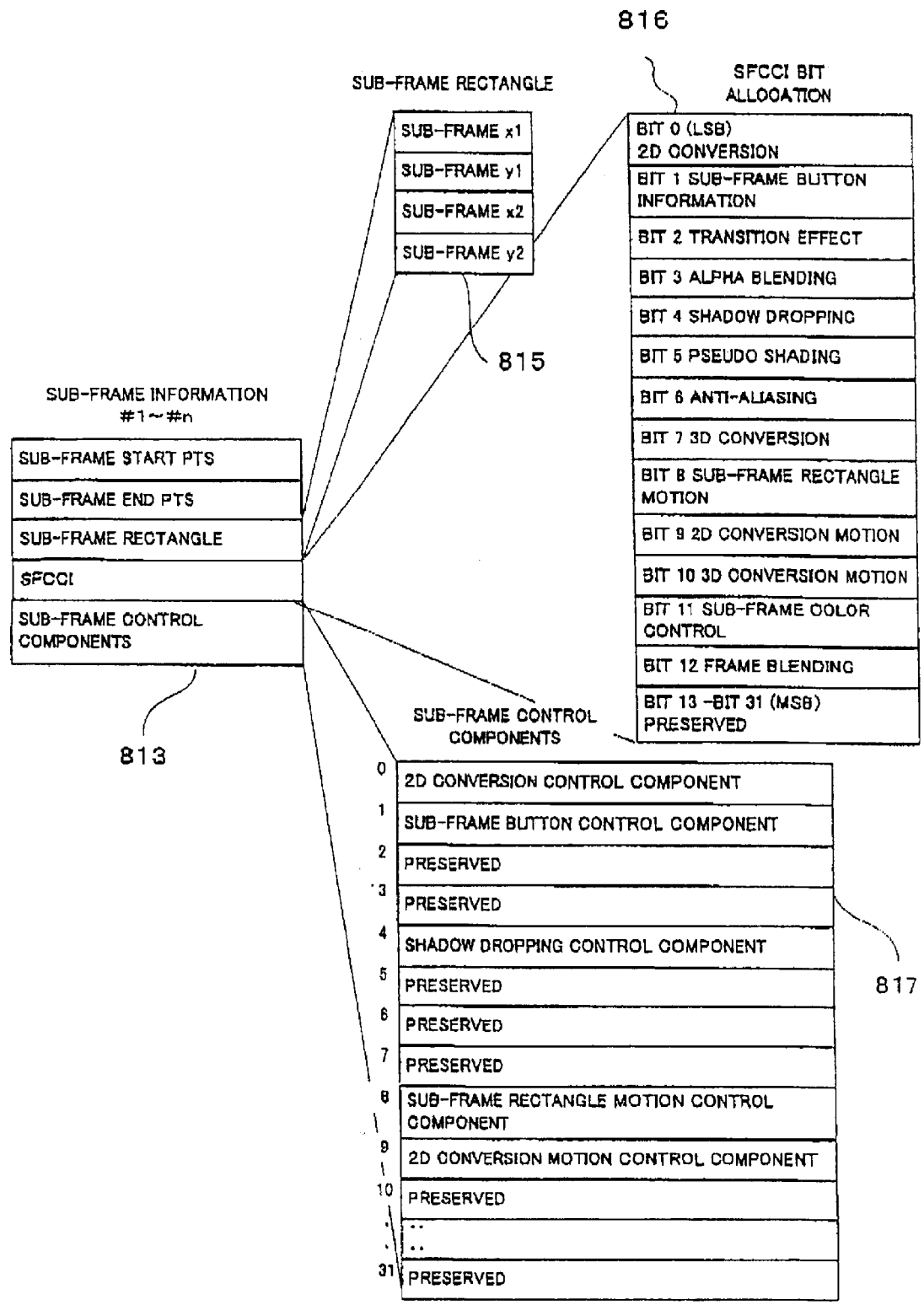
FIG. 24 is a set of tables indicating the structure of the sub-picture control packet in the embodiment, continued from FIG. 23.

Now, as shown in FIG. 24, each of the sub-frame informations (table) 813, i.e. each of the sub-frame informations #1 to #n, includes a plurality of tables.

In FIG. 24, as shown in the upper part of the central column, the sub-frame rectangle (table) 815 includes information to designate ranges of the sub-frame such as sub-frame x1, sub-frame y1, sub-frame x2 and sub-frame y2. This information indicates coordinates to cut out sub-frames from the sub-picture. The sub-frame x1 and the sub-frame y1 correspond to the coordinate of an upper left corner of the range, and the sub-frame x2 and the sub-frame y2 correspond to the coordinate of a lower right corner of the range.

In FIG. 24, as shown in the upper part of the right column, a SFCCI bit allocation (table) 816 consists of 32 bits. Each bit indicates, by its value "0" or "1", the existence or effectiveness of the control information relating to each display mode to display the sub-frame over the main-video. For example, "bit 0" indicates the existence of the sub-picture control information to perform a 2D conversion or the effectiveness of the 2D conversion. For example, "bit 1" indicates the existence of the sub-picture control information to perform a button display (i.e. the SCP button display) or the effectiveness of the button display. For example, "bit 3" indicates the existence of the sub-picture control information to perform an alpha-blending or the effectiveness of the alpha-blending. For example, "bit 4" indicates the existence of the sub-picture control information to perform a shadow dropping or the effectiveness of the shadow dropping.

In FIG. 24, as shown in the lower part of the right column, the sub-frame control component (table) 817 has specific contents of various sub-picture control informations whose existence or effectiveness is indicated by the SFCCI bit allocation table 816. For example, specific sub-picture control information including a 2D display, a button display and so on is recorded.

Figure 25:
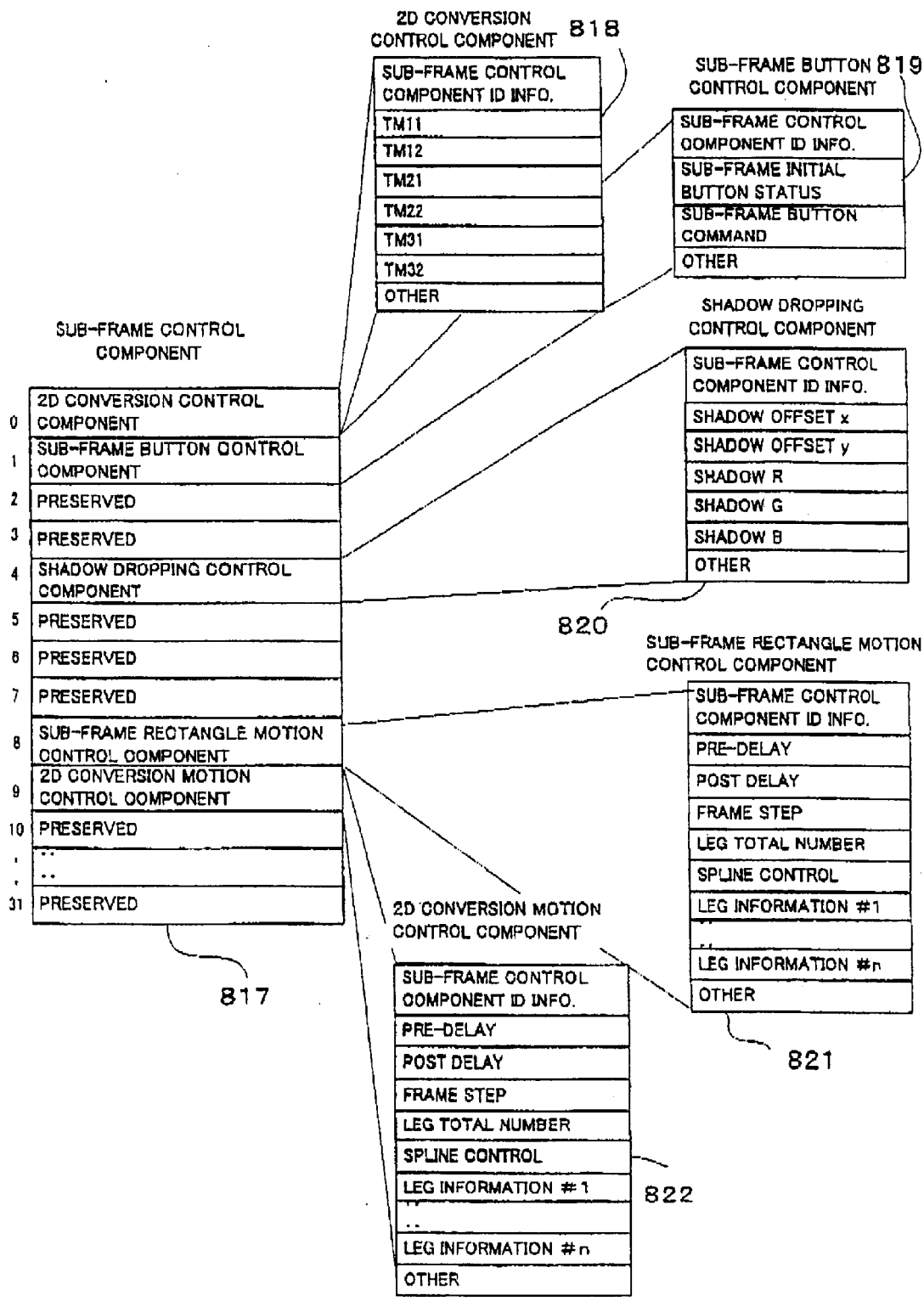
FIG. 25 is a set of tables indicating the structure of the sub-picture control packet in the embodiment, continued from FIG. 24.

Now, as shown in FIG. 25, the sub-frame control component (table) 817 includes a plurality of tables.

In FIG. 25, as shown in the upper part of the central column, the 2D conversion control component (table) 818 includes sub-frame control component identification information, TM11, TM12, TM21, TM22, TM31, TM32 and so on. The sub-frame control component identification information is information to identify a component relating to the 2D conversion (e.g. an identification number assigned to the 2D conversion control). Each TM is information to designate a vertical element and a horizontal element of the conversion matrix used for the 2D control. In accordance with the 2D conversion control component 818 constructed as such, a 2D display can be achieved with using the sub-picture according to the embodiment.

In FIG. 25, as shown in the upper part of the right column, the sub-frame button control component (table) 819 includes sub-frame control component identification information, sub-frame initial button status, sub-frame button command and so on. The sub-frame control component identification information is information to identify a component relating to the sub-frame button (e.g. an identification number assigned to the button control). The sub-frame initial button status indicates an operational condition of the button in its initial status. The sub-frame button command indicates a command to be executed in response to the button operation of the sub-frame. In accordance with the sub-frame button control component 819 constructed as such, the SCP button display can be achieved with using the sub-picture according to the embodiment.

In FIG. 25, as shown in the central part of the right column, the shadow dropping control component (table) 820 includes sub-frame control component identification information, shadow offset x, shadow offset y, shadow R, shadow G, shadow B and so on. Incidentally, it may include brightness and color difference information, instead of the shadow R, the shadow G and the shadow B. The sub-frame control component identification information is information to identify a component relating to the shadow dropping (e.g. an identification number assigned to the shadow dropping control). The shadow offset x designates a horizontal offset of a shadow based on the original image. The shadow offset y designates a vertical offset of the shadow based on the original image. Each offset may be defined by pixel unit for example. The shadow R, the shadow G and the shadow B designate color of the shadow. In accordance with the shadow dropping control component 820 constructed as such, the shadow dropping display can be achieved about the sub-picture according to the embodiment.

In FIG. 25, as shown in the lower part of the right column, the sub-frame rectangle motion control component (table) 821 includes sub-frame control component identification information, pre-delay, post delay, frame step, leg total number, spline control, leg informations #1 to #n and so on. The sub-frame control component identification information is information to identify a component relating to the sub-frame rectangle motion control (e.g. an identification number assigned to the rectangle motion control). The leg total number designates a number of passing points on the route or path along which the sub-frame traces. The spline control is information to trace smoothly the passing points from the start point to the end point of the sub-frame's tracing. These passing points may be traced linearly, if a smooth trace as mentioned above is not indicated. The leg informations #1 to #n are informations about each passing point, respectively. In accordance with the sub-frame rectangle motion control component 821 constructed as such, the rectangle motion can be achieved about the sub-picture according to the embodiment.

In FIG. 25, as shown in the lower part of the central column, the 2D conversion motion control component (table) 822 includes sub-frame control component identification information, pre-delay, post delay, frame step, leg total number, spline control, leg informations #1 to #n and so on. The sub-frame control component identification information is information to identify a component relating to the 2D conversion motion control (e.g. an identification number assigned to the 2D conversion motion control). The pre-delay indicates a control to start the movement of the sub-frame with a predetermined delay from the display start time point of the sub-frame. The post delay indicates a control to start the movement with a predetermined delay from the display end time point of the sub-frame. The frame step designates a period or time cycle of the operation. The leg total number is representative of the number of passing points on the path along which the sub-frame traces. The spline control designates whether or not passing points from the start point to the end point of the sub-frame's tracing is to be traced in a smoothed curve. In the spline control, the path does not always trace rightly on passing points, but may trace in the proximity of points. If the smooth trace of such a spline form is not designated, a control is executed so as to trace these passing points linearly. The leg informations #1 to #n have information about each passing point, respectively. In accordance with the 2D conversion motion control component 822 constructed as such, the 2D conversion motion can be achieved about the sub-picture according to the embodiment.

Now, as shown in FIG. 26, the sub-frame rectangle motion control component (table) 821 includes a plurality of tables.

In FIG. 26, as shown in the right column, each of the leg informations (tables) 823, i.e. each of the leg informations #1 to #n, includes relative location x, relative location y, relative scaling and so on. The relative location x indicates a horizontal position of the passing point relative to the current position. The relative location y indicates a vertical position of the passing point relative to the current position. Furthermore, the relative scaling includes information for a scaling from the current size into a predetermined size. In accordance with the leg informations 823 constructed as such, the display position or the display size of the sub-picture according to the embodiment can be changed.

Figure 27:
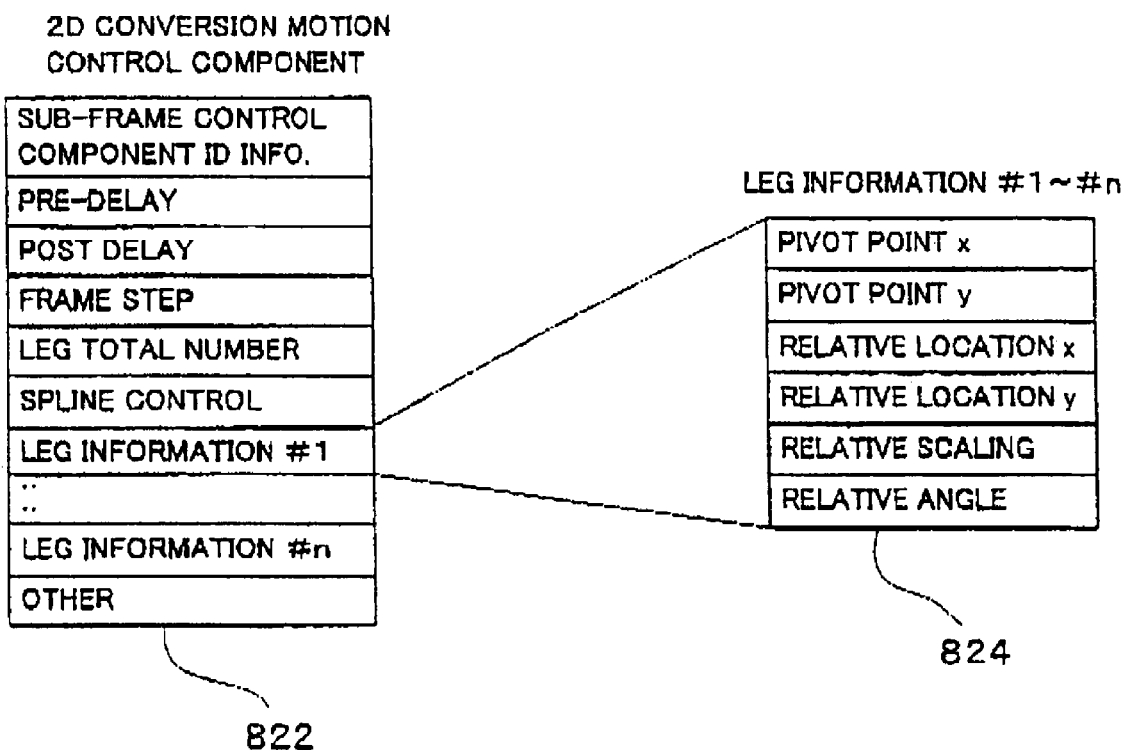
FIG. 27 is another set of tables indicating the structure of the sub-picture control packet in the embodiment, continued from FIG. 25.

Now, as shown in FIG. 27, the 2D conversion motion control component (table) 822 includes a plurality of tables.

In FIG. 27, as shown in the right column, each of the leg informations (table) 824. i.e. each of the leg informations #1 to #n, includes pivot point x, pivot point y, relative location x, relative location y, relative scaling, relative angle and so on. The pivot point is for designating a center for the rotation or scaling during the movement of the sub-frame. The pivot point x designates x coordinate of such a center. The pivot point y designates y coordinate of such a center. The relative location x indicates a horizontal position relationship relative to the current position. The relative location y indicates a vertical position relationship relative to the current position. Furthermore, the relative scaling includes information for a scaling from the current size into a predetermined size. The relative angle includes information for a conversion from the current angle into a predetermined angle. In accordance with the leg informations 824 constructed as such, the display position or the display size of the sub-picture according to the embodiment can be changed.

As explained with reference to FIG. 23 to FIG. 27, the SP control information stored in the sub-picture control packet according to the embodiment has a hierarchical data structure.

Now, an explanation is made on various display controls of the sub-frame specifically executed on the basis of the hierarchical data structure constructed as mentioned above, with reference to FIG. 28 to FIG. 47.

Figure 28:
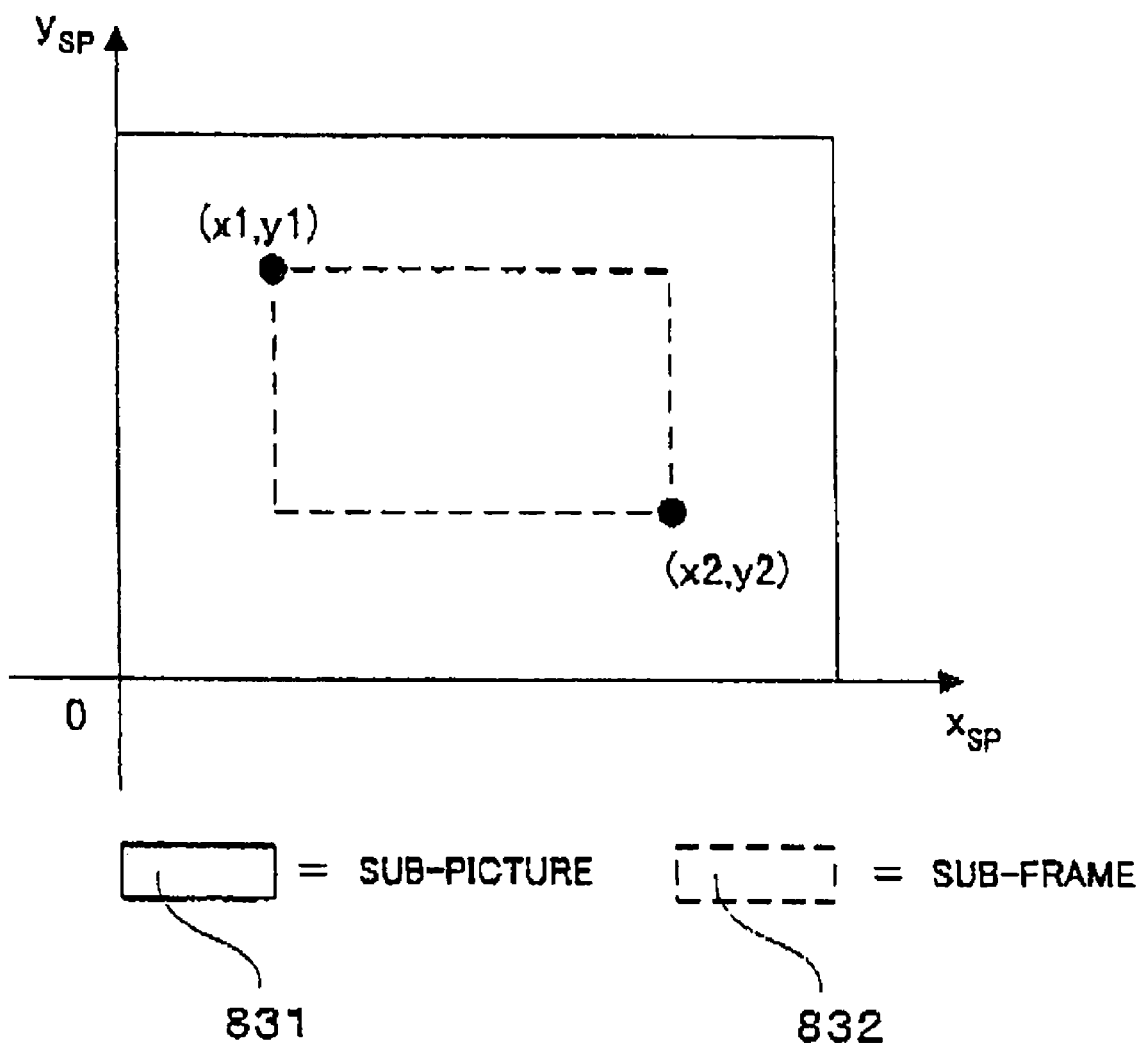
FIG. 28 is a conceptual diagram showing a relationship between the sub-picture and the sub-frame in the embodiment.

Firstly, with reference to FIG. 28, an explanation is made on a control to cut out the sub-frame from the sub-picture. FIG. 28 conceptually shows how to cut the sub-frame from the sub-picture.

In FIG. 28, the sub-picture 831 is recorded in advance as SP data (Still Picture data) and as a sub-picture stream. This sub-picture 831 is reproduced by the information record reproduction apparatus 500 and then recorded into the memory 540. The sub-frame 832 is an image part cut out from the sub-picture 831, on the basis of the SP control information (see FIG. 23 to FIG. 27) which is reproduced from an elementary stream the same as or different from this sub-picture stream.

For example, in FIG. 28, the coordinates of the upper left corner are defined as (x1, y1), and the coordinates of the lower right corner are defined as (x2, y2). The sub-frame is defined as a rectangle having a diagonal line defined by these coordinates (x1, y1) and (x2, y2). The range of the sub-frame is set by reading the sub-picture control packet 810, by referring further to the sub-frame control parameter 812 in the sub-picture control packet 810, by referring further to the sub-frame informations 813 (the sub-frame informations #1 to #n) in the sub-frame control parameter 812, by referring further to the sub-frame rectangle 815 in the sub-frame information 813, and by referring further to the sub-frame x1, the sub-frame y1, the sub-frame x2 and the sub-frame y2 in the sub-frame rectangle 815 (see FIG. 23 and FIG. 24).

Figure 29:
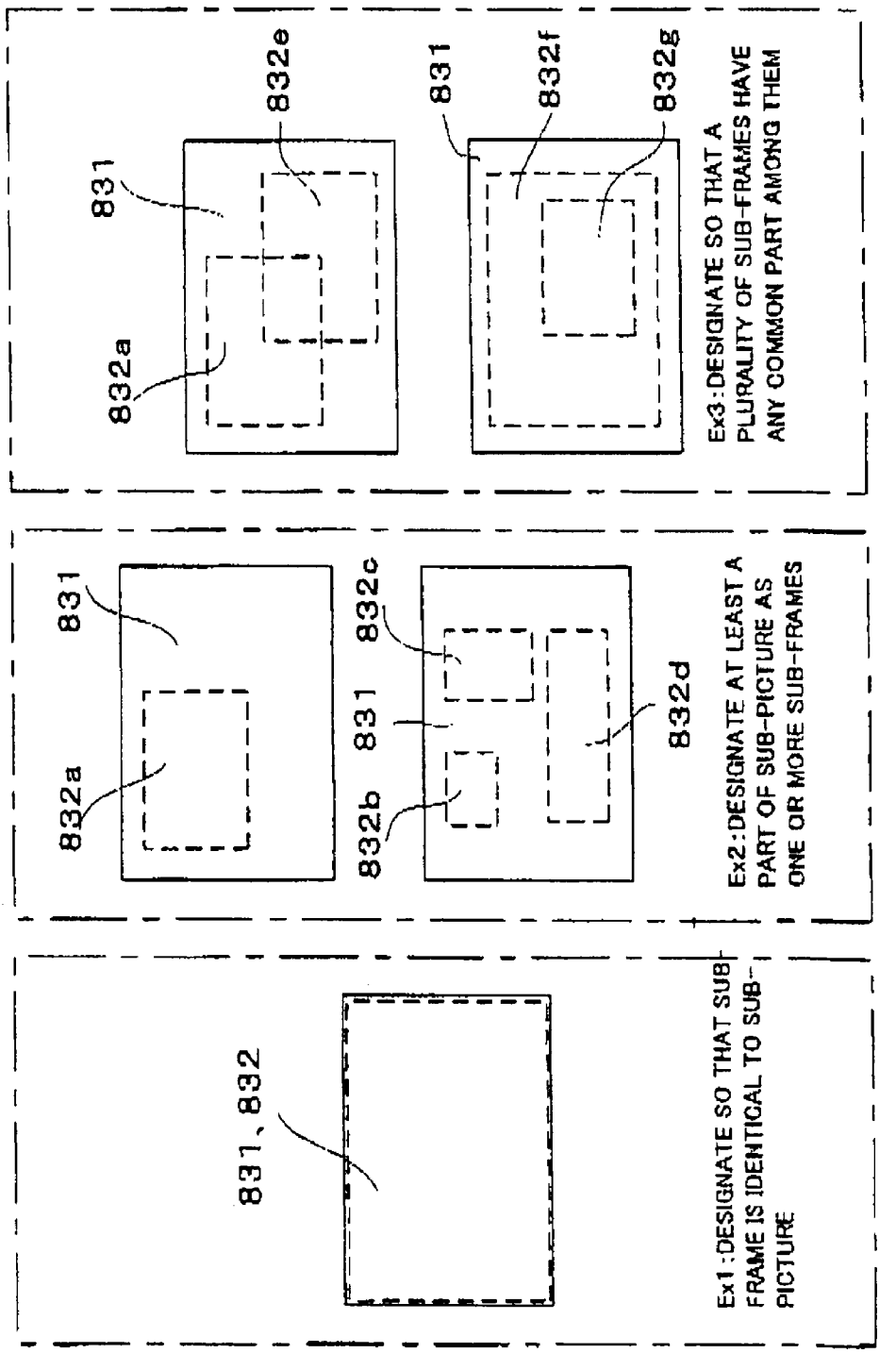
FIG. 29 is a conceptual diagram showing a designation mode to designate the sub-frame from the sub-picture in the embodiment.

Now, an explanation is made on a control to cut out a plurality of different sub-frames from the same sub-picture (SP data), with reference to FIG. 29. FIG. 29 conceptually shows three specific examples to cut out one or more sub-frames from the same sub-picture.

In FIG. 29, as shown in the "example 1", the sub-frame 832 may be cut out so as to be the same as the sub-picture 831.

As shown in the "example 2", at least a part of the sub-picture 831 may be cut out as a sub-frame 832*a* (an upper figure of the "example 2"). Alternatively, a plurality of sub-frames 832*b*, 832*c* and 832*d* may be cut out separately from each other (a lower figure of the "example 2").

As shown in the "example 3", a plurality of sub-frames (e.g. a sub-frame 832*a* and a sub-frame 832*e*) may be cut out so as to include some common part to each other, i.e. overlappingly (an upper figure of the "example 3"). Alternatively, they may be cut out in such a manner that one (e.g. 832*f*) includes wholly the other (e.g. 832*g*) (a lower figure of the "example 3").

A variety of sub-frames as mentioned above is set by referring to the sub-frame x1, the sub-frame y1, the sub-frame x2 and the sub-frame y2 included in the hierarchical structure of the sub-picture control packet 810, as in the case of FIG. 28 (see FIG. 23 and FIG. 24). Thus, a variety of sub-frames can be cut out from the same sub-picture.

Figure 30:
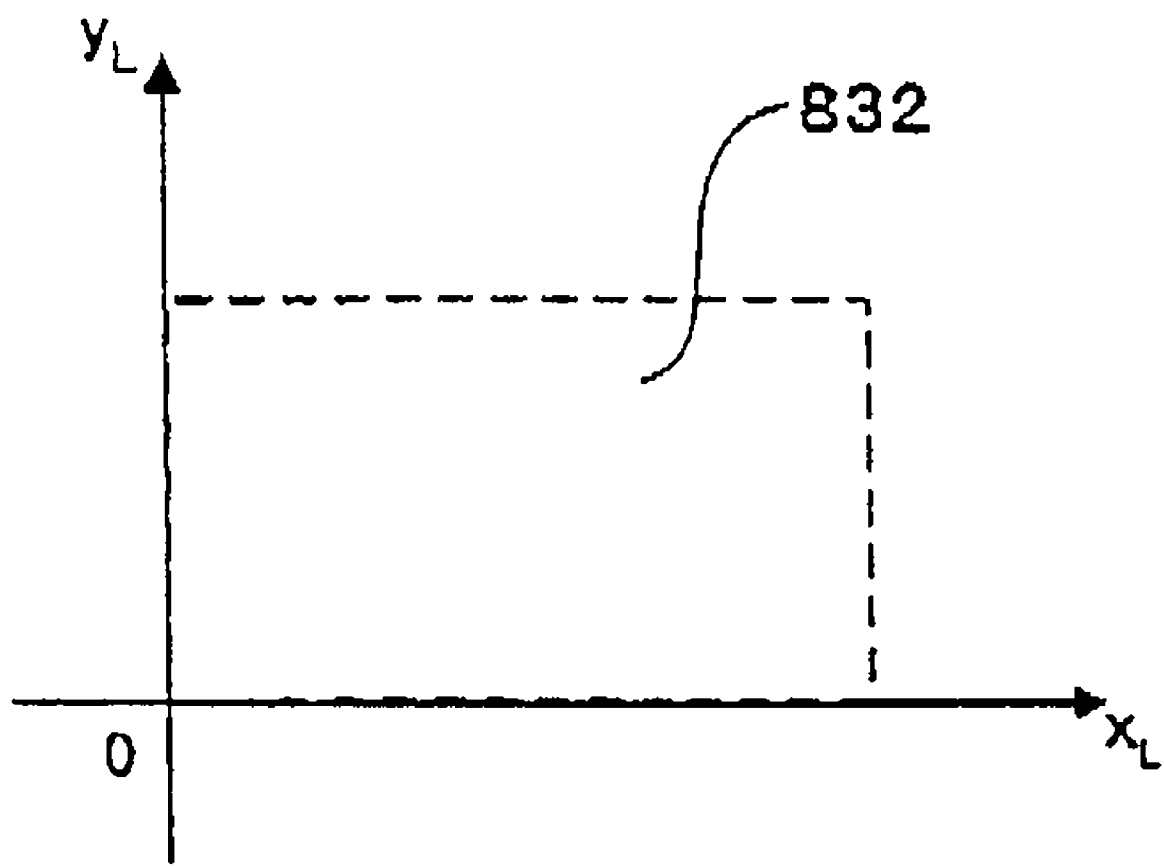
FIG. 30 is a conceptual diagram showing a display position of the sub-frame in the embodiment.

Now, an explanation is made on a recording format of the cut out sub-frame, with reference to FIG. 30. FIG. 30 conceptually shows a display position of the sub-frame.

As shown in FIG. 30, in the cut out processing of the sub-frame as mentioned above, it is performed that the cut out sub-frames 832*a* to 832*g* are recorded after converting them into a sub-frame coordinate system $(X_L, Y_L)$. That is, in the information record reproduction apparatus 500, the coordinate systems of all the sub-frames 832, no matter what range of the sub-picture is defined to cut out the sub-frames, are converted into the coordinate system shown in FIG. 30 and recorded. In this example, the sub-frame 832 is recorded with the lower left corner thereof being as the origin of the coordinate system.

Figure 31:
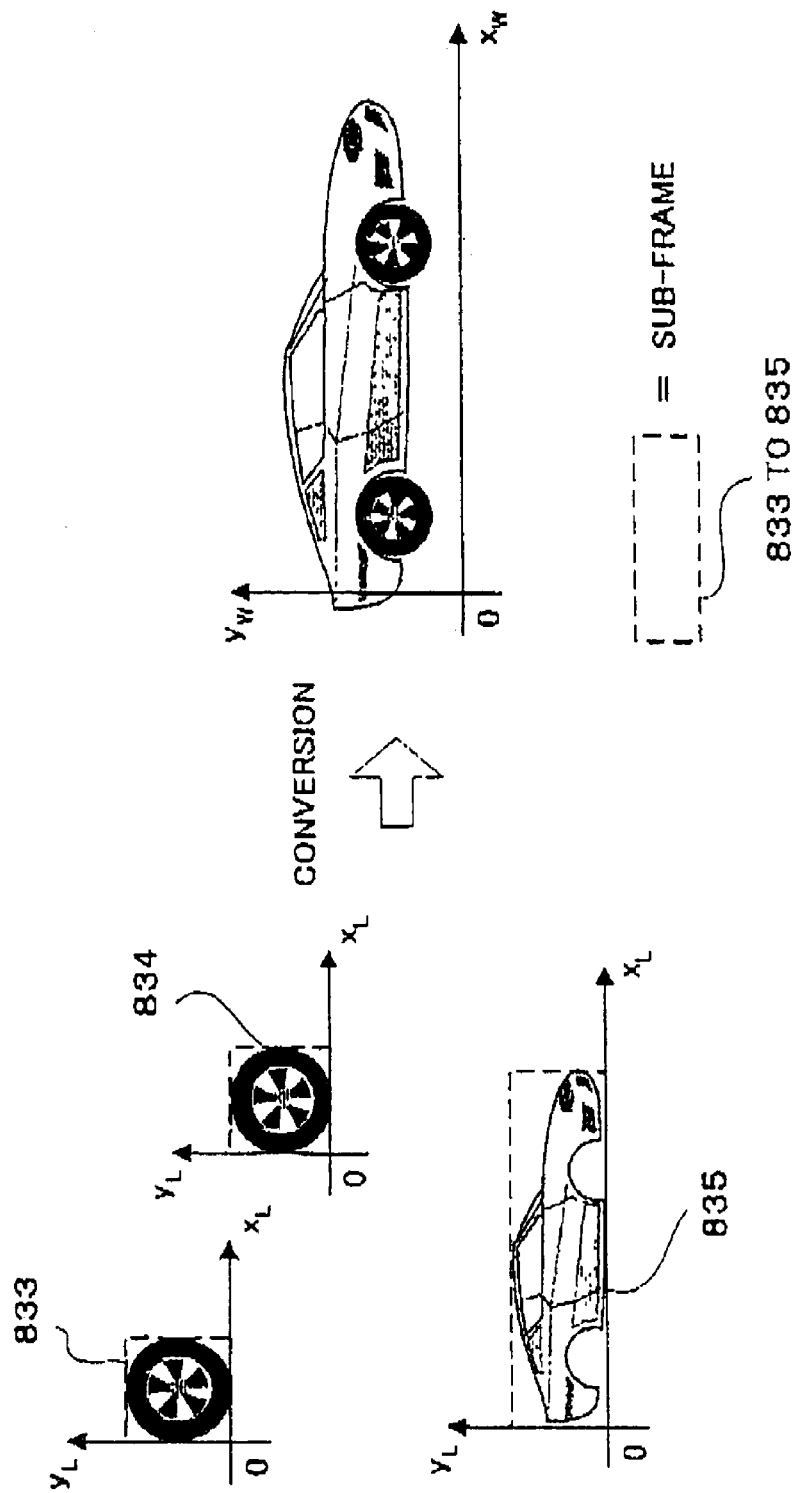
FIG. 31 is a conceptual diagram showing sub-frames in each sub-frame coordinate systems, and layout of main-video that is made of these sub-frames in the main-video coordinate system.

Now, an explanation is made on a conversion processing from the sub-frame coordinate system to the main-video virtual coordinate system, with reference to FIG. 31. FIG. 31 conceptually illustrates sub-frames in each sub-frame coordinate system and a disposition of a main-video composed of these sub-frames in the main-video virtual coordinate system.

As illustrated in FIG. 31, a plurality of sub-frames (left-half side of FIG. 31) each of which is converted into the sub-frame coordinate system $(X_L, Y_L)$ and recorded is then converted into the main-video virtual coordinate system (Xw, Yw) so that one image (right-half side of FIG. 31) is synthesized. Herein, sub-frame images for tires and a body are converted into the main-video virtual coordinate system (Xw, Yw) and displayed so that an automobile image is synthesized. The SP control information to control such a display is recorded in the sub-picture control packet 810 (see FIG. 23 to FIG. 27). Depending on contents of various control informations in the sub-picture control packet 210, it is possible to synthesize the image in such a manner that the rear tire may be laid down aside of the body, or a manner that each tire rotates.

The display illustrated in shown in FIG. 31 is achieved with using sub-frames for tires and the body predetermined in advance, for example, by reading the sub-picture control packet 810, then referring to the sub-frame control parameter 812 therein, then referring to the sub-frame information 813 therein and then referring to the sub-frame control components 817 therein (see FIG. 23). The disposition in the main-video configured as such may be set arbitrary in the main-video virtual coordinate system (Xw, Yw).

Figure 32:
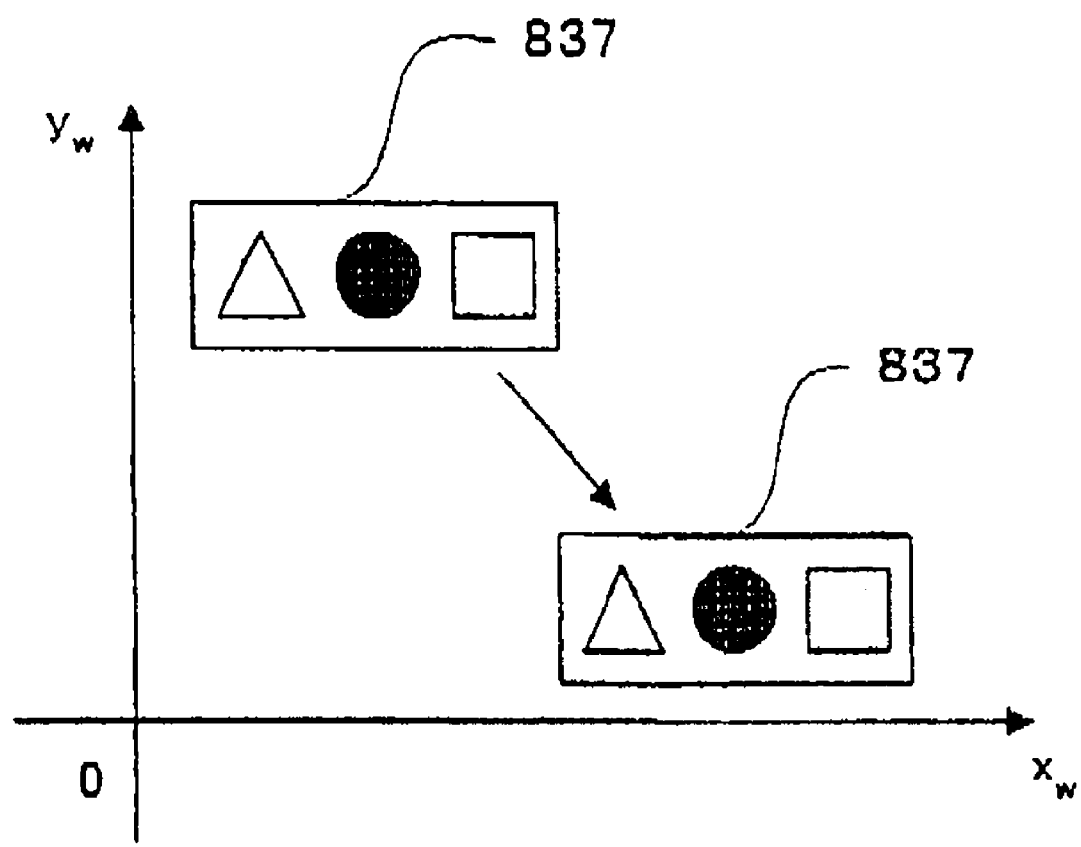
FIG. 32 is a conceptual diagram showing a display mode with a translation of the sub-frame in the main-video coordinate system in the embodiment.

Now, an explanation is made on a 2D conversion motion control, with reference to FIG. 32. FIG. 32 conceptually shows a display scheme involving a shift (parallel displacement) of a sub-frame in a main-video coordinate system.

As illustrated in FIG. 32, for the purpose of the 2D conversion motion control, a freely selected sub-frame 837 is shifted in the main-video virtual coordinate system (Xw, Yw) without modification the sub-frame 837. The sub-frame 837 is cut out from a predetermined sub-picture. Displaying such a sub-frame 837 may be achieved by reading the sub-picture control packet 810, then referring to the sub-frame control parameter 812 therein, then referring to the sub-frame information 813 therein, then referring to the sub-frame control components 817 therein, and then referring to the 2D conversion motion component 822 (see FIG. 23 to FIG. 27).

Figure 33:
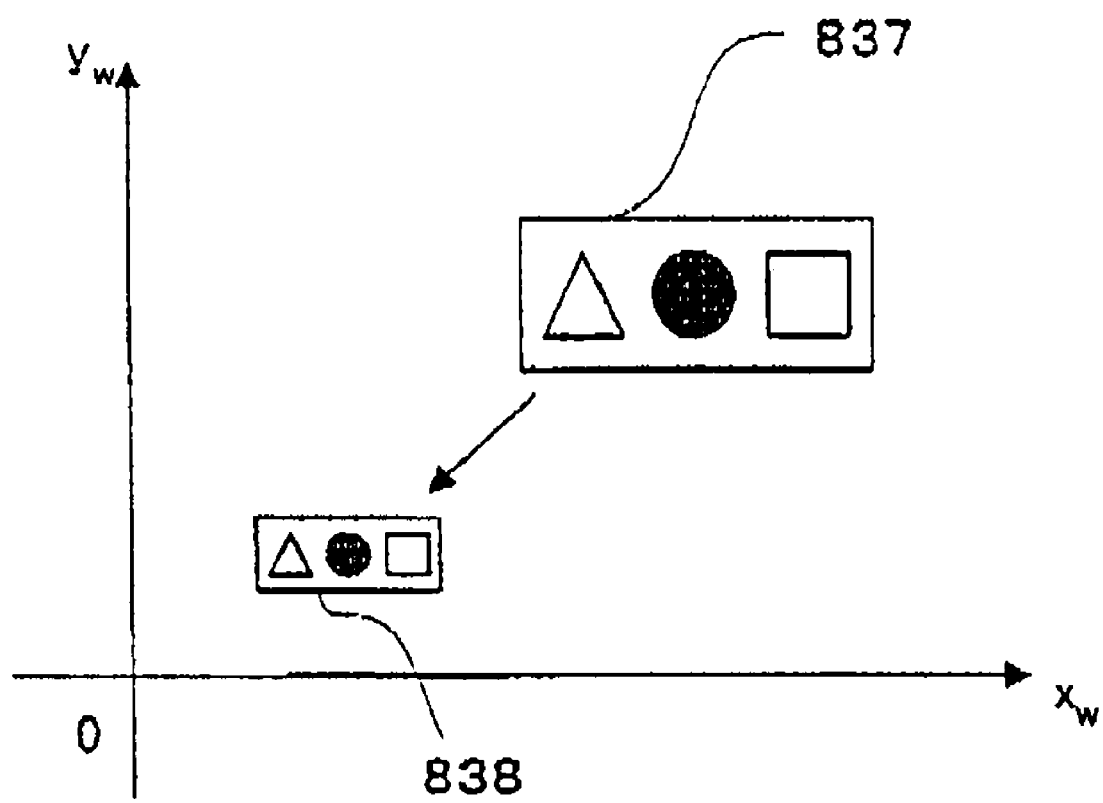
FIG. 33 is a conceptual diagram showing a display mode with a translation, a size change of the sub-frame in the main-video coordinate system in the embodiment.

Now, an explanation is made on a control involving an image size change of the sub-frame and a control involving a rectangle motion, with reference to FIG. 33. FIG. 33 conceptually shows a display scheme involving a shift and an image size change of a sub-frame in a main-video coordinate system.

As illustrated in FIG. 33, for the purpose of the image-size-changing control and the 2D conversion motion control, a freely selected sub-frame 837 is scaled down (or scaled up) and shifted to form an image 838 in the main-video coordinate system (Xw, Yw). An initial sub-frame 837 is cut out from a predetermined sub-picture. Such a display involving a conversion from the image 837 to the image 838 may be achieved by reading the sub-picture control packet 810, then referring to the sub-frame control parameter 812 therein, then referring to the sub-frame information 813 therein, then referring to the 2D conversion motion component 822 therein, then referring to the sub-frame rectangle motion component 821 therein, and then referring to the leg information(s) 824 therein (see FIG. 23 to FIG. 26). That is, on the basis of the relative scaling and the like included in the leg information(s) 824, the display involving the conversion from the sub-frame 837 to the image 838 is achieved. In this case, the leg informations 824 (i.e. leg informations #1 to #n) indicate only the start point and the end point. In an area between the start point and end point, the display control is performed so that the sub-frame moves linearly.

Figure 34:
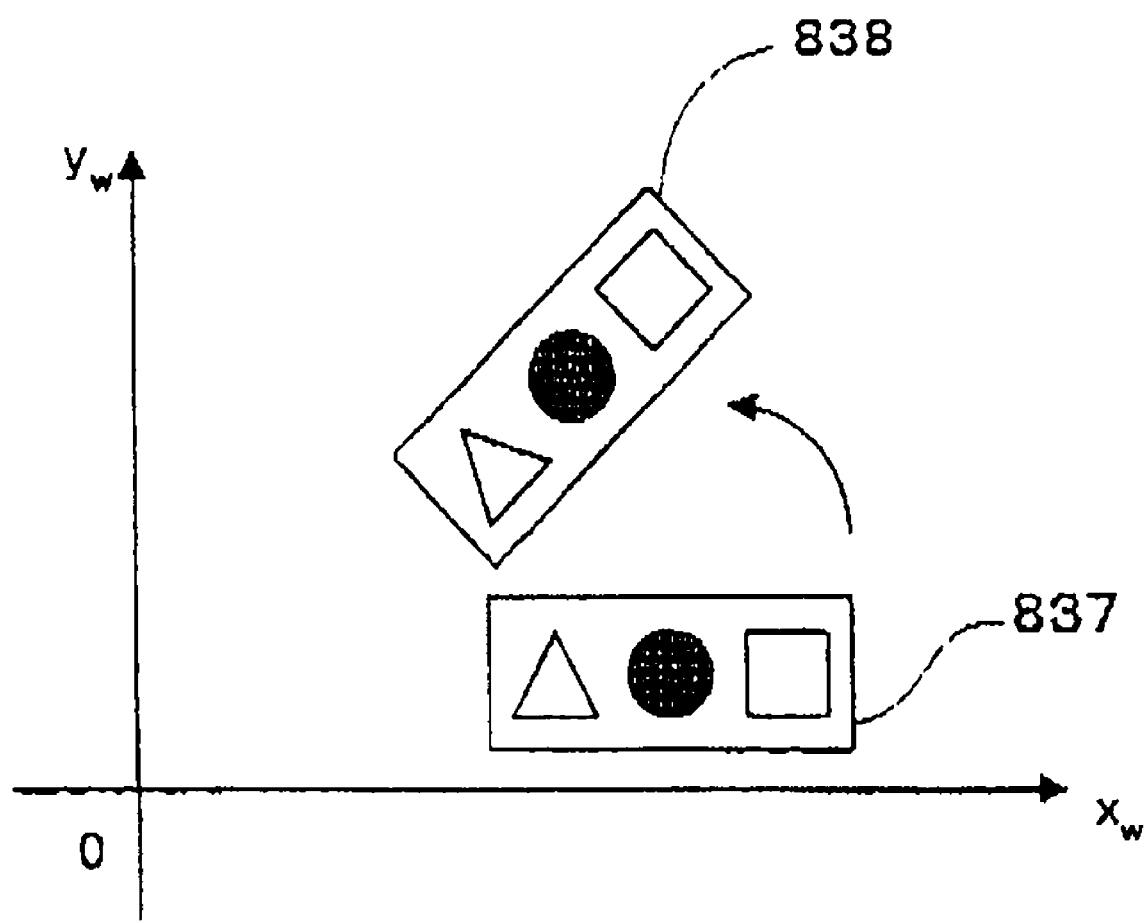
FIG. 34 is a conceptual diagram showing a display mode with a rotation of the sub-frame in the main-video coordinate system in the embodiment.

Now, an explanation is made on the 2D conversion motion control involving a rotation of the sub-frame, with reference to FIG. 34. FIG. 34 conceptually shows a display scheme involving a rotation of the sub-frame in the main-video virtual coordinate system.

As illustrated in FIG. 34, for the purpose of the 2D conversion motion control involving a rotation, a freely selected sub-frame 837 is rotated without modifying the sub-frame 837, in the main-video virtual coordinate system (Xw, Yw). The initial sub-frame 837 is cut out from a predetermined sub-picture. Such a display involving a rotation of the sub-frames may be achieved by reading the sub-picture control packet 810, then referring to the sub-frame control parameter 812 therein, then referring to the sub-frame information 813 therein, then referring to sub-frame control components 817 therein, then referring to the 2D conversion motion control component 822 therein, then referring to the leg information (s) 824 (leg informations #1 to #n), and then referring to the pivot point x, the pivot point y, the relative angle and the like (see FIG. 23 to FIG. 27).

Figure 35:
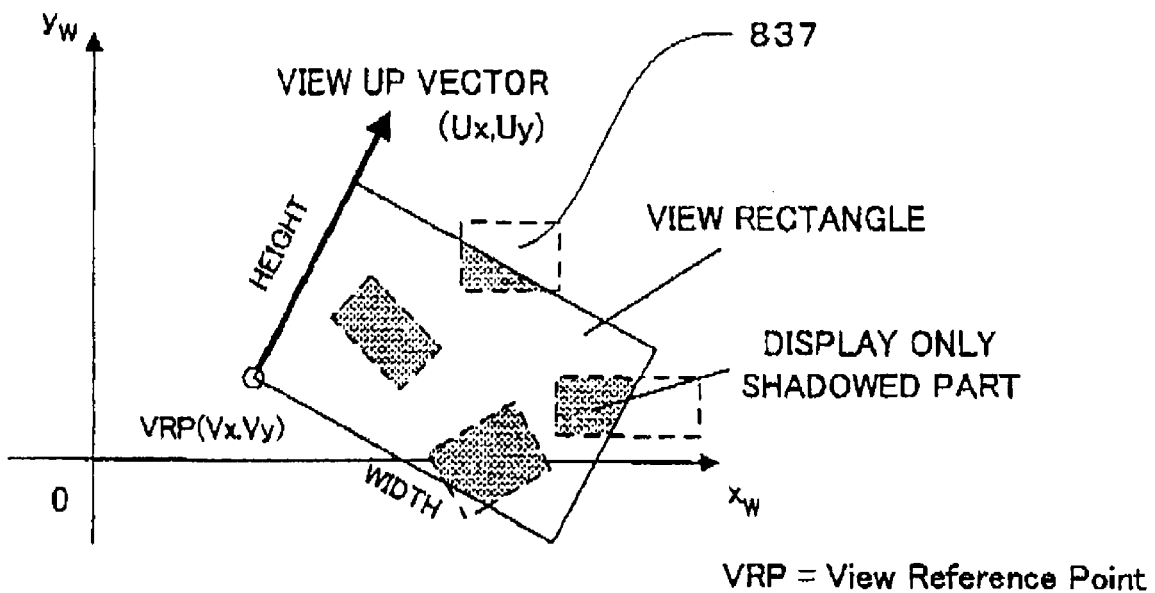
FIG. 35 is a conceptual diagram showing a sub-frame disposed in the main-video coordinate system and a display mode with a display window in the embodiment.

Now, an explanation is made on a display window (view rectangle) control of the sub-frame, with reference to FIG. 35. FIG. 35 conceptually illustrates a display scheme involving the display window and a disposition of the sub-frame in the main-video virtual coordinate system.

As illustrated in FIG. 35, a sub-frame(s) 837 (may be one or more) is cut out from a predetermined sub-picture and disposed at a predetermined position in the main-video virtual coordinate system (Xw, Yw). Processings until this disposition may be performed in accordance with the information about the 2D conversion control component 818, or may be performed by a scheme explained with reference to FIG. 32, FIG. 33, FIG. 34 and the like. Furthermore, a view rectangle, i.e. a display window, is defined and moved in the main-video virtual coordinate system (Xw, Yw), resulting in a processing to display one or more images of the sub-frame(s) 837 disposed in the main-video virtual coordinate system and included in an area encompassed within the view rectangle. Furthermore, such a display involving the view rectangle may be achieved by reading the sub-picture control packet 810, then referring to the sub-frame control parameter 812 therein, then referring to the view rectangle 814 therein, and then referring to Vx, Vy, the width, the height and the like therein (see FIG. 23).

Furthermore in this example, a control may be achieved so that the area encompassed within the view rectangle is changed by changing Vx, Vy, the width, the height and the like over time.

Figure 36:
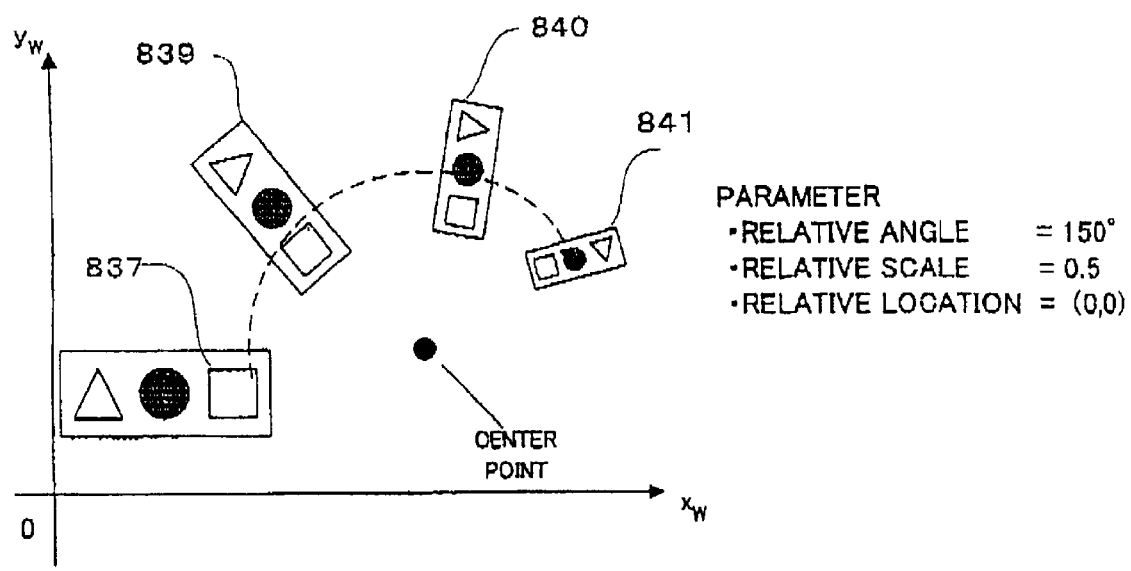
FIG. 36 is a conceptual diagram showing a display mode with a rotation and a size change of the sub-frame in the main-video coordinate system in the embodiment.

Now, an explanation is made on a display control involving a rotation and an image size change of the sub-frame, with reference to FIG. 36. FIG. 36 conceptually shows a display scheme involving the rotation and the image size change of the sub-frame in the main-video virtual coordinate system.

As shown in FIG. 36, a freely selected sub-frame 837 is scaled down gradually or sequentially (or scaled up gradually or sequentially) and rotationally moved in the main-video virtual coordinate system (Xw, Yw) to form an image 841 through images 839 and 840. The initial sub-frame 837 is cut out from a predetermined sub-picture. Such a display of the sub-frames may be achieved by reading the sub-picture control packet 810, then referring to the sub-frame control parameter 812 therein, then referring to sub-frame information 813 therein, then referring to the sub-frame control components 817 therein, then referring to the 2D conversion motion control component 822 therein, then referring to the leg information(s) 824 (leg informations #1 to #n), and then referring to the pivot point x, the pivot point y, the relative location x, the relative location y, the relative scaling, the relative angle and the like (see FIG. 23 to FIG. 27). Herein, images 839, 840 and 841 are disposed on the basis of predetermined angles defined by the relative angle, and displayed sequentially on the basis of the scaling defined by the relative scaling.

Figure 37:
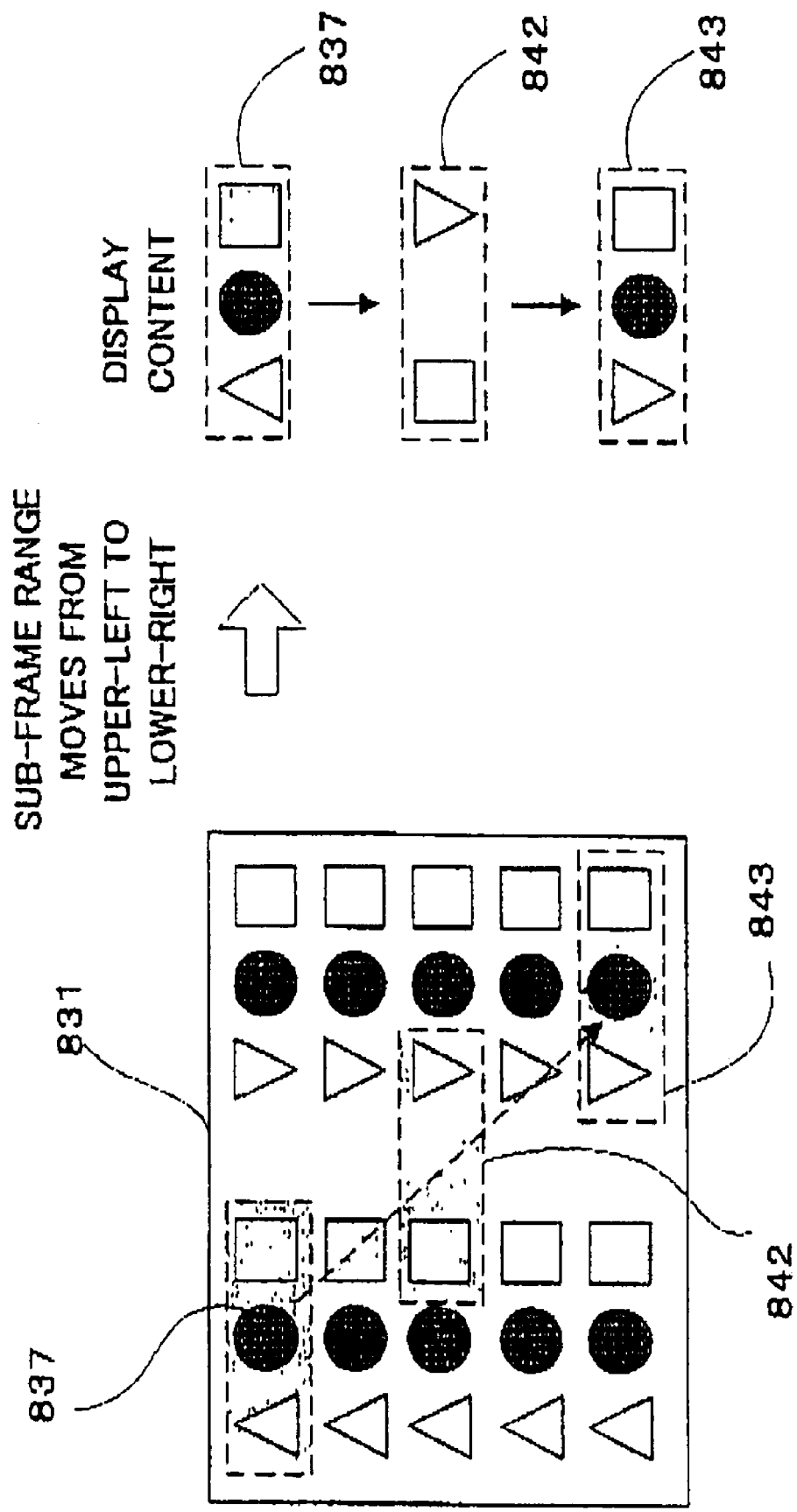
FIG. 37 is a conceptual diagram showing a display mode with a movement of a sub-frame in a sub-picture in the embodiment.

Now, an explanation is made on a display control involving a movement of the sub-frame in the sub-picture, i.e. a sub-frame rectangle motion display control, with reference to FIG. 37. FIG. 37 conceptually illustrates a display scheme involving a movement of the sub-frame in the sub-picture.

As illustrated in FIG. 37, sub-frames 837, 842 and 843 are cut out sequentially from the sub-picture 831, in accordance with a predetermined rule. Then, these cut out sub-frames are displayed sequentially in the main-video virtual coordinate system (Xw, Yw). Such a display of the sub-frames may be achieved by reading the sub-picture control packet 810, then referring to the sub-frame control parameter 812 therein, then referring to the sub-frame information 813 therein, then referring to the sub-frame control components 817 therein, then referring to the sub-frame rectangle motion control component 821 therein, then referring to the leg information(s) 823 therein, and then referring to the relative location x, the relative location y, the relative scaling and the like relative to the initial location of the sub-frame designated by the sub-frame rectangle 815 (see FIG. 24 to FIG. 26).

Figure 38:
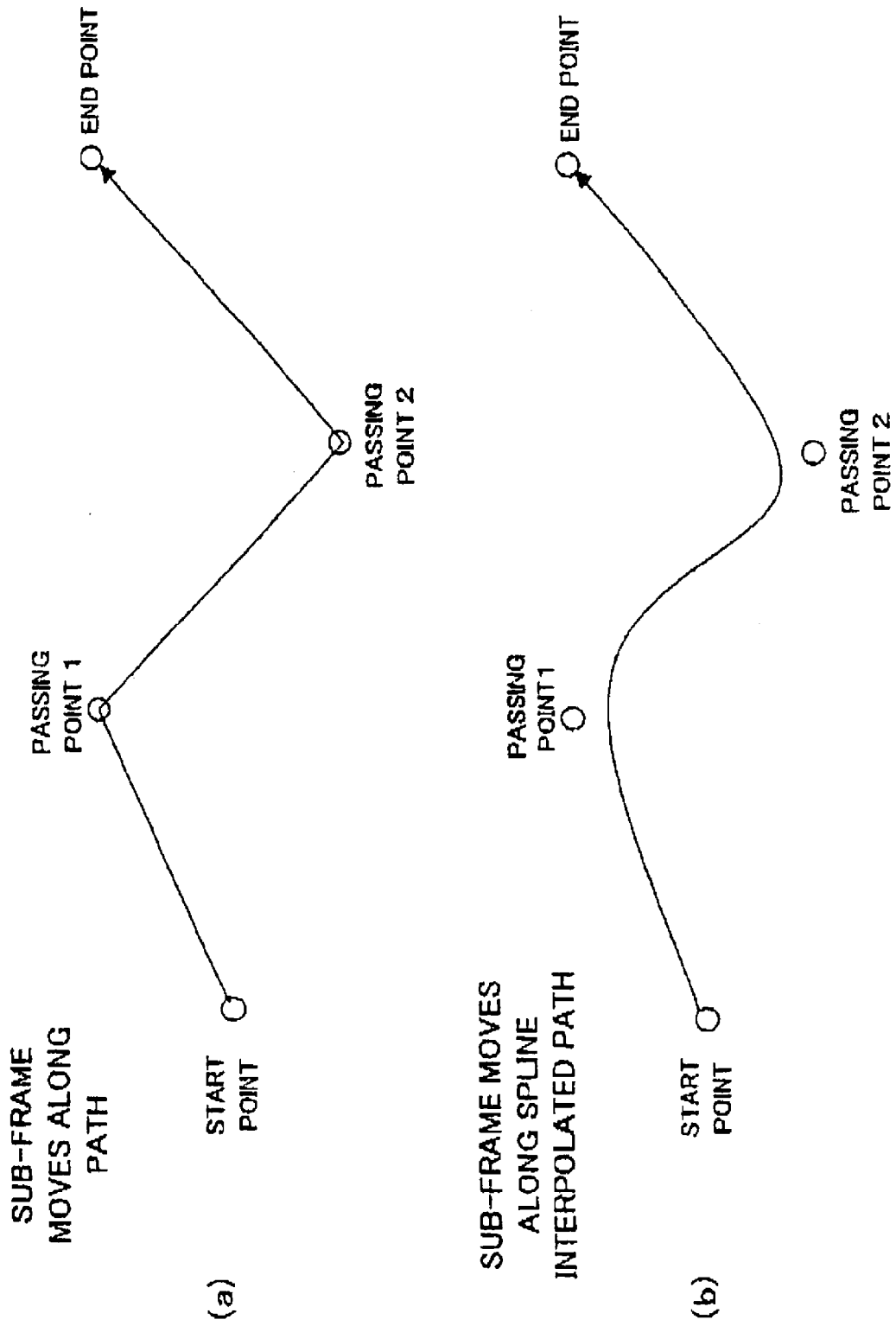
FIG. 38 is a conceptual diagram showing a display mode of the sub-frame in the main-video coordinate system, along with a moving path in the embodiment.

Now, an explanation is made on a display control involving a moving path of the sub-frame in the main-video virtual coordinate system, with reference to FIG. 38. FIG. 38 conceptually shows a display scheme involving the moving path of the sub-frame in the main-video virtual coordinate system.

As illustrated in FIG. 38, the sub-frame moves over the predetermined path. Particularly in FIG. 38(*a*), the sub-frame moves over the path linearly connecting from the start point to the end point through the passing points 1 and 2. In FIG. 38(*b*), the sub-frame moves over the path subjected to a spline interpolation from the start point to the end point through passing points 1 and 2. The display information about these passing points, the linear movement, the movement with the spline interpolation and the like is recorded in the sub-picture control packet 210. Furthermore, passing points are not limited to two in their number, but may be more. Such a display of the sub-frame may be achieved by reading the sub-picture control packet 812, then referring to the sub-frame control parameter 812 therein, then referring to the sub-frame information 813 therein, then referring to the sub-frame control components 817 therein, then referring to the sub-frame rectangle motion control component 821 therein, or referring to the 2D conversion motion component 822, and then referring to the spline control and the like therein (see FIG. 23 to FIG. 25).

The SP data and the SP control information relating to various display schemes discussed with reference to FIG. 23 to FIG. 38 is reproduced and read by the information record reproduction apparatus 500, as the elementary stream(s) recorded in the disc 100. The reading processing may be performed as a part of the reproduction processing of the object discussed with reference to the flow chart of FIG. 19. In this case, the SP data is cut out in accordance with the SP control information in the sub-picture control packet 210, and displayed over the main-video after subjected various treatments or processings as mentioned above.

In this embodiment, both display schemes are available, one is a button display based on the SP control information discussed with reference to FIG. 23 to FIG. 38 (i.e. the "SCP button" which is controlled on the basis of the sub-frame button control component 819 of FIG. 25), the other is a button display based on the information provided in the structure information acting as the header information of the SP data discussed with reference to FIG. 20 to FIG. 22 (i.e. the "SPD button" which is displayable and controllable based on the SP data structure 722 of FIG. 20(*b*)). In this embodiment, either one of these "SCP button" and "SPD button" may be used, or both of them may be used as the situation demands. In the following explanation, the button control information in the header information (structure information) of the SP data required for the "SPD button" is referred to as a "SPD button information" as the situation demands, so as to be distinguished from the "SPD button".

Figure 39:
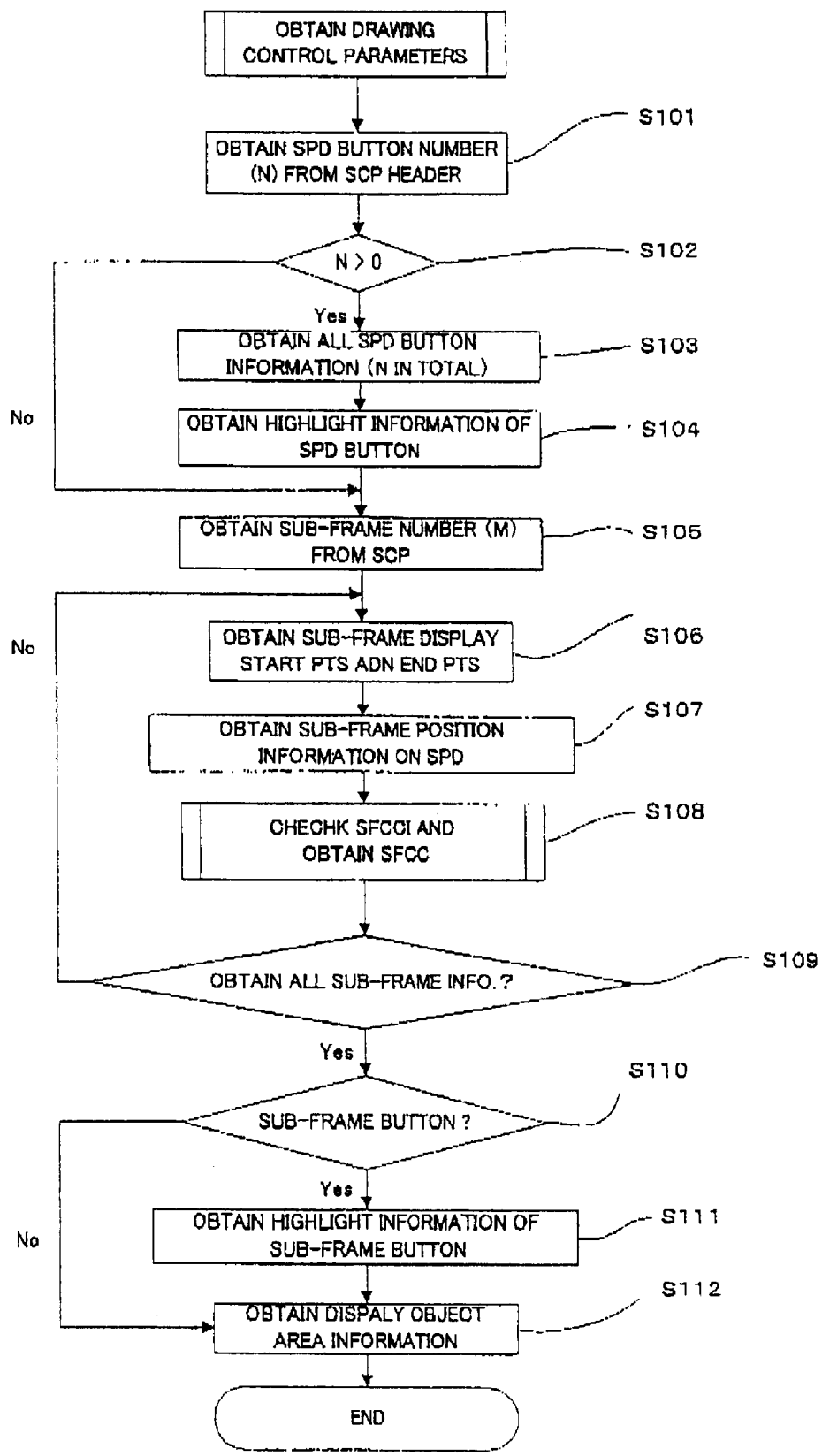
FIG. 39 is a flow chart showing an operational flow of obtaining drawing control parameters in the embodiment.

Now, an explanation is made on an example of obtaining drawing control parameters, with reference to a flow chart of FIG. 39. FIG. 39 is a flow chart showing an operational flow of obtaining drawing control parameters. Furthermore, in FIG. 39, the sub-picture control packet 810 (see FIG. 23) is abbreviated as a "SCP".

Incidentally, the "drawing control parameters" herein means parameters particularly relating to drawing from among various sub-frame control parameters, which compose the SP control information shown in FIG. 23, stored in the SP control packet. For example, all of the sub-frame control parameters 812 shown in FIG. 23 and the like may be the drawing control parameters, or the former may includes other parameters different from the latter.

Firstly, in FIG. 39, the number (N) of the SPD (SP data) buttons is obtained from the SCP header (step S101), and it is judged whether or not the number (N) of the SPD buttons is larger than "0" (step S102). If it is judged that the number (N) of the SPD buttons is not larger than "0" at step S102 (step S102: No), it means that the SPD button information does not exist, and therefore the process goes to step S105. On the other hand, if it is judged that the number (N) of the SPD buttons is larger than "0" at step S102 (step S102: Yes), all SPD button informations (total number=N) are obtained (step S103), and the highlight information of the SPD button is further obtained (step S104). This highlight information may be obtained from the header information of the SP data in which the highlight information is recorded in advance, or from the structure information of the SP data. Alternatively, the highlight information may be obtained from the SP control information in which it is recorded in advance (e.g., in this case, the sub-frame highlight scheme is obtained from the sub-frame control parameter 812 shown in FIG. 23). Then, the number (M) of the sub-frames is obtained from the SP control information (step S105).

Then, the display start PTS and the display end PTS of the sub-frame are obtained from the sub-picture control parameters 812 (see FIG. 23) (step S106), and the position information on the SP data of the sub-frame is obtained (step S107), and the SFCCI is checked and the sub-frame control component is obtained (step S108). Then, it is judged whether or not the informations of all sub-frames (total number=M) are obtained (step S109). If it is judged that the informations of all sub-frames are not obtained (step S109: No), the processings after step S106 are repeated to obtain various informations of the sub-frame.

If it is judged that the information of all sub-frames are obtained (step S109: Yes), then it is judged whether or not the sub-frame button exists (step S110). If it is judged that the sub-frame button does not exist (step S110: No), the process goes to step S112. On the other hand, if it is judged that the sub-frame button exists (step S110: Yes), the highlight information of the sub-frame is obtained (step S111). Then, the display object area is obtained (step S112), and obtaining the drawing control parameters is terminated.

Thus, an explanation has been made on the operational flow of obtaining parameters relating to the SPD button and obtaining drawing control parameters. Nevertheless, other parameters may be obtained in accordance with procedures suitable for each of them.

Figure 40:
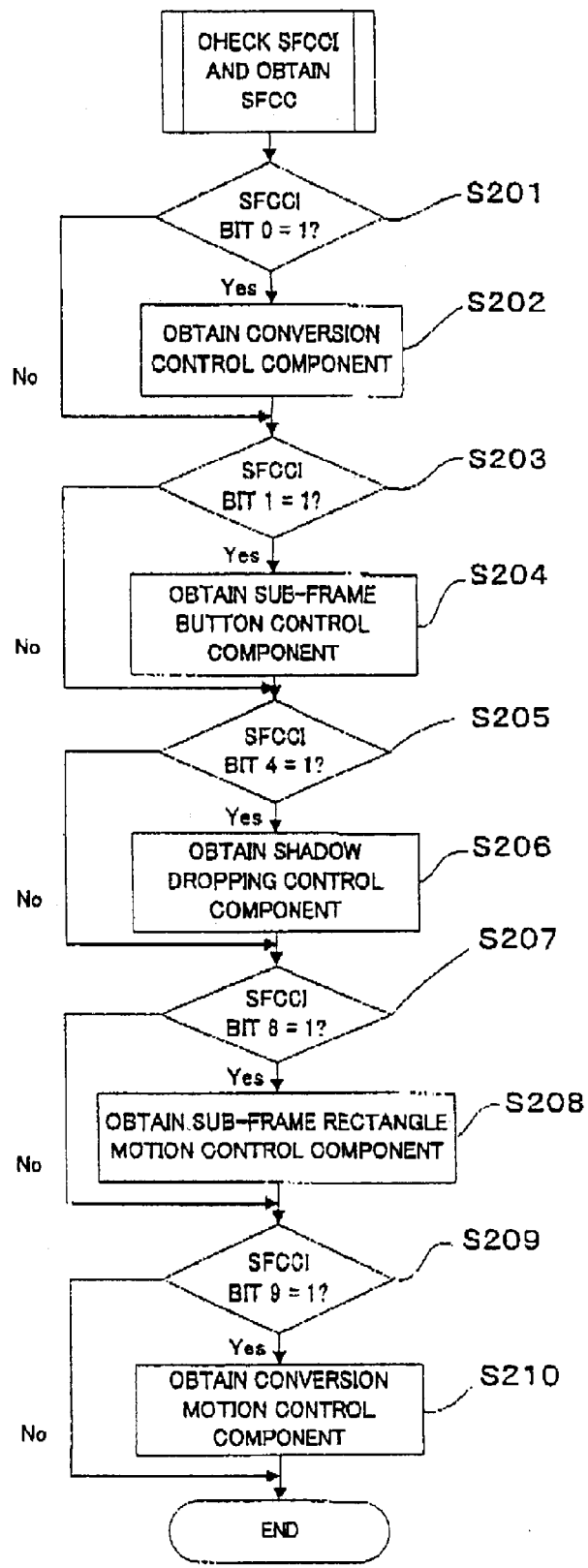
FIG. 40 is a flow chart showing an operational flow of checking the SFCCI and obtaining the SFCC in the embodiment.

Now, an explanation is made on an exemplarily operation of checking the SFCCI and obtaining the SFCC (sub-frame control component) at step S108 of FIG. 39, with reference to a flow chart of FIG. 40. Incidentally, the SFCCI bit configuration herein may be bits 0 to 31 (LSB to MSB), as shown in the SFCCI bit allocation table 816 illustrated at the upper part of the right column of FIG. 24.

Firstly, it is judged whether or not the SFCCI bit 0 is "1" (step S201). If it is judged that the bit 0 is not "1" (step S201: No), the process goes to step S203. If it is judged that the bit 0 is "1" (step S201: Yes), it means that the conversion control component exists or is effective, and therefore they are obtained (step S202).

Then, it is judged whether or not the SFCCI bit 1 is "1" (step S203). If it is judged that the bit 1 is not "1" (step S203: No), the process goes to step S205. If it is judged that the bit 1 is "1" (step S203: Yes), it means that the sub-frame button control component exists or is effective, and therefore they are obtained (step S204).

Then, it is judged whether or not the SFCCI bit 4 is "1" (step S205). If it is judged that the bit 4 is not "1" (step S205: No), the process goes to step S207. If it is judged that the bit 4 is "1" (step S205: Yes), it means that the shadow dropping control component exists or is effective, and therefore they are obtained (step S206).

Then, it is judged whether or not the SCCI bit 8 is "1" (step S207). If it is judged that the bit 8 is not "1", (step S207: No), the process goes to step S209. If it is judged that the bit 8 is "1" (step S201: Yes), it means that the sub-frame rectangle motion control component exists or is effective, and therefore they are obtained (step S208).

Then, it is judged whether or not the SFCCI bit 9 is "1", (step S209). If it is judged that the bit 9 is not "1" (step S209: No), a series of processings ends. On the other hand, if it is judged that the bit 9 is "1" (step S209: Yes), it means that the conversion motion control component exists or is effective, and therefore they are obtained (step S210) and then a series of processings ends.

As discussed above, the sub-frame control component whose existence or effectiveness is determined by the SFCCI is obtained. In this example, the bit 0, bit 1, bit 4, bit 8 and bit 9 are checked, but other bits listed in the SFCCI bit allocation table 816 (see FIG. 24) may be also checked in the same manner, if needed.

Now, an explanation is made on the sub-frame drawing processing, with reference to flow charts of FIG. 41 to FIG. 44. Incidentally, these flow charts together form a series of flow charts, relationships among which are indicated by numerals in circles such as ①, ②, and so on.

Figure 41:
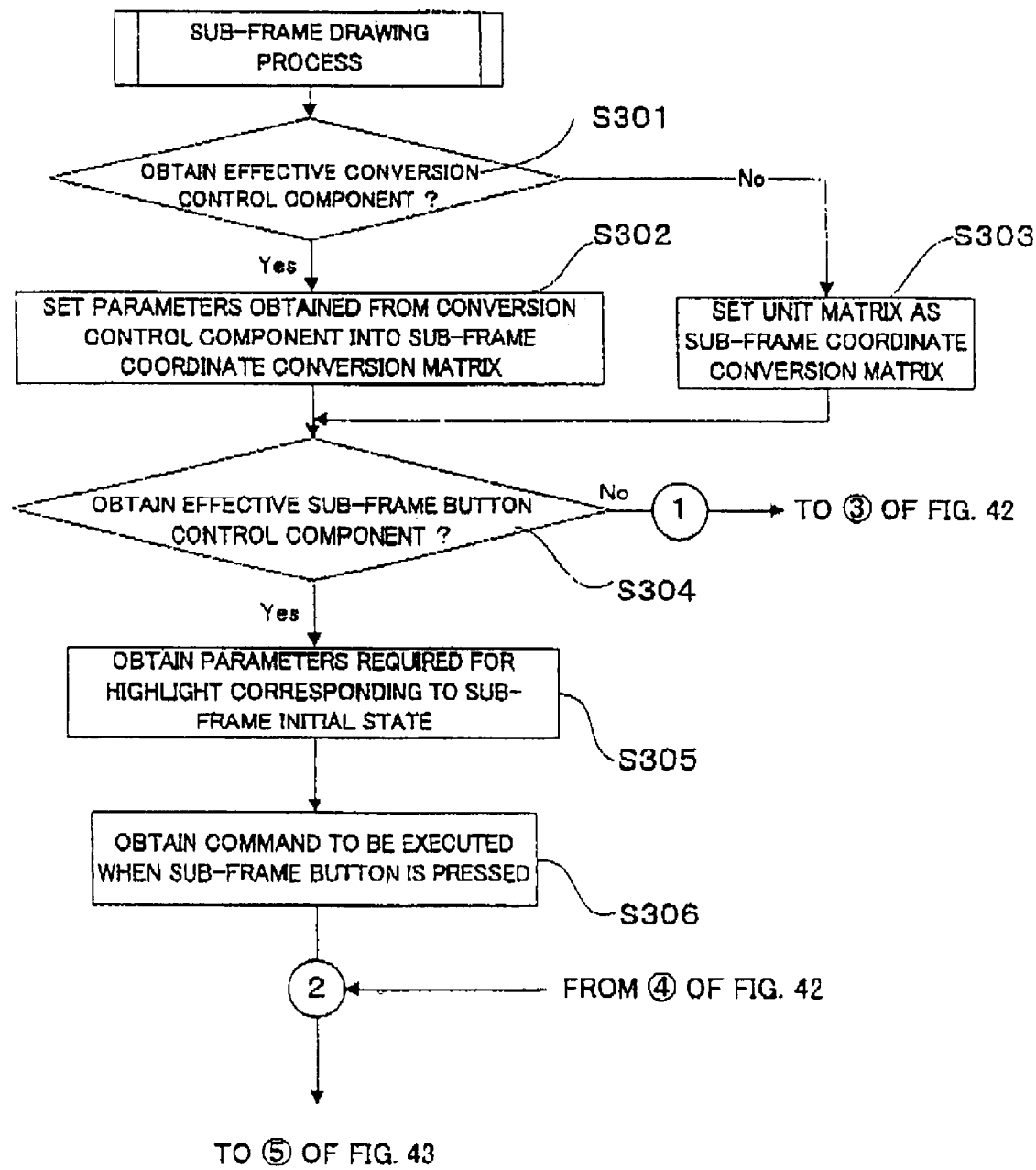
FIG. 41 is a flow chart showing an operational flow of a drawing processing in a sub-frame in the embodiment.

Firstly in FIG. 41, it is judged whether or not the effective conversion control component is obtained (step S301). If it is judged that the effective conversion control component is obtained (step S301: yes), the parameter(s) obtained from the conversion control component is (are) set into a coordinate conversion matrix of the sub-frame (step S302). If it is judged that the effective conversion control component is not obtained (step S301: No), a unit matrix is set as the coordinate conversion matrix of the sub-frame (step S303). Then, it is judged whether or not the effective sub-frame button control component is obtained (step S304).

If it is judged that the effective sub-frame button control component is obtained at step S304 (step S304: Yes), parameter(s) required for a highlight corresponding to an initial status of the sub-frame button is (are) obtained (step S305). For example herein, the sub-frame highlight scheme (table) in the sub-frame control parameter 812 illustrated in FIG. 23 is obtained, and the identification number information and the like of the button which is designated by this sub-frame highlight scheme and is activated at the initial status is obtained.

Figure 43:
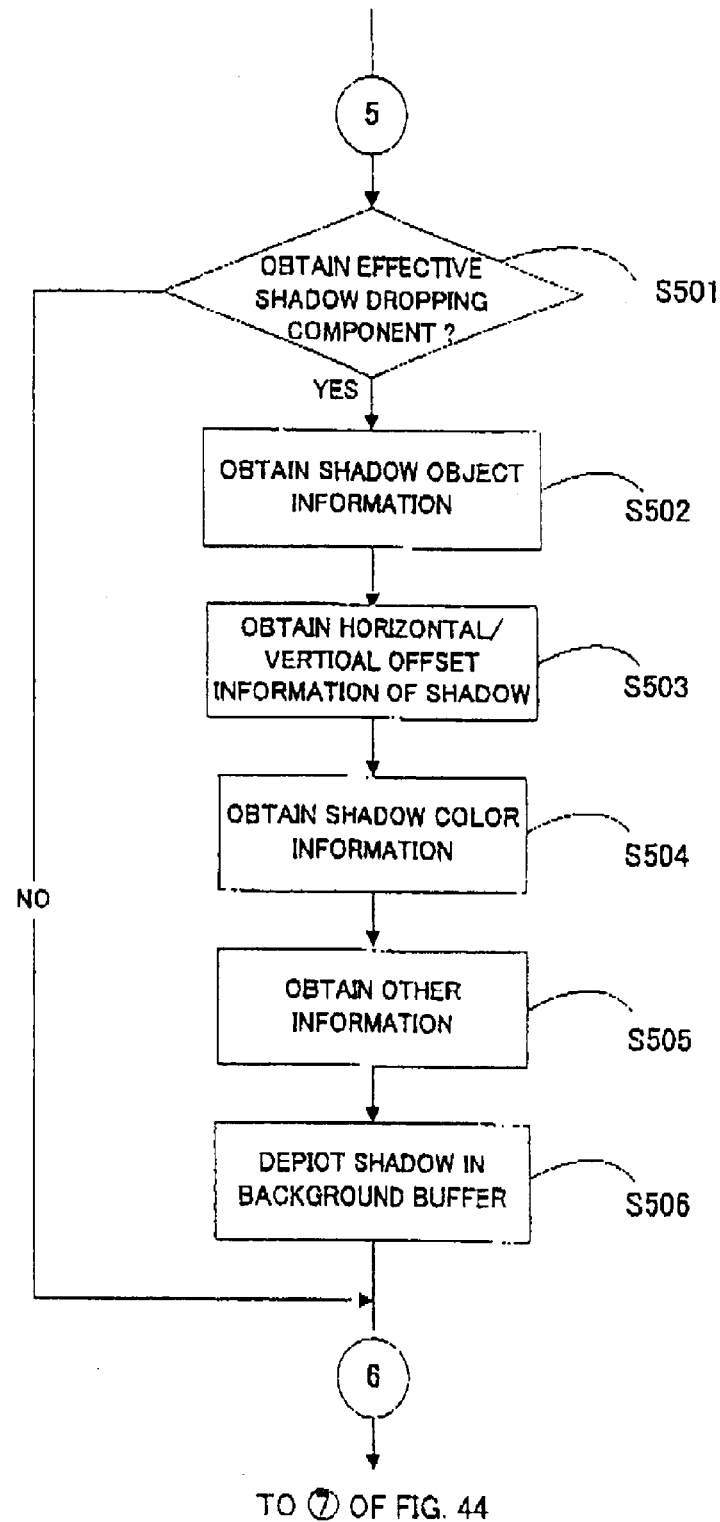
FIG. 43 is a flow chart showing an operational flow of a drawing processing in a sub-frame in the embodiment, continued from FIG. 42.

Then, a command to be executed when the sub-frame button is pressed is obtained (step S306) and the process goes to step S501 of FIG. 43.

On the other hand, if it is judged that the effective sub-frame button control component is not obtained (step S304: No), the process goes to step S401 of FIG. 42.

Figure 42:
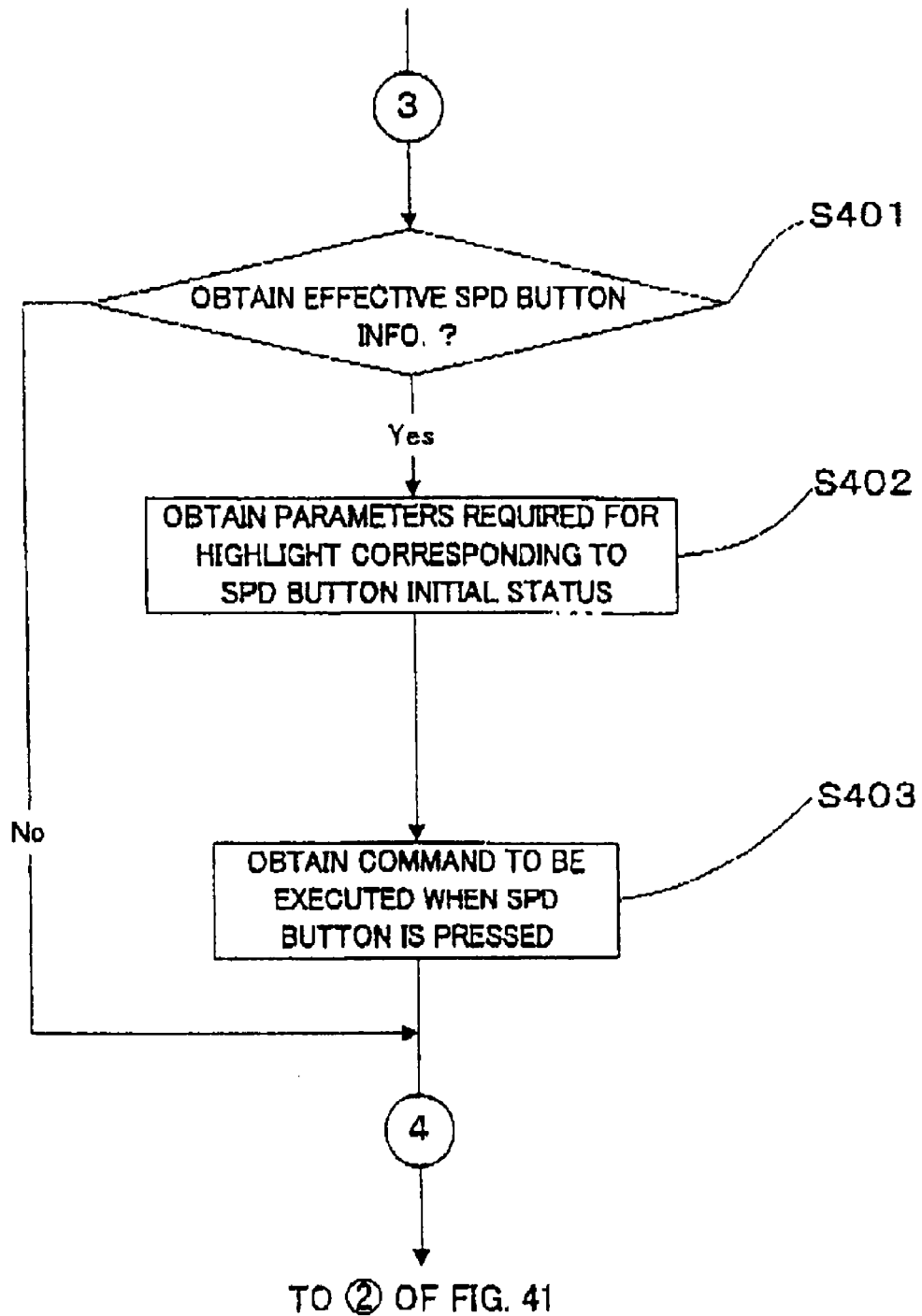
FIG. 42 is a flow chart showing an operational flow of a drawing processing in a sub-frame in the embodiment, continued from FIG. 41.

In FIG. 42, it is judged whether or not the effective SPD button information is obtained (step S401). If it is judged that the effective SPD button information is obtained (step S401: Yes), parameter(s) required for a highlight corresponding to the initial status of the SPD button is (are) obtained (step S402). Then, the command to be executed when the SPD button is pressed is obtained (step S403), the process goes to step S501 of FIG. 43. On the other hand, if it is judged that the effective SPD button information is not obtained at step S401 (step S401: No), the process goes to step S501 of FIG. 43.

Then, it is judged whether or not the effective shadow dropping component is obtained at step S501 of FIG. 43 (step S501). If it is judged that the effective shadow dropping component is obtained (step S501: yes), the information of the object to be shadowed (step S502), and both or either of the horizontal offset information of the shadow and vertical offset information of the shadow is (are) obtained (step S503), the color information of the shadow is obtained (step S504), and the other information is obtained (step S505). Then, the shadow is depicted in a background buffer (step S506), and the process goes to step S601 of FIG. 44. On the other hand, if it is judged that the effective shadow dropping component is not obtained at step S501 (step S501: No), the process also goes to step S601 of FIG. 44.

Figure 44:
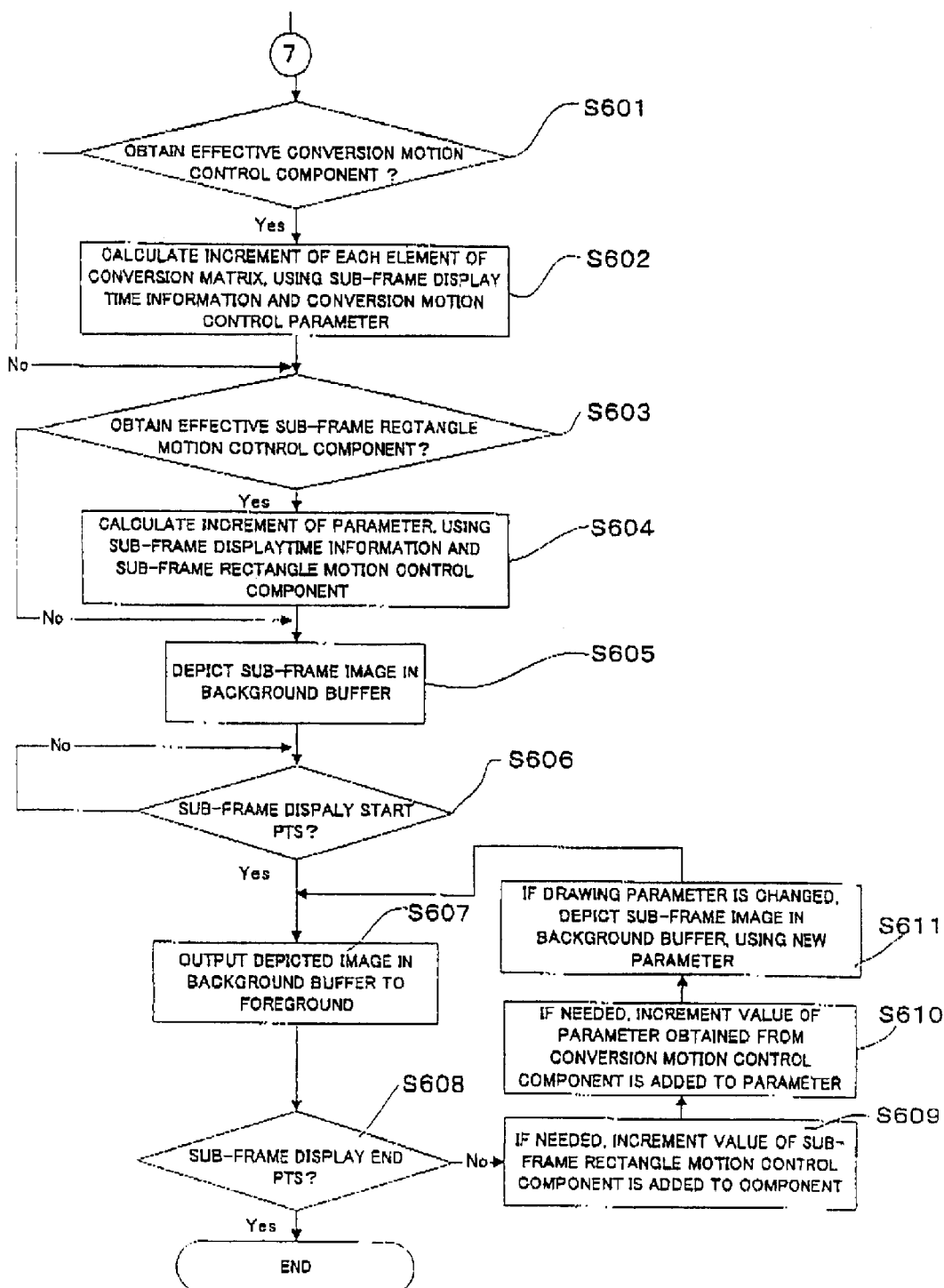
FIG. 44 is a flow chart showing an operational flow of a drawing processing in a sub-frame in the embodiment, continued from FIG. 43.

Then, it is judged whether or not the effective conversion motion control component is obtained at step S601 of FIG. 44 (step S601). If it is judged that the effective conversion motion control component is obtained (step S601: Yes), increment values of individual elements in the conversion matrix are calculated, on the basis of the sub-frame display time information and parameter(s) of the conversion motion control component (step S602), and the process goes to step S603. On the other hand, if it is judged that the effective conversion motion control component is not obtained at step S601 (step S601: No), the process also goes to step S603.

Then, it is judged whether or not the effective sub-frame rectangle motion control component is obtained at step S603 (step S603). If it is judged that the effective sub-frame rectangle motion control component is obtained (step S603: Yes), increment values of the coordinates of the sub-frame to be moved, on the basis of the sub-frame display time information and parameter(s) of the sub-frame rectangle motion control component (step S604), and the process goes to step S605. On the other hand, if it is judged that the effective sub-frame rectangle motion control component is not obtained at step S603 (step S603: No), the process also goes to step S605.

Then, an image of the sub-frame is depicted in the background buffer (step S605), and the depicted image in the background buffer is began to output to a foreground (step S607), when or after the present reproduction time becomes to be equal to the display start PTS of the sub-frame (step S606). Then, it is judged whether or not the present reproduction time becomes to be equal to the display end PTS of the sub-frame (step S608). If it is judged that the present reproduction time becomes to be equal to the display end PTS, a series of depicting ends.

On the other hand, in the case that the present reproduction time becomes to be equal to the display end PTS at step S608 (step S608: No), if there is any parameter value obtained from the sub-frame rectangle motion control component, the increment is added to the parameter (step S609), and if there is any parameter increment value obtained from the conversion motion control component, the increment is added to the parameter (step S610), and if any change is given to the drawing parameter, an image of the sub-frame is depicted in the background buffer on the basis of the new parameter (step S611), and the process goes back to step S607 to repeat the following processings.

Thus, as discussed with reference to FIG. 41 to FIG. 44, a series of depicting processings of the sub-frame is performed. Incidentally, the depicting processing is not limited to the above illustration, but can take any method including any processing article, any processing sequence and so on, insofar as the same processing as the above illustration can be achieved.

(Exemplary Display of Shadow Dropping)

Now, an explanation is made on a display control with "shadow dropping" to shadow letters or characters to be displayed or shadow the sub-frame, with reference to FIG. 45. FIG. 45 conceptually illustrates the shadow dropping display.

In FIG. 45, two exemplary displays at the left side indicate shadow droppings relative to sub-frames having opaque letters in transparent backgrounds, respectively, while two exemplary displays at the right side indicate shadow droppings relative to sub-frames entirely opaque. Furthermore, two exemplary displays at the upper side indicate shadow droppings without adding blurring relative to the shadow, while two exemplary displays at the lower side indicate shadow dropping with adding blurring relative to the shadow.

In the case that the shadow is given to opaque letters in the transparent background of the sub-frame, these letters are displayed as letters or designs isolated stereoscopically over the main-video. In the case that the sub-frame is opaque as a whole, an image in which the shadow is given to the entire sub-frame or the outline of the sub-frame is displayed over the main-video. Incidentally, "alpha value" may be used to indicate the transparency, which may be binary or multilevel (e.g. 255 levels). In the case of binary value, value "0" may be defined as "transparent", and value "1" may be defined as "opaque". In the case of multilevel value, value "0" may be defined as "transparent", the max value which may be "255" may be defined as "opaque", and mid values may be defined to indicate appropriate transparency between transparent and opaque.

Furthermore, for the purpose of shadowing, the effective shadowing may be achieved by applying an offset value on the opaque part and thereby adding a direction and volume or amount to be shadowed, or by controlling an angle of the background to be projected. Furthermore, the shadow is not limited to black color, but may take any desired color by mixing RGB signals in any desired proportion. Furthermore, the effective shadow may be obtained from the transparency of the entire sub-frame to which an appropriate shadow is added.

The display control with shadow dropping as mentioned above is described in the shadow dropping control component 820 in the sub-frame control components 817 shown in FIG. 25. That is, the information required for a specific shadow dropping, including the offset amount or offset position, the shadow color and so on, can be obtained from this component, and the shadow is added on the basis of these informations. Then, by referring to the shadow dropping of the bit 4 in the SFCCI bit allocation table 816 shown in FIG. 24, the existence or effectiveness of the shadow dropping control component 820 is determined.

Furthermore, there is description about obtaining the control information about the shadow dropping at step S206 in the operational flow of obtaining the sub-frame control component and checking the SFCCI shown in FIG. 40, and there is description about a process to shadow as shown in FIG. 45 at steps S501 to S506 of FIG. 43.

(Exemplary Display of Button)

Figure 46:
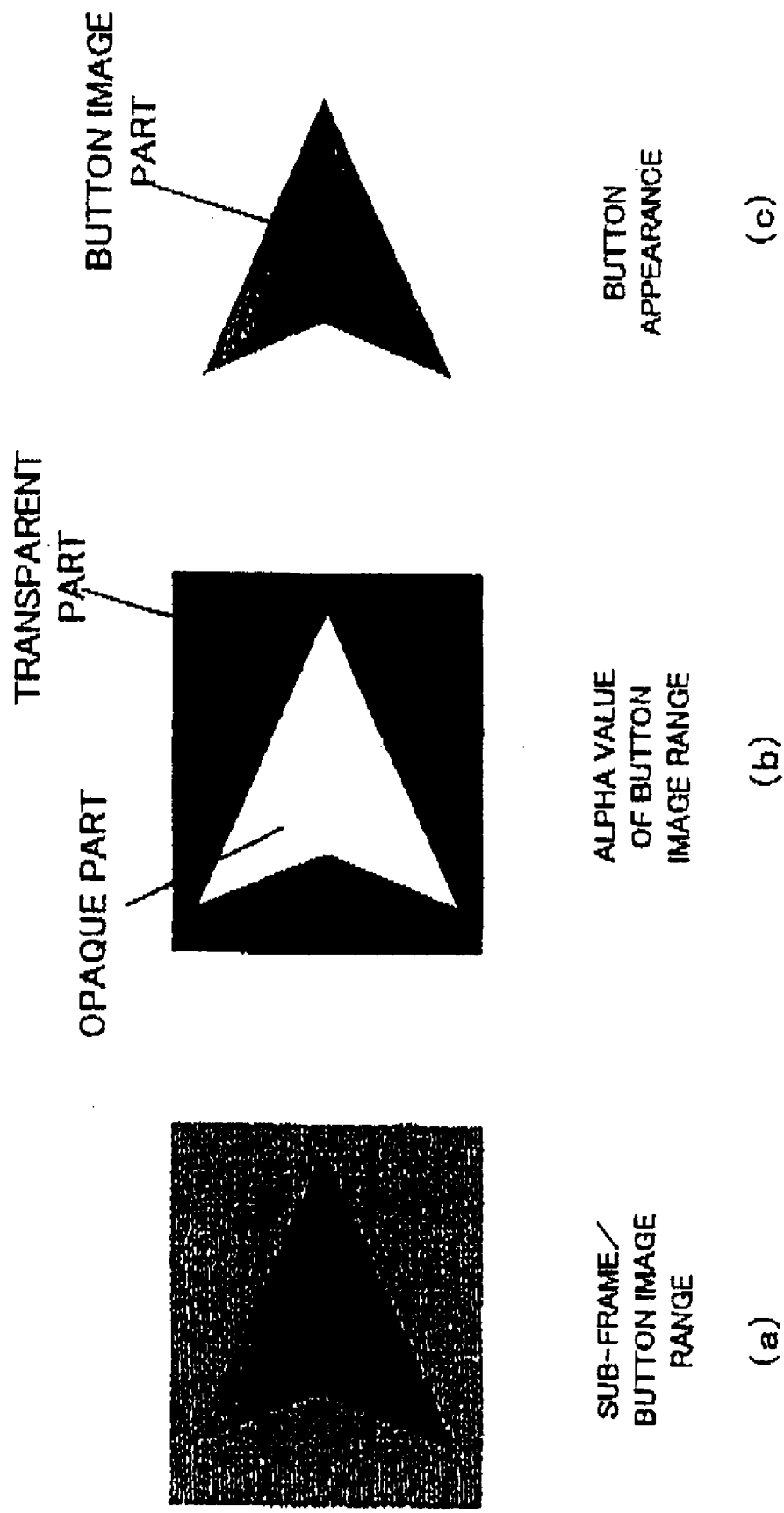
FIG. 46 is a conceptual view showing a button display in the embodiment.

An explanation is made on a display control for "buttons", with reference to FIG. 46. FIG. 46(*a*) shows a sub-frame and a range of a button image. FIG. 46(*b*) shows an image based on an alpha value of the button. FIG. 46(*c*) shows an area acting as the button.

For example, as shown in FIG. 46(*a*), a part of the SP data including a button design may be cut off as a sub-frame. The button information (i.e. the button position information to define the button range) to make this sub-frame act as a button may be included in the header information added to the SP data as for the "SPD button", and may be included in the SP control information as for the "SCP button".

On the basis of such button information, a function of the button as shown in FIG. 46 is determined. For example, types of the button function include a push button, a toggle button, an exclusive button and so on. Operation of these buttons are performed by a remote control operation, an audio input operation, a touch operation on a screen, a keyboard operation and so on relative to the displayed button image.

In this case, the entire sub-frame does not always act as a button, but an only opaque area of the sub-frame defined by the alpha value may be cut out as shown in FIG. 46(c) to make it act as the button image part (i.e. operative area as the button). That is, in this case, the alpha value is referred to, and only a coordinate area indicated as opaque by this alpha value is controlled to act as the button in accordance with the aforementioned button information. For the simplicity, however, it is possible to make the entire sub-frame shown in FIG. 46(a) act as the button.

A highlight control may be applied to such a button. For example, highlight control is applied to such a button, in accordance with the sub-frame highlight scheme in the sub-frame control parameter 812 shown in FIG. 23, or, instead of or in addition to this, the sub-frame button command in the sub-frame button control component 819 shown in FIG. 25, or other information. The highlight display facilitates a distinctive recognition about a presently pressed button, a presently selected button, a presently selectable but non-selected button, a presently non-selectable button and so on. It is possible to display with a predetermined highlight not only the pressed button, but also a selectable button group in accordance with the present operating condition of the device. The highlight display applied to various statuses of the button can make the button statuses known to the user.

The highlight display control defined by the sub-frame highlight scheme and the like is performed in such a manner that the button to be highlightened becomes distinctive from other buttons or other parts or portions, for example by changing the brightness or contrast depending on the button status, or giving a reverse shadow.

As for the SCP button, there is a description about the button display control mentioned above in the button information including the sub-frame button total number in the sub-frame control parameter 812 shown in FIG. 23, the sub-frame initial button status in the sub-frame button control component 819 shown in FIG. 25, the sub-frame button command and the like. Then, the existence or effectiveness to the sub-frame component 819 is determined by referring to the sub-frame button information of the bit 1 in the SFCCI bit allocation table 816 shown in FIG. 24.

On the other hand, as for the SPD button, there is a description about the display control of the button mentioned above in the button information added to the SP data shown in FIG. 20(b). More specifically, for example, there is the description about that in the structure information in the SP data structure 722 shown in FIG. 20(b), or in "other information" in the SP data.

Furthermore, also the highlight information may be recorded (described) in the SP control information in association with each button information, as for both the SCP button and the SPD button. Alternatively, it may be recorded in the header information (or the structure information or other information) in each SP data, in association with each button information. In any case, by performing the control based on the button information and the highlight control based on the highlight information in association with each other, the button can be highlightened.

Furthermore, there is a description about a process to perform the button control illustrated in FIG. 46 in steps S101 to S104, steps S110 to S111 in the operational flow of obtaining drawing control parameter of FIG. 39 and in steps S203 to S204 in the operational flow of obtaining the sub-frame control component and checking the SFCCI of FIG. 40, and further in steps S304 to S306 in the operational flow of the sub-frame drawing process of FIG. 41, and in steps S401 to S403 of FIG. 42.

Figure 47:
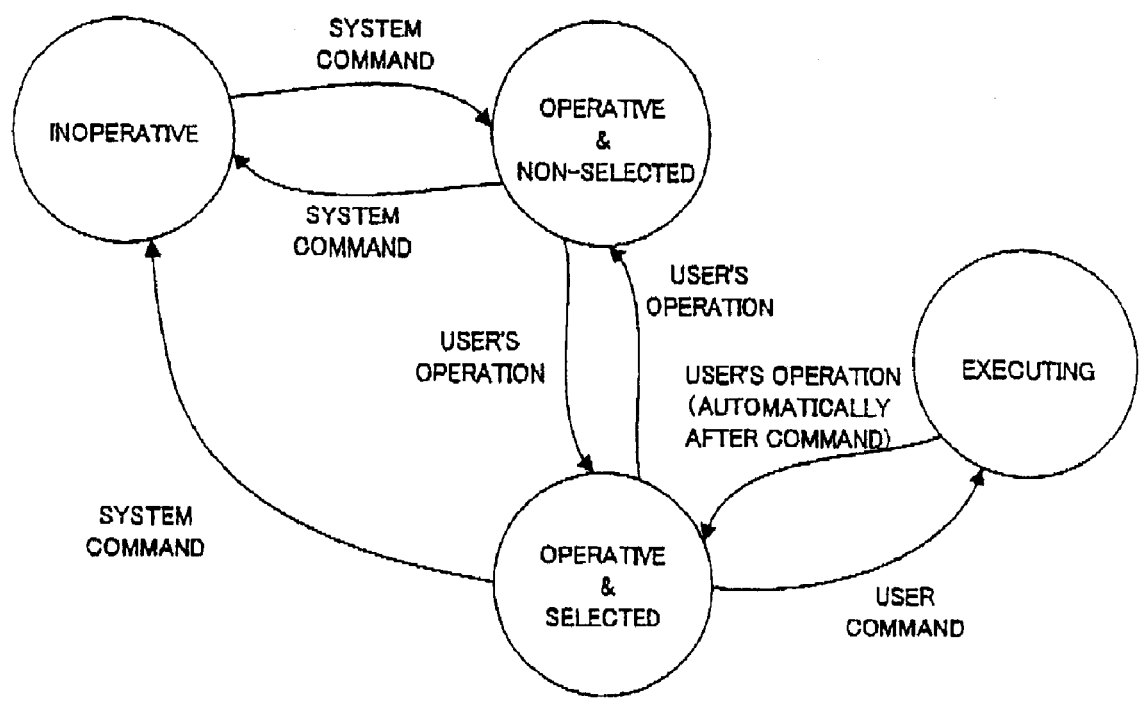
FIG. 47 is a illustration showing various button statuses in the embodiment.

Now, an explanation is made on a transition of the buttons status, with reference to FIG. 47. Operational commands are predetermined corresponding to each of buttons, so that the information record reproduction apparatus 500 performs by being operated a button matched with a desired operation. For example, a button relating to the audio function is selected from among displayed buttons and inputted, thereby to immediately perform the operation relating to the audio function. Types of operational buttons include a push button, a toggle button, an exclusive button and so on, as mentioned above.

The transition of the operational status of each button is determined depending on the present operational status of each button. The transition of button status may include "inoperative", "operative and presently non-selected", "operative and presently selected" and "executing". The status "inoperative" means a status that the button is displayed but inoperative, the status "operative and presently non-selected" means a status that the button is operative but presently not selected, and thereby impossible to be directly operated, the status "operative and presently selected" means a status that the button is operative and only this button is selected, and thereby possible to be directly operated, and the status "executing" means a status that the operation of the button is presently executed. Due to the user's operation, the status "operative and presently selected" is transited to the status "executing" and the status "operative and presently non-selected". Due to the system command, the status "operative and presently selected" is transited to the status "inoperative". Due to the system command, the status "inoperative" is transited to the status "operative and presently non-selected" and the status "operative and presently selected". Due to the user's operation or automatically after the command operation ends, the status "executing" is transited to the status "operative and presently selected".

The button control shown in FIG. 47 may be performed in accordance with the button information, as mentioned above, including the sub-frame button total number in the sub-frame control parameter 812 shown in FIG. 23, the sub-frame initial button status in the sub-frame button control component 819 shown in FIG. 25, the sub-frame button command and so on.

As discussed with reference FIG. 20 to FIG. 47, in this embodiment, various display controls are achieved, including the sub-picture motion control, the shadow dropping control, the highlight button control and so on. Furthermore, these various display controls of sub-picture can be efficiently performed by using the control information such as the SFCCI.

(Access Flow on Reproduction)

Figure 48:
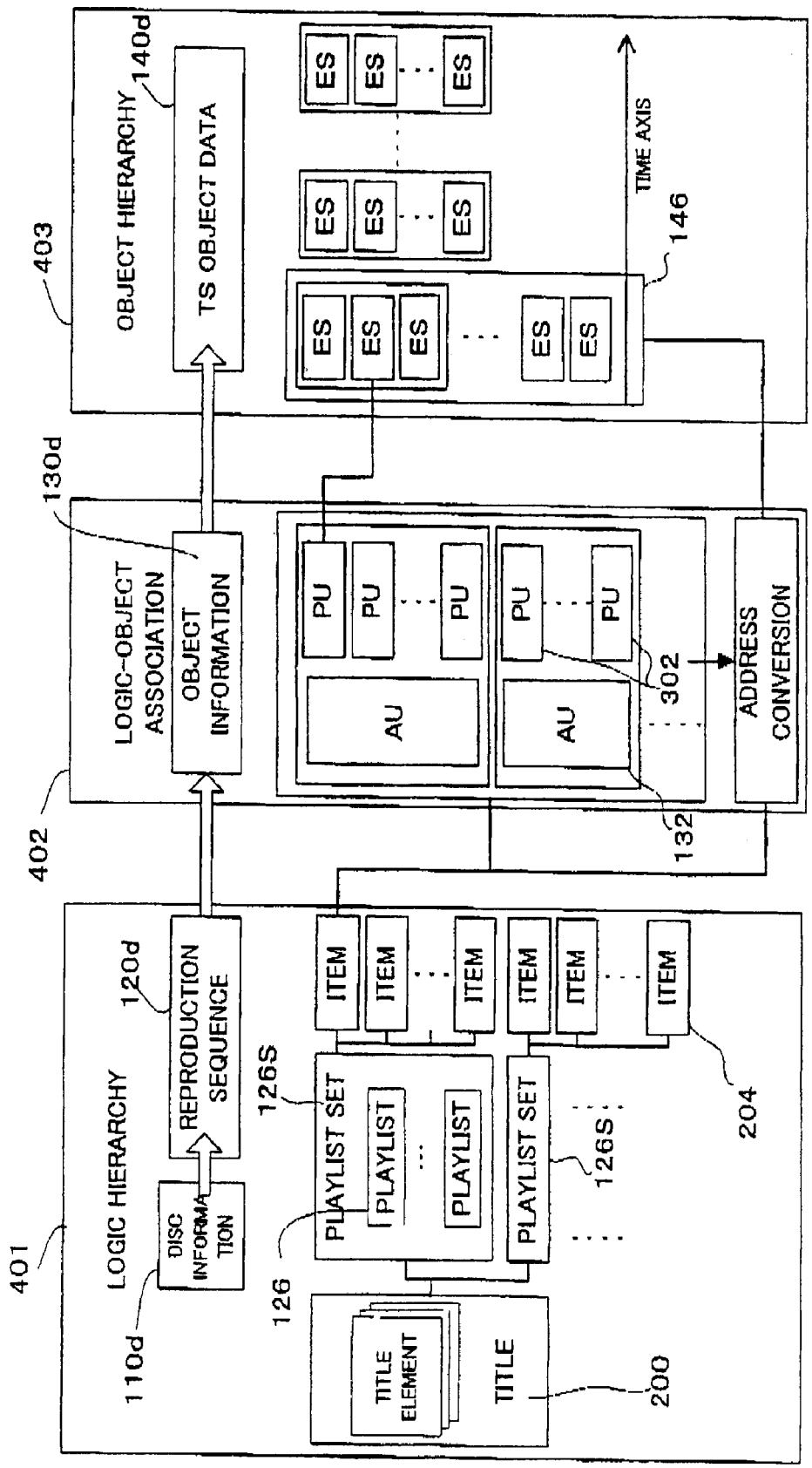
FIG. 48 is a view conceptually illustrating a general flow of an access during a reproduction in the embodiment, showing in association with a logic structure of an optical disc.

Next, with reference to FIG. 48, the access flow on reproduction by the information record reproduction apparatus 500, employing the AU information 132 and the PU information 302, is explained as one of the features of this embodiment, with the logical structure of the optical disc 100. FIG. 48 schematically illustrates an entire access flow on reproduction, in relation to the logical structure of the optical disc 100.

In FIG. 48, the logical structure of the optical disc 100 is categorized roughly into the following three hierarchies: a logic hierarchy 401; an object hierarchy 403; and a logic-object association hierarchy 402 mutually associating those two hierarchies.

Among them, the logic hierarchy 401 is a hierarchy for logically specifying various logical information to reproduce the desired title during the reproduction, as well as the playlist (P list) to be reproduced and its constitutional contents. In the logic hierarchy 401, disc information 110*d* indicating the entire titles 200 and the like on the optical disc 100 is written within the disc information file 110 (see FIG. 3), and further, reproduction sequence information 120*d* of the entire contents on the optical disc 100 is written within the playlist information file 120 (see FIG. 3). More specifically, the construction of one or more playlist sets 126S is written, as the reproduction sequence information 120*d*, respectively for one or more title elements 200-2 included in each title 200. Furthermore, each playlist set 126S includes one or more playlists 126, in each of which the construction of one or more items 204 (see FIG. 13) is written. Then, at the time of the access during the reproduction, the logic hierarchy 401 as described above specifies the title 200 to be reproduced, the playlist 126 corresponding to this, and further the item 204 corresponding to this.

Next, the logic-object association hierarchy 402 is a hierarchy for specifying the attribute and the physical storage address of the TS object data 140*d* to be reproduced, so as to specify the combination and/or the construction of the TS object data 140*d* as the entity data and perform an address conversion to the object hierarchy 403 from the logic hierarchy 401, on the basis of the information specified in the logic hierarchy 401 as described above. More specifically, in the logic-object association hierarchy 402, the object information data 130*d*, which separates a group of the contents composing each item 204 into units of the AU 132 and which finely separates each AU 132 into units of the PU 302, is written in the object information file 130 (see FIG. 3).

Here, the "PU (Presentation Unit) 302" is a unit associating and uniting a plurality of elementary streams by the reproduction switchable unit. If there are three audio streams in the PU 302, the user can freely switch these three audio (e.g. audio for each language), during the reproduction of this vision.

On the other hand, the "AU (Associate Unit) 132" is a unit uniting a plurality of elementary streams such as video streams in the TS object used in one title, and made of one or more PU's 302. More specifically, it is a unit uniting the elementary stream packet IDs (ES_PID) for each TS object, indirectly via the PU 302. This AU 132 corresponds to an assembly made of a plurality of programs having a specific inter-relationship in view of the contents, such as a plurality of programs switchable to each other in the multi-source broadcasting. The PU's 302 belonged to the same AU 132 corresponds to one or more elementary stream assemblies each constructing a plurality of programs switchable to each other by the user operation during the reproduction.

Therefore, if the AU 132 to be reproduced is identified, and the PU's belonged to the AU are identified, the elementary stream to be reproduced is identified. That is, a desired elementary stream can be reproduced from the multi-recorded optical disc 100, without using the PAT or the PMT shown in FIG. 12.

Incidentally, a further specific data structure of the AU information 132I and the PU information 302I, each defining the AU 132 and the PU 302, is discussed later in detail.

The elementary stream to be actually reproduced herein is identified or designated by the ES_PID that is a packet ID (see FIG. 12) of the elementary stream, on the basis of the PU information 302. At the same time, the information indicating the start time point and the end time point of the reproduction is converted to the elementary stream address information, and thereby the contents in a specific area (or a specific time range) of a specific elementary stream is reproduced.

Thus, in the logic-object association hierarchy 402, an address conversion is performed from a logical address relating to each item 204 to a physical address relating to each PU 302.

Next, the object hierarchy 403 is a physical hierarchy to reproduce the actual TS object data 140*d*. In the object hierarchy 403, the TS object data 140*d* is written within the object data file 140 (see FIG. 3). More specifically, TS packets 146 constructing a plurality of elementary streams (ES) are multiplexed at every time point. The multiplexed packets are disposed on the time scale to form a plurality of elementary streams (see FIG. 11). Then, a plurality of TS packets multiplexed at each time point is associated with a PU 302 identified by the logic-object association hierarchy 402, for each elementary stream. Incidentally, it is possible to associate a plurality of PU's 302 with one elementary stream (e.g. one elementary stream relating to the same audio data is shared, or one elementary stream relating to the same sub-picture data is shared, among a plurality of switchable programs). Thus, in the object hierarchy 403, the object data is actually reproduced, using the physical address obtained from the conversion in the logic-object association hierarchy 402.

As described above, the three hierarchies shown in FIG. 48 allow making an access to the optical disc 100 during the reproduction.

(Structure of Object Information File)

Next, with reference to FIG. 49, an explanation is made on a specific example of the data structure in the object information file 130 to associate the object data in the object data file 140 with various logical informations in the playlist information file 120 and the disc information file 110 as discussed with regard to FIG. 48. FIG. 49 schematically shows one specific example of the data structures of the AU (Associate Unit) table 131 (refer to FIG. 3) constructed in the object information file 130 and the ES (Elementary Stream) map table 134 (refer to FIG. 3) related to the AU table 134.

In this specific example, as shown in FIG. 49, the object information table is stored in the object information file 130. The object information table is provided with the AU table 131 shown in the upper part of FIG. 49 and the ES map table 134 shown in the lower part of FIG. 49.

In the upper part of FIG. 49, the AU table 131 may have a structure that allows the required number of tables for each Field to be added. For example, if there are four AUs, it may have such a structure that the number of the Fields increases to four.

In the AU table 131, there are stored "AU table general information" in which the number of AUs and the pointer to each AU, and the like are written, and "the other information."

The AU table 131 describes therein the Index number (Index number= . . . ) of the corresponding ES map table 134, as the AU information 132I which indicates an ES table Index #m in each PU #m corresponding to each AU #n. Here, the "AU" is a unit corresponding to a "program" in TV broadcast, for example, as mentioned above (especially, in the case of "multi-vision" broadcasting, it is a unit of a group of a plurality of "visions" which is changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, if multi-view contents are provided with the AU, the AU stores therein a plurality of PUs, and each PU stores therein the pointers to a plurality of elementary stream packet IDs which indicates the packets constituting the contents of each view. This indicates the Index number in the ES map table 134, as described later.

In the lower part of FIG. 49, in the ES map table 134, there are stored ES map table general information, a plurality of Indexes #m (m=1, 2, . . . ), and the "other information", for each Field.

The "ES map table general information" describes therein the size of the ES map table, the total number of Indexes, and the like.

The "Index #m" includes the elementary stream packet ID (ES_PID) of the entire elementary stream to be used for the reproduction, the corresponding Index number and the address information of the elementary stream.

In the embodiment, for example, if the elementary stream is the video stream of the MPEG 2 as described above, only the TS packet number of the TS packet at the head of the I picture and the corresponding display time length are written, as the address information, i.e. the ES address information 134d, on the ES map table 134, by which the data amount is tried to be reduced. On the other hand, with regard to the ES address information 134d of the sub-picture stream, the data amount is tried to be reduced by recording the index number information 134e of the elementary stream of the SP data to which the SP control information is applied.

Because of the construction as described above, it is possible to obtain the elementary stream packet ID (ES_PID) of the actual elementary stream, from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in adding a new title to the optical disc 100, necessary information can be easily added, which is useful. On the other hand, even if some information becomes unnecessary as a result of editing or the like, for example, what is to be done is simply not to refer to the information, and it is not necessary to actually delete the information from the table, which is useful, as well.

As explained in detail with reference to FIG. 1 to FIG. 49, according to this embodiment, the complex and sophisticated reproduction can be achieved to reproduce the sub-picture in association with the video data, by using the SP control information and so on, the complex and sophisticated reproduction including an interactive reproduction with the information record reproduction apparatus 500, a reproduction with shadowing the sub-picture, a highlight display control depending on a complex and sophisticated button operation on a video screen and so on. Furthermore, it is possible to perform relatively efficiently and quickly these various display controls of the sub-picture by using the control information such as the SFCCI from among the SP control information.

Incidentally, in the aforementioned embodiment, the explanation is made on the optical disc 100 as an example of the information record medium and the recorder or player of the optical disc 100 as an example of the information record reproduction apparatus. Nevertheless, the present invention is not limited to the optical disc and the player or recorder thereof, but is applicable to various record media and the recorders or players thereof, supporting other high density recording or high transfer rate.

The present invention is not limited to the above-described embodiments, and various changes may be made, if desired, without departing from the essence or spirit of the invention which can be read from the claims and the entire specification. An information record medium, an apparatus for and a method of recording the information, an apparatus for and a method of reproducing the information, an apparatus for and a method of recording and reproducing the information, a computer program for controlling the record or the reproduction, and a data structure including a control signal, all of which involves such changes, are also intended to be within the technical scope of the present invention.

INDUSTRIAL APPLICABILITY

An information record medium, a apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the main-video information, the audio information and the sub-video information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

The invention claimed is:

1. An information record medium on which there are recorded in a non-transitory state:
   an object data file for storing a object data which includes a video stream having a main-video and a sub-picture stream having a sub-picture;
   a play list information file for storing play list information which includes a plurality of item information each of which indicates a reproduction unit of the object data; and
   an object information file for storing object information which indicates an address of the object data which is indicated by each of the plurality item information, wherein
   the sub-picture stream includes sub-picture information, which indicates the sub-picture displayable at least partially over the main-video, and sub-picture control information,
   the sub-picture control information includes (i) sub-frame control information to control displaying sub-frame which forms one portion of the sub-picture, (ii) identification information to indicate the sub-picture information which is a control target by the sub-frame control information, (iii) sub-frame display position information to indicate a display position of the sub-frame, (iv) cut out range information to indicate a range of the sub-picture which forms the sub-frame by cutting-out one portion of the sub-picture, (v) button number information to indicate the number of button which is formed by the sub-frame, (vi) button display state information to indicate an initial button display state of the button, and (vii) command information to indicate a command which is to be performed in accordance with the button, wherein
   the sub-frame control information includes dynamic control information to dynamically change a display aspect of the sub-frame.

2. The information record medium according to claim 1, wherein the dynamic control information includes information to change dynamically at least one of a display position, a display size and a display shape of the sub-frame to be displayed over the main-video.

3. The information record medium according to claim 1, wherein the dynamic control information includes information to change dynamically a display content within the sub-frame whose display position, display size and display shape are fixed relative to the main-video.

4. The information record medium according to claim 1, wherein
the sub-frame display position information designates a rectangular area as the sub-frame, the rectangular area occupying a part of the sub-picture, and
the dynamic control information has information to change dynamically the display content within the sub-frame by changing the rectangular area designated by the sub-frame display position information relative to the sub-picture.

5. The information record medium according to claim 1, wherein the dynamic control information has information to dynamically change the display aspect of the sub-frame in such a manner that the sub-frame moves two-dimensionally or three-dimensionally relative to the main-video.

6. An information reproduction apparatus for reproducing information from the information record medium according to claim 1, said information reproduction apparatus comprising:
a reading device for reading the object data file, the play list information file and the object information file from the information record medium; and
a reproduction device for reproducing the main-video and the sub-picture.

7. A computer-readable recording medium recording thereon, in a non-transitory state, computer program product for a reproduction control to control a computer disposed at the information reproduction apparatus according to claim 6, said computer program product making the computer function as at least a part of the reading device and the reproduction device.

8. An information reproduction method performed by an information reproduction apparatus for reproducing information from the information record medium according to claim 1, said information reproduction method comprising:
a reading process, performed by the information reproduction apparatus, of reading the object data file, the play list information file and the object information file from the information record medium; and
a reproduction process, performed by the information reproduction apparatus, of reproducing the main-video and the sub-picture.

9. An information record apparatus, which is for recording information into an information record medium in a non-transitory state, comprising:
a first record device for recording an object data file for storing a object data which includes a video stream having a main-video and a sub-picture stream having a sub-picture, a play list information file for storing play list information which includes a plurality of item information each of which indicates a reproduction unit of the object data, and
an object information file for storing object information which indicates an address of the object data which is indicated by each of the plurality item information, wherein
the first record device records the sub-picture stream in such a manner that the sub-picture stream includes sub-picture information, which indicates the sub-picture displayable at least partially over the main-video, and sub-picture control information,
the first record device records the sub-picture control information in such a manner that the sub-picture control information includes (i) sub-frame control information to control displaying sub-frame which forms one portion of the sub-picture, (ii) identification information to indicate the sub-picture information which is a control target by the sub-frame control information, (iii) sub-frame display position information to indicate a display position of the sub-frame, (iv) cut out range information to indicate a range of the sub-picture which forms the sub-frame by cutting-out one portion of the sub-picture, (v) button number information to indicate the number of button which is formed by the sub-frame, (vi) button display state information to indicate an initial button display state of the button, and (vii) command information to indicate a command which is to be performed in accordance with the button, wherein
the first record device records the sub-frame control information in such a manner that the sub-frame control information includes dynamic control information to dynamically change a display aspect of the sub-frame.

10. A computer-readable recording medium recording thereon, in a non-transitory state, a computer program product for a record control to control a computer disposed at the information record apparatus according to claim 9, said computer program product making the computer function as at least a part of the first record device.

11. An information record method, which is performed by an information record apparatus for recording information into an information record medium in a non-transitory state, comprising:
a first record process, performed by the information record apparatus, of recording an object data file for storing a object data which includes a video stream having a main-video and a sub-picture stream having a sub-picture, a play list information file for storing play list information which includes a plurality of item information each of which indicates a reproduction unit of the object data, and
an object information file for storing object information which indicates an address of the object data which is indicated by each of the plurality item information, wherein
the first record process is for recording the sub-picture stream in such a manner that the sub-picture stream includes sub-picture information, which indicates the sub-picture displayable at least partially over the main-video, and sub-picture control information,
the first record process is for recording the sub-picture control information in such a manner that the sub-picture control information includes (i) sub-frame control information to control displaying sub-frame which forms one portion of the sub-picture, (ii) identification information to indicate the sub-picture information which is a control target by the sub-frame control information, (iii) sub-frame display position information to indicate a display position of the sub-frame, (iv) cut out range information to indicate a range of the sub-picture which forms the sub-frame by cutting-out one portion of the sub-picture, (v) button number information to indicate the number of button which is formed by the sub-frame, (vi) button display state information to indicate an initial button display state of the button, and (vii) command information to indicate a command which is to be performed in accordance with the button, wherein the first record process is for recording the sub-frame control information in such a manner that the sub-frame control information includes dynamic control information to dynamically change a display aspect of the sub-frame.

12. An information record reproduction apparatus, which is for recording information into an information record medium in a non-transitory state and for reproducing the information from the information record medium, comprising:
- a first record device for recording an object data file for storing a object data which includes a video stream having a main-video and a sub-picture stream having a sub-picture, a play list information file for storing play list information which includes a plurality of item information each of which indicates a reproduction unit of the object data, and
- an object information file for storing object information which indicates an address of the object data which is indicated by each of the plurality item information, wherein
- the first record device records the sub-picture stream in such a manner that the sub-picture stream includes sub-picture information, which indicates the sub-picture displayable at least partially over the main-video, and sub-picture control information,
- the first record device records the sub-picture control information in such a manner that the sub-picture control information includes (i) sub-frame control information to control displaying sub-frame which forms one portion of the sub-picture, (ii) identification information to indicate the sub-picture information which is a control target by the sub-frame control information, (iii) sub-frame display position information to indicate a display position of the sub-frame, (iv) cut out range information to indicate a range of the sub-picture which forms the sub-frame by cutting-out one portion of the sub-picture, (v) button number information to indicate the number of button which is formed by the sub-frame, (vi) button display state information to indicate an initial button display state of the button, and (vii) command information to indicate a command which is to be performed in accordance with the button, wherein
- the first record device records the sub-frame control information in such a manner that the sub-frame control information includes dynamic control information to dynamically control a display aspect of the sub-frame, and
- said information record reproduction apparatus further comprising:
- a reading device for reading the object data file, the play list information file and the object information file from the information record medium; and
- a reproduction device for reproducing the main-video and the sub-picture.

13. A computer-readable recording medium recording thereon, in a non-transitory state, computer program product for a record reproduction control to control a computer disposed at the information record reproduction apparatus according to claim 12, said computer program product making the computer function as at least a part of the first record device, the reading device and the reproduction device.

14. An information record reproduction method, performed by an information record reproduction apparatus, which is for recording information into an information record medium in a non-transitory state and for reproducing the information from the information record medium, comprising:
- a first record process, performed by the information record reproduction apparatus, of recording an object data file for storing a object data which includes a video stream having a main-video and a sub-picture stream having a sub-picture, a play list information file for storing play list information which includes a plurality of item information each of which indicates a reproduction unit of the object data, and
- an object information file for storing object information which indicates an address of the object data which is indicated by each of the plurality item information, wherein
- the first record process is for recording the sub-picture stream in such a manner that the sub-picture stream includes sub-picture information, which indicates the sub-picture displayable at least partially over the main-video, and sub-picture control information,
- the first record process is for recording the sub-picture control information in such a manner that the sub-picture control information includes (i) sub-frame control information to control displaying sub-frame which forms one portion of the sub-picture, (ii) identification information to indicate the sub-picture information which is a control target by the sub-frame control information, (iii) sub-frame display position information to indicate a display position of the sub-frame, (iv) cut out range information to indicate a range of the sub-picture which forms the sub-frame by cutting-out one portion of the sub-picture, (v) button number information to indicate the number of button which is formed by the sub-frame, (vi) button display state information to indicate an initial button display state of the button, and (vii) command information to indicate a command which is to be performed in accordance with the button, wherein
- the first record process is for recording the sub-frame control information in such a manner that the sub-frame control information includes dynamic control information to dynamically control a display aspect of the sub-frame, and
- said information record reproduction method further comprising:
- a reading process, performed by the information record reproduction apparatus, of reading the object data file, the play list information file and the object information file from the information record medium; and
- a reproduction process, performed by the information record reproduction apparatus, of reproducing the main-video and the sub-picture.

* * * * *